US009888426B2

(12) United States Patent
Ulupinar et al.

(10) Patent No.: US 9,888,426 B2
(45) Date of Patent: Feb. 6, 2018

(54) HANDOFF FOR SATELLITE COMMUNICATION

(71) Applicant: QUALCOMM Incorporated, San Diego, CA (US)

(72) Inventors: Fatih Ulupinar, San Diego, CA (US); Punyaslok Purkayastha, San Diego, CA (US); Peter A Barany, San Diego, CA (US); Gene Wesley Marsh, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/141,641

(22) Filed: Apr. 28, 2016

(65) Prior Publication Data
US 2016/0323800 A1 Nov. 3, 2016

Related U.S. Application Data

(63) Continuation-in-part of application No. 14/856,933, filed on Sep. 17, 2015.
(Continued)

(51) Int. Cl.
*H04W 36/38* (2009.01)
*H04W 72/04* (2009.01)
(Continued)

(52) U.S. Cl.
CPC ........ *H04W 36/38* (2013.01); *H04B 7/18541* (2013.01); *H04W 36/32* (2013.01);
(Continued)

(58) Field of Classification Search
CPC ............ H04B 7/18519; H04B 7/18541; H04B 7/18534; H04B 7/18545; H04W 84/06;
(Continued)

(56) References Cited

U.S. PATENT DOCUMENTS 5,483,664 A    1/1996  Moritz et al.
5,500,648 A *  3/1996  Maine ....................... G01S 5/12
                                                     342/357.78
(Continued)

FOREIGN PATENT DOCUMENTS

EP    0637142 A1    2/1995
EP    0808034 A2    11/1997

OTHER PUBLICATIONS

International Search Report and Written Opinion—PCT/US2016/030263—ISA/EPO—dated Jul. 19, 2016.
(Continued)

*Primary Examiner* — Daniel Lai
(74) *Attorney, Agent, or Firm* — Loza & Loza, LLP

(57) ABSTRACT

Various aspects of the disclosure relate to handoff of a user terminal in communication with a satellite network portal through a satellite. In some aspects, a satellite network portal and a user terminal use a satellite handoff information to determine when to handoff the user terminal from one cell to another and/or from one satellite to another. In some aspects, a user terminal sends capability information, location information, or other information to a satellite network portal whereby, based on this information, the satellite network portal generates the satellite handoff information and/or selects a handoff procedure for the user terminal. In some aspects, handoff of a user terminal to a different satellite involves the user terminal conducting satellite signal measurements and sending a measurement message to the satellite network portal. In some aspects, the satellite network portal generates new satellite handoff information as a result of receiving a measurement message.

67 Claims, 40 Drawing Sheets

Related U.S. Application Data

(60) Provisional application No. 62/156,063, filed on May 1, 2015.

(51) Int. Cl.
*H04W 36/32* (2009.01)
*H04B 7/185* (2006.01)
*H04W 88/16* (2009.01)
*H04L 12/64* (2006.01)

(52) U.S. Cl.
CPC ... *H04W 72/048* (2013.01); *H04L 2012/6421* (2013.01); *H04W 88/16* (2013.01)

(58) Field of Classification Search
CPC .. H04W 16/28; H04W 36/0083; H04W 36/32
See application file for complete search history.

(56) References Cited

U.S. PATENT DOCUMENTS

| | | | |
|---|---|---|---|
| 5,574,968 A | 11/1996 | Olds et al. | |
| 5,678,184 A | 10/1997 | Cutler, Jr. et al. | |
| 5,912,641 A | 6/1999 | Dietrich | |
| 5,966,640 A * | 10/1999 | Leath | H04B 7/18519 455/12.1 |
| 5,999,797 A | 12/1999 | Zancho et al. | |
| 6,023,242 A | 2/2000 | Dixon | |
| 6,571,102 B1 | 5/2003 | Hogberg et al. | |
| 6,868,270 B2 * | 3/2005 | Dent | H04B 7/18545 455/435.1 |
| 6,920,323 B1 | 7/2005 | Grayson | |
| 7,136,620 B2 | 11/2006 | Wang | |
| 7,558,226 B2 | 7/2009 | Anderson et al. | |
| 8,223,719 B2 | 7/2012 | Hong et al. | |
| 2002/0052180 A1 | 5/2002 | Ravishankar et al. | |
| 2004/0014452 A1 * | 1/2004 | Lim | H04B 7/18558 455/403 |
| 2007/0010252 A1 | 1/2007 | Balachandran et al. | |
| 2007/0135040 A1 | 6/2007 | Draim | |
| 2009/0041246 A1 | 2/2009 | Kitazoe | |
| 2010/0039984 A1 | 2/2010 | Brownrigg | |
| 2011/0013542 A1 * | 1/2011 | Yu | H04W 74/006 370/280 |
| 2013/0051360 A1 | 2/2013 | Monte et al. | |
| 2014/0045437 A1 | 2/2014 | Keskitalo | |
| 2014/0057634 A1 | 2/2014 | Chang et al. | |
| 2014/0128075 A1 | 5/2014 | Da Silva et al. | |
| 2015/0271730 A1 * | 9/2015 | Benammar | H04W 36/30 455/436 |
| 2015/0381263 A1 | 12/2015 | Lejnell et al. | |
| 2016/0323032 A1 | 11/2016 | Ulupinar | |
| 2017/0230104 A1 | 8/2017 | Purkayastha et al. | |

OTHER PUBLICATIONS

International Search Report and Written Opinion—PCT/US2017/029871—ISA/EPO—dated Jul. 19, 2017.
International Search Report and Written Opinion—PCT/US2016/029050—ISA/EPO—dated Jul. 19, 2016.

* cited by examiner

HANDOFF FOR SATELLITE COMMUNICATION

CROSS-REFERENCE TO RELATED APPLICATIONS

This application is a continuation-in-part of patent application Ser. No. 14/856,933 filed in the U.S. Patent and Trademark Office on Sep. 17, 2015, and claims priority to and the benefit of provisional patent application No. 62/156,063 filed in the U.S. Patent and Trademark Office on May 1, 2015, the entire content of each of which is incorporated herein by reference.

BACKGROUND

Various aspects described herein relate to satellite communication, and more particularly but not exclusively, to handoff for non-geosynchronous satellite communication.

Satellite-based communication systems may include gateways and one or more satellites to relay communication signals between the gateways and one or more user terminals. A gateway is an earth station having an antenna for transmitting signals to, and receiving signals from, communication satellites. A gateway provides communication links, using satellites, for connecting a user terminal to other user terminals or users of other communication systems, such as a public switched telephone network, the Internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "cells" (e.g., "beams"), through the use of beam-forming antennas. Each cell (e.g., beam) covers a particular geographic region within the footprint. Cells from the same satellite or from different satellites may overlap (e.g., partially overlap). For example, the beams of a particular satellite may be directed so that more than one beam from that satellite covers the same specific geographic region.

Geosynchronous satellites have long been used for communication. A geosynchronous satellite is stationary relative to a given location on the Earth, and thus there is little timing shift and Doppler frequency shift in radio signal propagation between a communication transceiver on the Earth and the geosynchronous satellite. However, because geosynchronous satellites are limited to a geosynchronous orbit (GSO), which is a circle having a radius of approximately 42,164 km from the center of the Earth directly above the Earth's equator, the number of satellites that may be placed in the GSO is limited.

As alternatives to geosynchronous satellites, communication systems which utilize a constellation of satellites in non-geosynchronous orbits, such as low-earth orbits (LEO), have been devised to provide communication coverage to the entire Earth or at least large parts of the Earth. In non-geosynchronous satellite-based systems, such as LEO satellite-based systems, the satellites move relative to ground-based communication devices such as gateways or user terminals. Thus, at some point in time, a user terminal will be handed-off from one satellite to another.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

The disclosure relates in some aspects to mobility and/or link management. Some aspects of the disclosure are directed to handoff for non-geosynchronous satellite communication.

In one aspect, the disclosure provides an apparatus configured for communication that includes a memory and a processor coupled to the memory. The processor and the memory are configured to: generate satellite handoff information that specifies a handoff time for a particular cell of a particular satellite; and send the satellite handoff information to a user terminal.

Another aspect of the disclosure provides a method for communication including: generating satellite handoff information that specifies a handoff time for a particular cell of a particular satellite; and sending the satellite handoff information to a user terminal.

Another aspect of the disclosure provides an apparatus configured for communication. The apparatus including: means for generating satellite handoff information that specifies a handoff time for a particular cell of a particular satellite; and means for sending the satellite handoff information to a user terminal.

Another aspect of the disclosure provides a non-transitory computer-readable medium storing computer-executable code, including code to: generate satellite handoff information that specifies a handoff time for a particular cell of a particular satellite; and send the satellite handoff information to a user terminal.

In one aspect, the disclosure provides an apparatus configured for communication that includes a memory and a processor coupled to the memory. The processor and the memory are configured to: receive satellite handoff information that specifies a handoff time for a particular cell of a particular satellite; and perform a handoff to the particular cell of the particular satellite based on the satellite handoff information.

Another aspect of the disclosure provides a method for communication including: receiving satellite handoff information that specifies a handoff time for a particular cell of a particular satellite; and performing a handoff to the particular cell of the particular satellite based on the satellite handoff information.

Another aspect of the disclosure provides an apparatus configured for communication. The apparatus including: means for receiving satellite handoff information that specifies a handoff time for a particular cell of a particular satellite; and means for performing a handoff to the particular cell of the particular satellite based on the satellite handoff information.

Another aspect of the disclosure provides a non-transitory computer-readable medium storing computer-executable code, including code to: receive satellite handoff information that specifies a handoff time for a particular cell of a particular satellite; and perform a handoff to the particular cell of the particular satellite based on the satellite handoff information.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

FIGS. 16, 17, and 18 are diagrams illustrating an example of a call flow for an A×P handoff in accordance with some aspects of the disclosure.

DETAILED DESCRIPTION

The disclosure relates in some aspects to handoff of a user terminal that is in communication with a satellite network portal (also referred to as a gateway) via a satellite of a non-geosynchronous satellite communication system. In some implementations, the satellite communication system is a low-earth orbit (LEO) satellite communication system for communicating data, voice, video, or other information. The satellite network portal and the user terminal use a satellite and cell transition table to determine when to handoff the user terminal from one cell to another and/or from one satellite to another. In some aspects, the user terminal may send capability information, location information, or other information to the satellite network portal whereby, based on this information, the satellite network portal generates a satellite and cell transition table and/or selects a handoff procedure for the user terminal. The user terminal may also conduct satellite signal measurements and send a corresponding measurement message to the satellite network portal. The satellite network portal may then generate a new satellite and cell transition table as a result of receiving the measurement message. Various other aspects of the disclosure will also be described below in further detail.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

Figure 1:
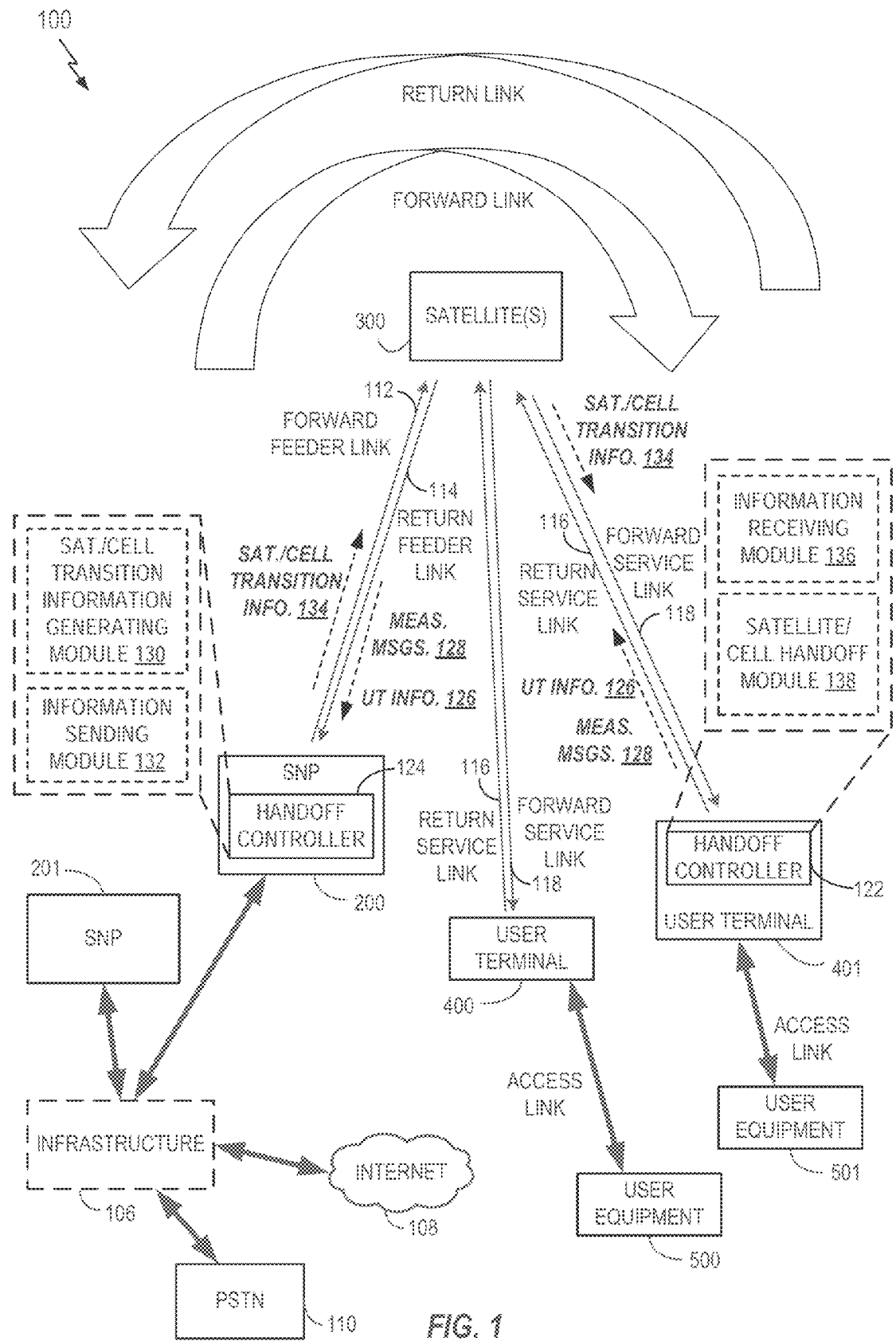
FIG. 1 is a block diagram of an example communication system in accordance with some aspects of the disclosure.

FIG. 1 illustrates an example of a satellite communication system 100 which includes a plurality of satellites (although only one satellite 300 is shown for clarity of illustration) in non-geosynchronous orbits, for example, low-earth orbits (LEO), an SNP 200 (e.g., corresponding to a satellite gateway) in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audio-visual device, or any device including the capability to communicate with a UT. Additionally, the UE 500 and/or the UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and a return access link), and similarly, the UT 401 and the UE 501 communicate with each other via another bidirectional access link. In another implementation, one or more additional UEs (not shown) may be configured to receive only and therefore communicate with a UT only using a forward access link. In another implementation, one or more additional UEs (not shown) may also communicate with the UT 400 or the UT 401. Alternatively, a UT and a corresponding UE may be integral parts of a single physical device, such as a mobile telephone with an integral satellite transceiver and an antenna for communicating directly with a satellite, for example.

The SNP 200 may have access to the Internet 108 or one or more other types of public, semiprivate or private networks. In the example illustrated in FIG. 1, the SNP 200 is in communication with infrastructure 106, which is capable of accessing the Internet 108 or one or more other types of public, semiprivate or private networks. The SNP 200 may also be coupled to various types of communication backhaul, including, for example, landline networks such as optical fiber networks or public switched telephone networks (PSTN) 110. Further, in alternative implementations the SNP 200 may interface to the Internet 108, PSTN 110, or one or more other types of public, semiprivate or private networks without using the infrastructure 106. Still further, the SNP 200 may communicate with other SNPs, such as the SNP 201 through the infrastructure 106 or alternatively may be configured to communicate to the SNP 201 without using the infrastructure 106. The infrastructure 106 may include, in whole or part, a network control center (NCC), a satellite control center (SCC), a wired and/or wireless core network and/or any other components or systems used to facilitate operation of and/or communication with the satellite communication system 100.

Communication between the satellite 300 and the SNP 200 in both directions are called feeder links, whereas communication between the satellite and each of the UTs 400 and 401 in both directions are called service links. A signal path from the satellite 300 to a ground station, which may be the SNP 200 or one of the UTs 400 and 401, may be generically called a downlink. A signal path from a ground station to the satellite 300 may be generically called an uplink. Additionally, as illustrated, signals can have a general directionality such as a forward link and a return link (or reverse link). Accordingly, a communication link in a direction originating from the SNP 200 and terminating at the UT 400 through the satellite 300 is called a forward link, whereas a communication link in a direction originating from the UT 400 and terminating at the SNP 200 through the satellite 300 is called a return link or a reverse link. As such, the signal path from the SNP 200 to the satellite 300 is labeled a "Forward Feeder Link" 112 whereas the signal path from the satellite 300 to the SNP 200 is labeled a "Return Feeder Link" 114 in FIG. 1. In a similar manner, the signal path from each UT 400 or 401 to the satellite 300 is labeled a "Return Service Link" 116 whereas the signal path from the satellite 300 to each UT 400 or 401 is labeled a "Forward Service Link" 118 in FIG. 1.

A handoff controller 122 of the UT 401 and a handoff controller 124 of the SNP 200 cooperate to control handoff of the UT 401 from one satellite or cell to another. Other components of the satellite communication system 100 may include corresponding handoff controllers as well. However, handoff controllers are only illustrated for the UT 401 and the SNP 200 to reduce the complexity of FIG. 1.

The handoff controller 122 sends UT information 126 (e.g., including UT location and capabilities information) and measurement messages 128 (e.g., including satellite measurement information) to the handoff controller 124. A satellite/cell transition information generating module 130 of the handoff controller 124 generates satellite/cell transition information (e.g., a table) indicative of handoff timing for the UT 401. In some aspects, the satellite/cell transition information generating module 130 may generate the satellite/cell transition information based, at least in part, on the UT information 126 and the measurement messages 128 received from the UT 401, satellite locations over time (obtained from ephemeris data), satellite cell patterns, and satellite cell turn-on and turn-off schedules. An information sending module 132 sends this satellite/cell transition information 134 to the handoff controller 122 via the current satellite 300.

An information receiving module 136 of the handoff controller 122 receives this satellite/cell transition information 134 via the current satellite 300. A satellite/cell handoff module 138 of the handoff controller 122 can then control handoff of the UT 401 based on the received satellite/cell transition information.

Figure 2:
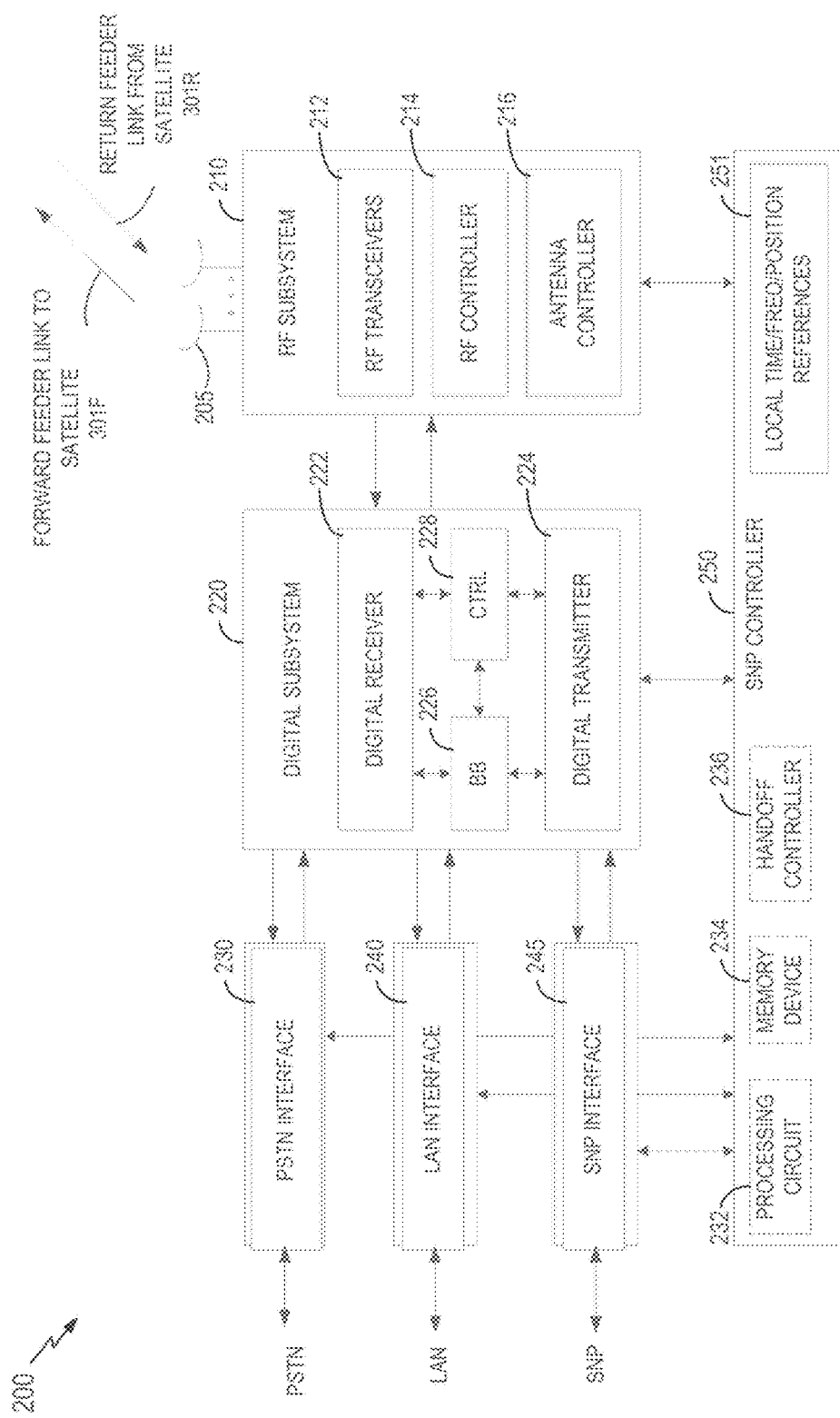
FIG. 2 is a block diagram of one example of a satellite network portal (SNP) of FIG. 1 in accordance with some aspects of the disclosure.

FIG. 2 is an example block diagram of the SNP 200, which also can apply to the SNP 201 of FIG. 1. The SNP 200 is shown to include a number of antennas 205, an RF subsystem 210, a digital subsystem 220, a Public Switched Telephone Network (PSTN) interface 230, a Local Area Network (LAN) interface 240, an SNP interface 245, and an SNP controller 250. The RF subsystem 210 is coupled to the antennas 205 and to the digital subsystem 220. The digital subsystem 220 is coupled to the PSTN interface 230, to the LAN interface 240, and to the SNP interface 245. The SNP controller 250 is coupled to the RF subsystem 210, the digital subsystem 220, the PSTN interface 230, the LAN interface 240, and the SNP interface 245.

The RF subsystem 210, which may include a number of RF transceivers 212, an RF controller 214, and an antenna controller 216, may transmit communication signals to the satellite 300 via a forward feeder link 301F, and may receive communication signals from the satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by the digital subsystem 220). Each transmit chain may include an up-converter (e.g., a mixer) and a power amplifier (PA) to up-convert and amplify, respectively, communication signals to be transmitted to the satellite 300 in a well-known manner. In addition, each transmit chain may include a digital-to-analog converter (DAC) to convert the digital signals received from the digital subsystem 220 to analog signals to be transmitted to the satellite 300.

The RF controller 214 may be used to control various aspects of a number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. The digital subsystem 220 may process communication signals received from the RF subsystem 210 and forward the processed communication signals to the PSTN interface 230 and/or the LAN interface 240, and may process communication signals received from the PSTN interface 230 and/or the LAN interface 240 and forward the processed communication signals to the RF subsystem 210.

Each digital receiver module 222 may correspond to signal processing elements used to manage communication between the SNP 200 and the UT 400. One of the receive chains of RF transceivers 212 may provide input signals to multiple digital receiver modules 222. A number of digital receiver modules 222 may be used to accommodate all of the satellite cells and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to the UT 400 via the satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to the digital receiver modules 222, the digital transmitter modules 224, and the baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

The baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects the SNP 200 to a ground-based network (e.g., the Internet).

The LAN interface 240 may provide communication signals to, and receive communication signals from, an external LAN. For example, the LAN interface 240 may be coupled to the Internet 108 either directly or through additional infrastructure 106, as illustrated in FIG. 1. The LAN interface 240 is well known in the art, and therefore is not described in detail herein.

The SNP interface 245 may provide communication signals to, and receive communication signals from, one or more other SNPs associated with the satellite communication system 100 of FIG. 1 (and/or to/from SNPs associated with other satellite communication systems, not shown for simplicity). For some implementations, the SNP interface 245 may communicate with other SNPs via one or more dedicated communication lines or channels (not shown for simplicity). For other implementations, the SNP interface 245 may communicate with other SNPs using the PSTN 110 and/or other networks such as the Internet 108 (see also FIG. 1). For at least one implementation, the SNP interface 245 may communicate with other SNPs via the infrastructure 106.

Overall SNP control may be provided by the SNP controller 250. The SNP controller 250 may plan and control utilization of the satellite 300's resources by the SNP 200. For example, the SNP controller 250 may analyze trends, generate traffic plans, allocate satellite resources, monitor (or track) satellite positions, and monitor the performance of the SNP 200 and/or the satellite 300. The SNP controller 250 may also be coupled to a ground-based satellite controller (not shown for simplicity) that maintains and monitors orbits of the satellite 300, relays satellite usage information to the SNP 200, tracks the positions of the satellite 300, and/or adjusts various channel settings of the satellite 300.

For the example implementation illustrated in FIG. 2, the SNP controller 250 includes local time, frequency, and position references 251, which may provide local time or frequency information to the RF subsystem 210, the digital subsystem 220, and/or the interfaces 230, 240, and 245. The time or frequency information may be used to synchronize the various components of the SNP 200 with each other and/or with the satellite(s) 300. The local time, frequency, and position references 251 may also provide position information (e.g., ephemeris data) of the satellite(s) 300 to the various components of the SNP 200. Further, although depicted in FIG. 2 as included within the SNP controller 250, for other implementations, the local time, frequency, and the position references 251 may be a separate subsystem that is coupled to the SNP controller 250 (and/or to one or more of the digital subsystem 220 and the RF subsystem 210).

Although not shown in FIG. 2 for simplicity, the SNP controller 250 may also be coupled to a network control center (NCC) and/or a satellite control center (SCC). For example, the SNP controller 250 may allow the SCC to communicate directly with the satellite(s) 300, for example, to retrieve ephemeris data from the satellite(s) 300. The SNP controller 250 may also receive processed information (e.g., from the SCC and/or the NCC) that allows the SNP controller 250 to properly aim its antennas 205 (e.g., at the appropriate satellite(s) 300), to schedule cell transmissions, to coordinate handoffs, and to perform various other well-known functions.

The SNP controller 250 may include one or more of a processing circuit 232, a memory device 234, or a handoff controller 236 that independently or cooperatively perform handoff-related operations for the SNP 200 as taught herein. In an example implementation, the processing circuit 232 is configured (e.g., programmed) to perform some or all of these operations. In another example implementation, the processing circuit 232 (e.g., in the form of a processor) executes code stored in the memory device 234 to perform some or all of these operations. In another example implementation, the handoff controller 236 is configured (e.g., programmed) to perform some or all of these operations. Although depicted in FIG. 2 as included within the SNP controller 250, for other implementations, one or more of the processing circuit 232, the memory device 234, or the handoff controller 236 may be a separate subsystem that is coupled to the SNP controller 250 (and/or to one or more of the digital subsystem 220 and the RF subsystem 210).

Figure 3:
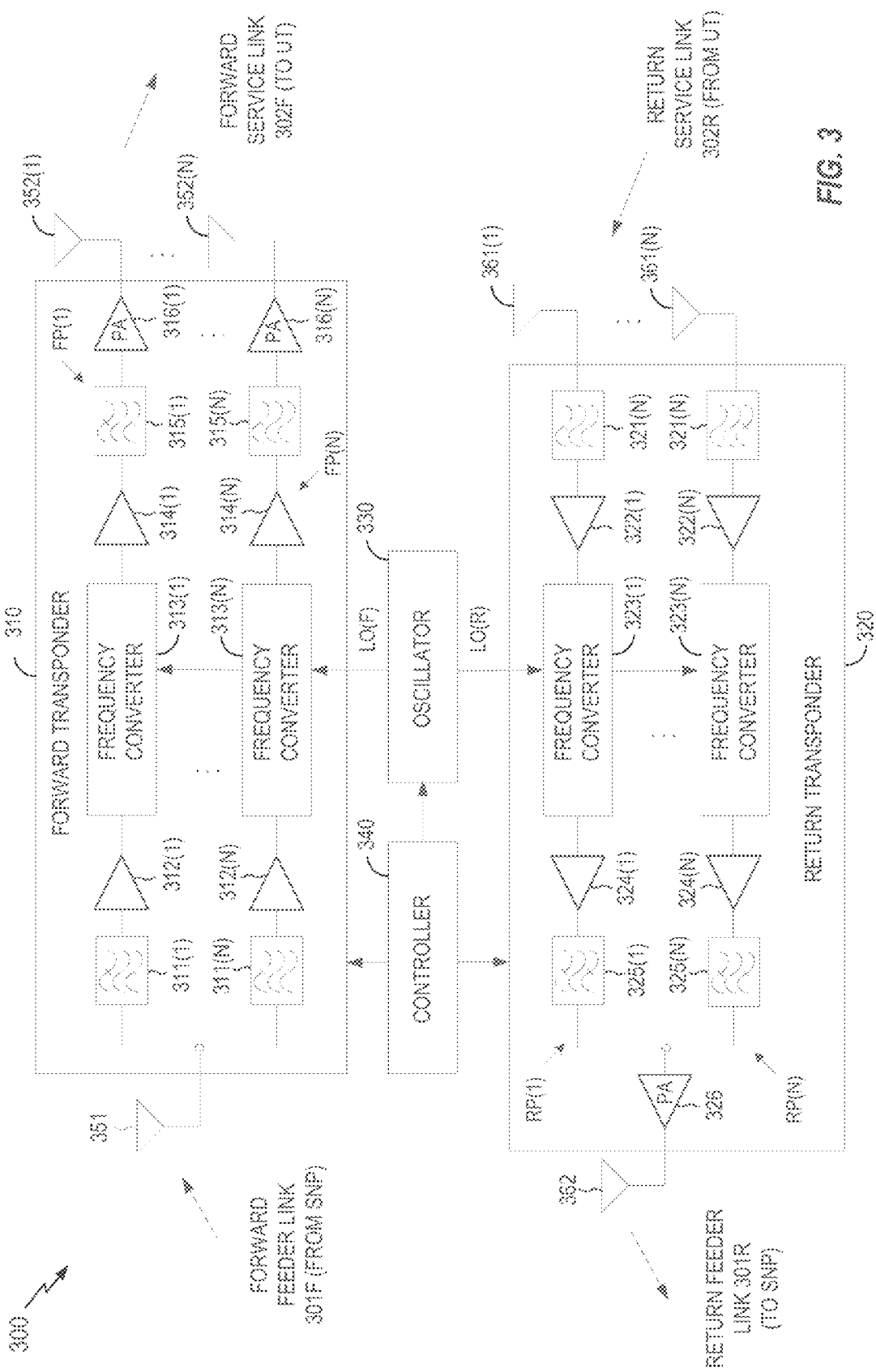
FIG. 3 is a block diagram of one example of a satellite of FIG. 1 in accordance with some aspects of the disclosure.

FIG. 3 is an example block diagram of the satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the SNP 200 and the UT 400. It will be appreciated that the disclosure is not limited to any specific satellite configuration and any satellite or combinations of satellites that can provide the functional connection between the SNP 200 and UT 400 can be considered within the scope of the disclosure. In one example, the satellite 300 is shown to include a forward transponder 310, a return transponder 320, an oscillator 330, a controller 340, forward link antennas 351 and 352(1)-352(N), and return link antennas 362 and 361(1)-361(N). The forward transponder 310, which may process communication signals within a corresponding channel or frequency band, may include a respective one of first bandpass filters 311(1)-311(N), a respective one of first low noise amplifiers (LNAs) 312(1)-312(N), a respective one of frequency converters 313(1)-313(N), a respective one of second LNAs 314(1)-314(N), a respective one of second bandpass filters 315(1)-315(N), and a respective one of power amplifiers (PAs) 316(1)-316(N). Each of the PAs 316(1)-316(N) is coupled to a respective one of antennas 352(1)-352(N), as shown in FIG. 3.

Within each of respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from the satellite 300 to the UT 400). The second LNA 314 amplifies the frequency-converted communication signals, and the second bandpass filter 315 filters signal components having frequencies outside of the associated channel width. The PA 316 amplifies the filtered signals to a power level suitable for transmission to the UTs 400 via a respective antenna 352. The return transponder 320, which includes a number N of return paths RP(1)-RP(N), receives communication signals from the UT 400 along the return service link 302R via the antennas 361(1)-361(N), and transmits communication signals to the SNP 200 along the return feeder link 301R via one or more of the antennas 362. Each of the return paths RP(1)-RP(N), which may process communication signals within a corresponding channel or frequency band, may be coupled to a respective one of the antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from the satellite 300 to the SNP 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the SNP 200.

The oscillator 330, which may be any suitable circuit or device that generates an oscillating signal, provides a forward local oscillator signal LO(F) to the frequency converters 313(1)-313(N) of the forward transponder 310, and provides a return local oscillator signal LO(R) to the frequency converters 323(1)-323(N) of the return transponder 320. For example, the LO(F) signal may be used by the frequency converters 313(1)-313(N) to convert communication signals from a frequency band associated with the transmission of signals from the SNP 200 to the satellite 300 to a frequency band associated with the transmission of signals from the satellite 300 to the UT 400. The LO(R) signal may be used by the frequency converters 323(1)-323(N) to convert communication signals from a frequency band associated with the transmission of signals from the UT 400 to the satellite 300 to a frequency band associated with the transmission of signals from the satellite 300 to the SNP 200.

The controller 340, which is coupled to the forward transponder 310, the return transponder 320, and the oscillator 330, may control various operations of the satellite 300 including (but not limited to) channel allocations. In one aspect, the controller 340 may include a memory (not shown) coupled to a processing circuit (e.g., a processor). The memory may include a non-transitory computer-readable medium (e.g., one or more nonvolatile memory elements, such as an EPROM, an EEPROM, a Flash memory, a hard drive, etc.) storing instructions that, when executed by the processing circuit, cause the satellite 300 to perform operations including (but not limited to) those described herein.

Figure 4:
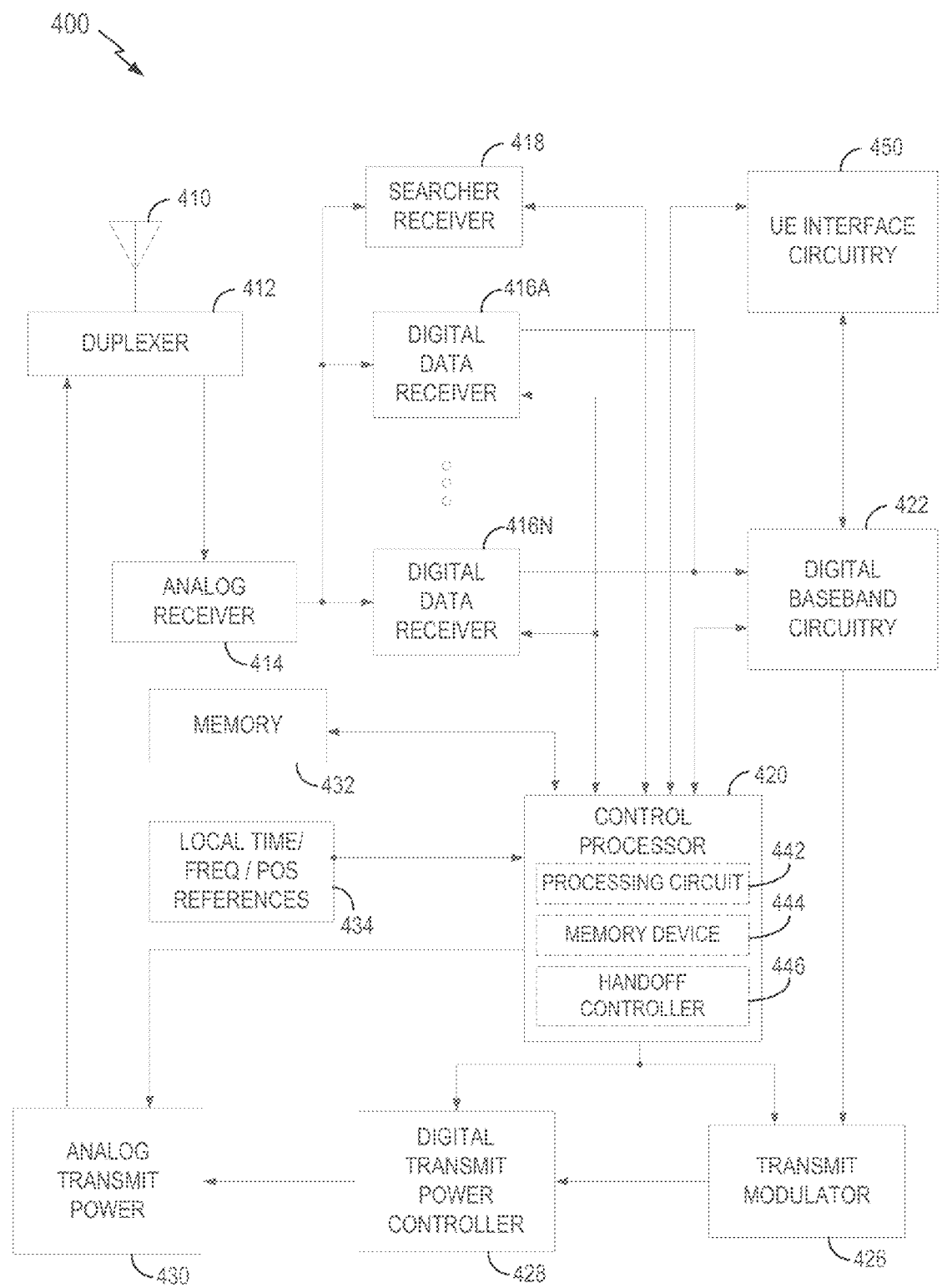
FIG. 4 is a block diagram of one example of a user terminal of FIG. 1 in accordance with some aspects of the disclosure.

An example of a transceiver for use in the UT 400 or the UT 401 is illustrated in FIG. 4. In FIG. 4, at least one antenna 410 is provided for receiving forward link communication signals (e.g., from the satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers (e.g., as represented by a digital data receiver 416N) can be used to obtain desired levels of signal diversity, depending on the acceptable level of transceiver complexity, as would be apparent to one skilled in the relevant art.

At least one user terminal control processor 420 is coupled to the digital data receivers 416A-416N and the searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of the digital data receivers 416A-416N are coupled to digital baseband circuitry 422 within the UT 400. The digital baseband circuitry 422 includes processing and presentation elements used to transfer information to and from the UE 500 as shown in FIG. 1, for example. Referring to FIG. 4, if diversity signal processing is employed, the digital baseband circuitry 422 may include a diversity combiner and decoder (not shown). Some of these elements may also operate under the control of, or in communication with, a control processor 420.

When voice or other data is prepared as an output message or a communication signal originating with the UT 400, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., the satellite 300).

In FIG. 4, the UT transceiver also includes a memory 432 associated with the control processor 420. The memory 432 may include instructions for execution by the control processor 420 as well as data for processing by the control processor 420. In the example illustrated in FIG. 4, the memory 432 may include instructions for performing time or frequency adjustments to be applied to an RF signal to be transmitted by the UT 400 via the return service link to the satellite 300.

In the example illustrated in FIG. 4, the UT 400 also includes optional local time, frequency and/or position references 434 (e.g., a GPS receiver), which may provide local time, frequency and/or position information to the control processor 420 for various applications, including, for example, time or frequency synchronization for the UT 400.

The digital data receivers 416A-416N and the searcher receiver 418 are configured with signal correlation elements to demodulate and track specific signals. The searcher receiver 418 is used to search for pilot signals, or other relatively fixed pattern strong signals, while the digital data receivers 416A-416N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to the control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element (e.g., the memory 432) as desired.

The control processor 420 may also be coupled to the UE interface circuitry 450 to allow communication between the UT 400 and one or more UEs. The UE interface circuitry 450 may be configured as desired for communication with various UE configurations and accordingly may include various transceivers and related components depending on the various communication technologies employed to communicate with the various UEs supported. For example, the UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with the UT 400.

The control processor 420 may include one or more of a processing circuit 442, a memory device 444, or a handoff controller 446 that independently or cooperatively perform handoff-related operations for the UT 400 as taught herein. In an example implementation, the processing circuit 442 is configured (e.g., programmed) to perform some or all of these operations. In another example implementation, the processing circuit 442 (e.g., in the form of a processor) executes code stored in the memory device 444 to perform some or all of these operations. In another example implementation, the handoff controller 446 is configured (e.g., programmed) to perform some or all of these operations. Although depicted in FIG. 4 as included within the control processor 420, for other implementations, one or more of the processing circuit 442, the memory device 444, or the handoff controller 446 may be a separate subsystem that is coupled to the control processor 420.

Figure 5:
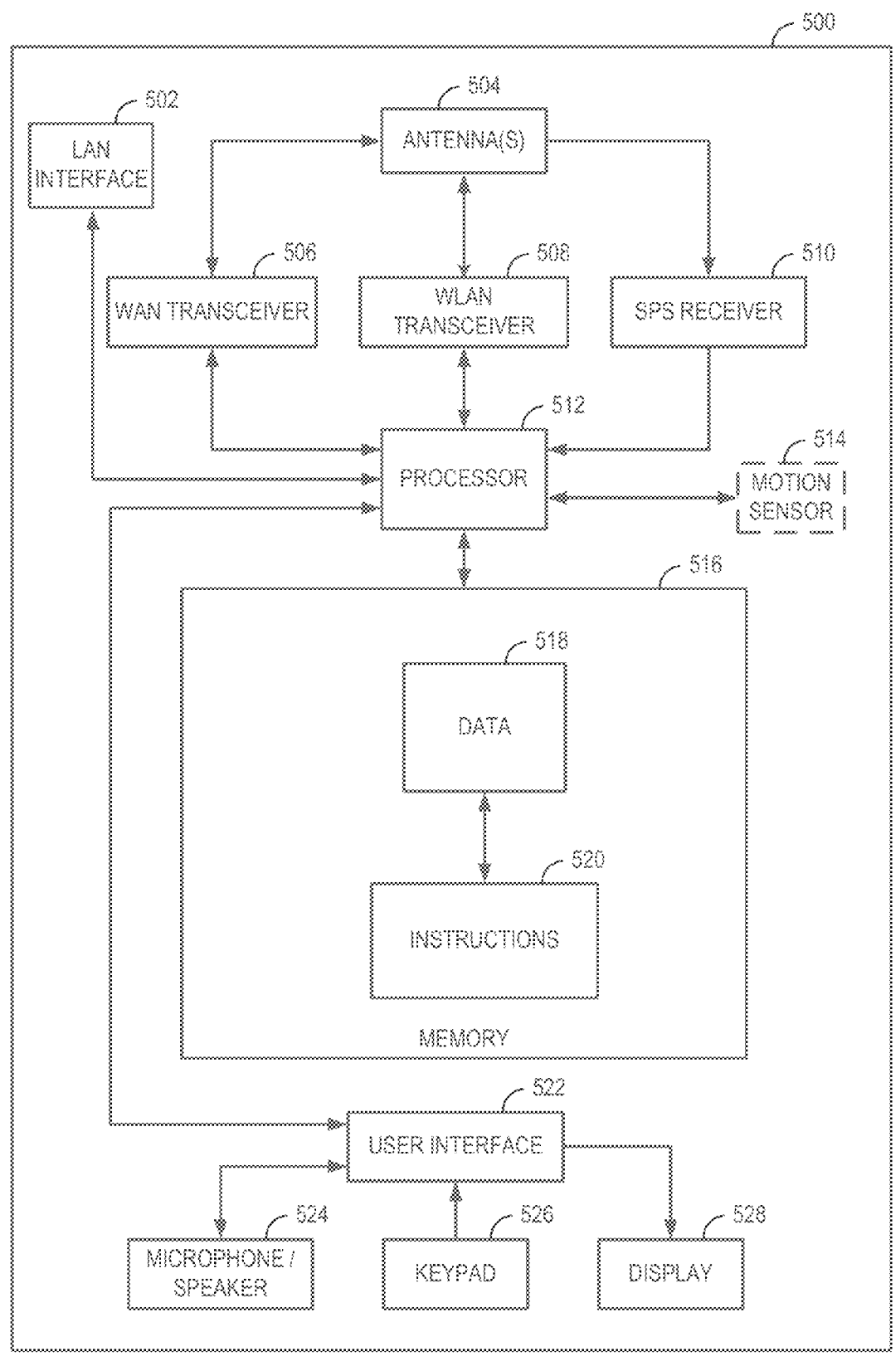
FIG. 5 is a block diagram of one example of a user equipment of FIG. 1 in accordance with some aspects of the disclosure.

FIG. 5 is a block diagram illustrating an example of the UE 500, which also can apply to the UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various ultimate end user devices and/or to various public or private networks. In the example shown in FIG. 5, the UE 500 may include a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, the WAN transceiver 506, and/or the SPS receiver 510, for example. Further, the UE 500 may include additional transceivers such as Bluetooth, ZigBee and other known technologies, with or without the LAN interface 502, the WAN transceiver 506, the WLAN transceiver 508 and/or the SPS receiver 510. Accordingly, the elements illustrated for the UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510.

Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

In the example shown in FIG. 1, the two UTs 400 and 401 may conduct two-way communication with the satellite 300 via return and forward service links within a cell coverage. A satellite may communicate with more than two UTs within a cell coverage. The return service link from the UTs 400 and 401 to the satellite 300 may thus be a many-to-one channel. Some of the UTs may be mobile while others may be stationary, for example. In a satellite communication system such as the example illustrated in FIG. 1, multiple UTs 400 and 401 within a cell coverage may be time-division-multiplexed (TDM'ed), frequency-division-multiplexed (FDM'ed), or both.

UT Handoff

At some point in time, a UT may need to be handed-off to another satellite (not shown in FIG. 1). Handoff may be caused by scheduled events or unscheduled events.

Several examples of handoff due to scheduled events follow. Inter-cell and inter-satellite handoff may be caused by movement of the satellite, movement of the UT, or a satellite cell being turned off (e.g., due to a Geo-stationary satellite (GEO) restriction). Handoff also may be due to a satellite moving out of the SNP's range while the satellite is still within the UT's line of sight.

Several examples of handoff due to nonscheduled events follow. Handoff may be triggered by a satellite being obscured by an obstacle (e.g., a tree). Handoff also may be triggered due to a drop in channel quality (e.g., signal quality) due to rain fade or other atmospheric conditions.

In some implementations, at a particular point in time, a particular satellite may be controlled by a particular entity (e.g., a network access controller, NAC) in an SNP. Thus, an SNP may have several NACs (e.g., implemented by the SNP controller 250 of FIG. 2), each of which controls a corresponding one of the satellites controlled by the SNP. In addition, a given satellite may support multiple cells. Thus, over time, different types of handoff may occur.

In inter-cell handoff, a UT is handed-off from one cell of a satellite to another cell of the satellite. For example, the particular cell serving a stationary UT may change over time as the serving satellite moves.

In inter-satellite handoff, a UT is handed-off from the current serving satellite (referred to as the source satellite) to another satellite (referred to as the target satellite). For example, a UT may be handed-off to the target satellite as the source satellite moves away from the UT and the target satellite moves toward the UT.

Figure 6:
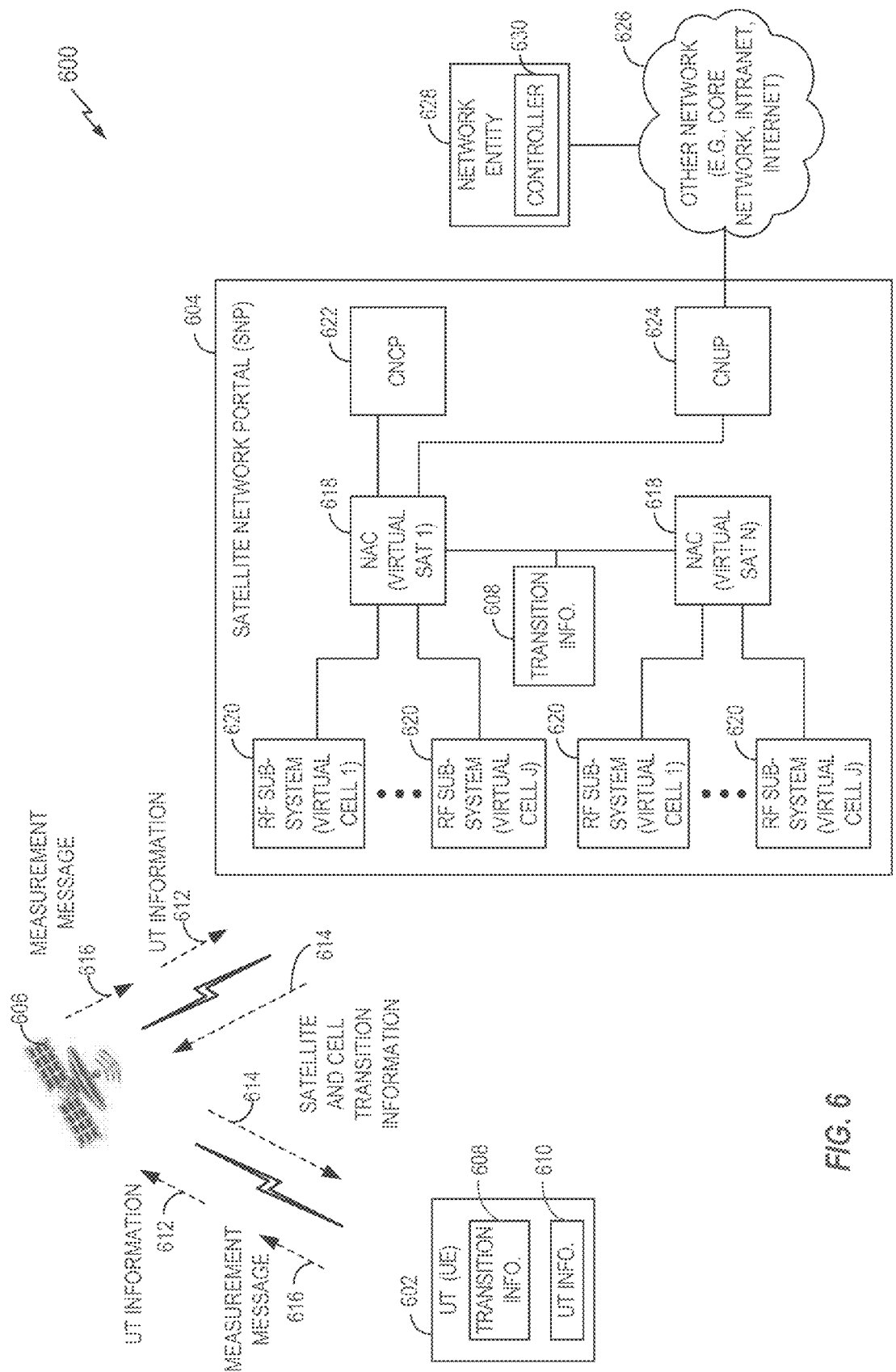
FIG. 6 is a block diagram of an example communication system in accordance with some aspects of the disclosure.

Referring to FIG. 6, various aspects of the disclosure relate to handoff of a user terminal (UT) 602 in communication with a satellite network portal (SNP) 604 via a satellite 606 in a satellite communication system 600. In some implementations, the system 600 may be a non-geosynchronous satellite communication system, such as a low-earth orbit (LEO) satellite communication system, for data, voice, video, or other communication. The UT 602 is an example of the UT 400 or the UT 401 of FIG. 1. The SNP 604 is an example of the SNP 200 or the SNP 201 of FIG. 1. The satellite 606 is an example of the satellite 300 of FIG. 1.

In some aspects, the SNP 604 and the UT 602 use satellite and cell transition information 608 to determine when to handoff the UT 602 from one cell to another and/or from one satellite to another. For example, the UT 602 may send UT information 610 (e.g., capability information, location information, or other information) to the SNP 604 via first signaling 612. Based on the information 610, the SNP 604 or some other entity generates the satellite and cell transition information 608 and sends the information 608 to the UT 602 via second signaling 614. Alternatively, or in addition, the SNP 604 or some other entity selects a handoff procedure for the UT 602 based on the information 610. In some aspects, handoff of the UT 602 to a different satellite (a new serving satellite) involves the UT 602 conducting satellite signal measurements and sending a measurement message 616 to the SNP 604. In some aspects, the SNP 604 generates new satellite and cell transition information (e.g., modifies a satellite and cell transition table) as a result of receiving the measurement message 616.

The UT 602 may perform other handoff-related operations in accordance with the teachings herein. In some aspects, the UT 602 may receive satellite ephemeris information via the SNP 604 and use the satellite ephemeris information to synchronize to a satellite (e.g., the satellite 606). In some aspects, the UT 602 invokes a radio link failure mode if the UT 602 loses connectivity to a satellite and/or cell.

In some aspects, a handoff design may attempt to meet one or more design objectives. Example of such objective include: minimize signaling during handoffs; minimize data outage during handoffs; or reduce reliance on the UT's knowledge of the satellite ephemeris data (e.g., instead relying on the SNP's knowledge of the satellite location and the UT location).

In the example of FIG. 6, the SNP 604 includes network access controllers (NACs) 618, each of which interfaces with one or more radio frequency (RF) subsystems 620 for communicating with the UT 602 and other UTs (not shown) via the satellite 606 (or some other satellite, not shown). The SNP 604 also includes a core network control plane (CNCP) 622 and a core network user plane (CNUP) 624, or other similar functionality (e.g., control and user plane functionality for other types of networks), for communicating with a network 626. The network 626 may represent, for example, one or more of a core network (e.g., 3G, 4G, 5G, etc.), an intranet, or the Internet.

In some implementations, the SNP 604 determines (e.g., receives or generates) the satellite and cell transition information 608. For example, an NAC 618 may generate satellite and cell transition information for all UTs under the control of the NAC 618 based on information (e.g., ephemeris information) received via the network 626 and information (e.g., configuration information and measurement messages) received from UTs. As another example, an NAC 618 may receive the satellite and cell transition information 608 for its UTs via the network 626 (e.g., from a network entity 628).

Other entities in the system could generate the satellite and cell transition information 608 as well. In some implementations, a controller 630 of the network entity 628 may generate the satellite and cell transition information 608 and send the satellite and cell transition information 608 to control components of the system 600 (e.g., during system startup and/or at other times). For example, the network entity 628 may transmit the satellite and cell transition information 608 to the SNP 604 via the network 626 (e.g., a core network, an intranet, or the Internet) or some other data transfer mechanism. For purposes of illustration, the network entity 628 is depicted as being outside of the network 626. However, the network entity 628 could be part of the network 626.

Several example aspects of a UT, an SNP, or a satellite that may be used in conjunction with handoff of a UT in accordance with the teachings herein will now be described. These aspects may include, for a given one of these satellite system components, one or more of: a parameter or other information used by the component, a parameter assigned to the component, a characteristic (e.g., capability) of the component, signaling used by the component, or an operation performed by the component.

Satellite ID

A Satellite Identifier (ID) is a unique ID of a particular satellite within a satellite system. The Satellite ID allows the satellite to be uniquely identified within the satellite system (e.g., by a UT). To allow for a large satellite deployment, A Satellite ID could be 16 bits or more. In some implementations, the Satellite ID is transmitted on an overhead channel and is not required to be read immediately by the UT. The UT and the SNP may use a Satellite ID to index an ephemeris information table to locate the satellite and the projections of the satellite's cells on the earth at a given time.

Cell or Beam ID

A Cell ID is a unique ID for a cell. Similarly, a Beam ID is a unique ID for a beam. For convenience, the term cell/beam may be used herein to indicate a cell and/or a beam. The Cell/Beam ID allows a cell/beam from a given satellite to be uniquely identified (e.g., by a UT). In some aspects, a Cell/Beam ID may be detectable by a UT in a very short period of time (e.g., the Cell/Beam ID may be a continuous signature used on the pilot of the cell/beam). Thus, a UT might not need to decode an overhead message to discover a Cell/Beam ID. In one non-limiting example, a Cell/Beam ID could include 10 bits: 2 bits for an SNP ID (e.g., 2 bits may be sufficient to have a unique SNP visible by a UT; and the 4 values for the SNP ID could be reused across the globe); and 8 bits for the cell/beam commanded by an SNP (e.g., an SNP controls approximately 10 satellites×16 beams/satellite=160 beams/SNP=>8 bits to uniquely identify the cells/beams). A different number of bits could be used in other implementations. Also, spatial diversity of the satellites could be taken into consideration to reduce the number of bits.

UT Capabilities

A UT may exchange its capabilities with the SNP at connection time or some other time. Several non-limiting example of UT capabilities follow.

A UT may be dual cell/beam sense capable. Thus, one UT capability parameter (e.g., that takes a value of YES or NO) may indicate whether the UT is capable of sensing more than one cell/beam. For example, this capability parameter may indicate, while the UT is actively communicating using a cell/beam of a particular satellite, whether the UT can sense and detect a Cell/Beam ID of another cell/beam of the same satellite. In some implementations, this capability parameter can be used to indicate whether a UT can support two cells/beams at the same time. A different number of cells/beams (e.g., three or more) could be supported in other implementations.

A UT may be dual satellite sense capable. Thus, another UT capability parameter (e.g., that takes a value of YES or NO) may indicate whether the UT is capable of sensing more than one satellite. For example, this capability parameter may indicate, while the UT is actively communicating using a cell/beam of a particular satellite, whether the UT can sense and detect a Cell/Beam ID of another satellite. In some implementations, this capability parameter can be used to indicate whether a UT can support two satellites at the same time. A different number of satellites (e.g., three or more) could be supported in other implementations.

As discussed in more detail below, an SNP may use the sense capability of a UT to determine what type of handoff to use for the UT. For example, if a UT can only support a single cell/beam at a time, handoff could simply be based on the satellite and cell transition table. Conversely, if a UT can support multiple cells/beams/satellites at a time, an SNP could monitor for a measurement message from a UT during handoff, whereby the measurement message may affect how (e.g., when and/or where) the UT is handed-off.

Another UT capability parameter may indicate the inter-cell tune time and/or inter-beam tune time (e.g., in microseconds (μsec)) for a UT. For convenience, the term inter-cell/beam tune time may be used to refer to the inter-cell tune time and/or the inter-beam tune time. This UT capability parameter may indicate the time duration it takes for the UT to stop listening to a cell/beam and start listening to another cell/beam of the same satellite. Thus, in some aspects, the inter-cell/beam tune time indicates how long it takes a UT to tune from one cell/beam to another cell/beam.

Another UT capability parameter may indicate the inter-satellite tune time (e.g., in microseconds (μsec)) for a UT. This UT capability parameter may indicate the time duration it takes for the UT to stop listening to a cell/beam on the current satellite and start listening to a cell/beam of another satellite. Thus, in some aspects, the inter-satellite tune time indicates how long it takes a UT to tune from one satellite to another satellite.

In some implementations, a tune time may be given as an upper bound. For example, a tune time may indicate the maximum amount of time that the UT is expected to take to tune from one cell/beam or satellite to another.

In some implementations, a tune time may be described according to a formula. A non-limiting example of such a formula is: $a+b*\tau$ where, a is a constant that indicates the minimum time duration for the inter-satellite tuning, $\tau$ is the angular distance (in degrees) between the current satellite and the target satellite, and b is the movement speed of the UT's antenna in degrees of movement per millisecond.

Tune-Away Definitions

Signaling may be employed to allow a UT to tune-away for inter-satellite and inter-cell/beam sensing. This signaling can be used to define tune-away periods for a UT to sense other cells/beams of the same satellite or other satellites.

UT Location

A UT location reporting mechanism is employed for handoff processing and paging so that the SNP will know the location of the UT (e.g., on a continual or regular basis). In some implementations, a UT will have reliable global positioning system (GPS) positioning.

For stationary UTs, the UT location reporting mechanism may involve the UT sending a signaling message to the SNP that reports the location (e.g., the GPS coordinates) of the UT.

For mobile UTs (e.g., UTs on a ship or an airplane), the UT location reporting mechanism may involve the UT sending a signaling message to the SNP that reports the speed and direction of the UT. This allows the SNP to continuously estimate the location of the UT. Even for mobile UTs, the direction and speed information may be relatively stable if the UTs are carried by (e.g., attached to) relatively large vessels.

Also, via location-related signaling, the UT may be informed of the location drift allowed before a new location update message is needed.

Some implementations may employ thresholds for location tolerance. Some implementations may employ GEO fencing. For example, if a UT is beyond a designated boundary relative to a satellite and/or an SNP (e.g., the UT is a certain distance away), the UT may be configured to send a location update to the SNP.

Ephemeris Transfer and Update Signaling

Ephemeris Transfer and Update signaling messages may be used to transfer satellite ephemeris data to the UTs. In some aspects, ephemeris data includes a geographic description of where a given satellite is at a given point in time. This data may be used by the UT when it searches for the next satellite and cell/beam (e.g., after the UT detects a radio link failure). For example, in some aspects, a UT may use the ephemeris data for a given satellite to determine where to point the UT's antenna (antennas) at a given point in time. In some aspects, an SNP may transmit a signaling message containing the satellite ephemeris data to all connected UTs (e.g., whenever there is an update). In some aspects, a UT may request satellite ephemeris data from the SNP (e.g., when the UT establishes a connection).

Satellite and Cell Transition Tables

Each satellite beam may be regarded as a separate cell with its own data and control channels, and signals. The SNP or some other entity may generate a satellite and cell transition table that provides a list of satellites to which a UT may choose to handoff next. The transition table also may dictate exactly at what time the UT will switch over from one cell (e.g., corresponding to a beam and/or an RF band) of the next satellite to another. A transition table may indicate, for a number of satellites, the cells (e.g., the beams and/or the bands) to be used for each satellite. A transition table may indicate, for each cell (e.g., beam), the frequency (e.g., the nominal radio frequency or frequency band) of the cell. A transition table may also indicate the Cell ID of each Cell (or Beam ID of each beam).

An SNP may define a satellite and cell transition table based on various information. In some aspects, an SNP may define the table using the location (and speed and direction, if specified) of the UT. In some aspects, an SNP may define the table using satellite locations over time calculated from ephemeris data. In some aspects, an SNP may define the table based on information regarding whether certain cells/beams and/or satellites are turned off at certain times.

Table 1 below is one example of a satellite and cell transition table. The entries for this table include Satellite IDs, Beam IDs, Beam Frequencies (Freq), Start Times, and End Time. This table could also be referred to as a satellite and beam transition table. $TA_{beam}$ denotes the tune-away time from one beam to another of the same satellite. In this example, the UT is to tune to Satellite 1, Beam 1 (on frequency $F_{11}$) from time $a_1$ to time $b_1$. The UT is to then tune to Satellite 1, Beam 2 (on frequency $F_{21}$) from time $b_1+TA_{beam}$ to time $c_1$, and so on.

In some implementations, the table may be sent in a signaling message by the SNP to the UT it is serving, at any time before the UT is handed-off to the next satellite.

TABLE 1

| Satellite ID | Beam ID | Freq. | Start Time (e.g., Frame Number) | End Time (e.g., Frame Number) |
|---|---|---|---|---|
| Satellite 1 | Beam 1 | $F_{11}$ | $a_1$ | $b_1$ |
|  | Beam 2 | $F_{21}$ | $b_1 + TA_{beam}$ | $c_1$ |
|  | ... | ... | ... | ... |
|  | Beam N | $F_{N1}$ | $m_1 + TA_{beam}$ | $n_1$ |
| Satellite 2 | Beam 1 | $F_{12}$ | $a_2$ | $b_2$ |
|  | Beam 2 | $F_{22}$ | $b_2 + TA_{beam}$ | $c_2$ |
|  | ... | ... | ... | ... |
|  | Beam N | $F_{N2}$ | $m_2 + TA_{beam}$ | $n_2$ |
| ... | ... | ... | ... | ... |

In one example, the overhead of the satellite and cell transition table message is as follows (assuming that there are two satellites listed in the table): Satellite ID=16 bits; Beam ID=10 bits; Freq.=4 bits (assuming 16 beam frequencies per satellite); and Start and End Times=15 bits.

The Start Time and the End Time can be specified in terms of Frame Numbers. The physical layer may specify the use of 10 millisecond (ms) transmission frames for the system. Assuming that a satellite handoff takes place every 3 minutes, the number of frames that can be transmitted between handoffs is 18,000. Frame Numbers can be re-initialized from zero after every handoff. The number of bits that are then required to specify the Frame Numbers is thus 15 bits in this example.

In the above example, the total overhead of the message would be 1020 bits=128 bytes (approximately). The values of $a_1, b_1, \ldots, n_1, TA_{beam}$ would be specified.

If a maximum of 1000 active users can be served at any time by one beam, and if a beam overall downlink (DL) throughput is approximately 300 Mbps, the overhead is given by: overhead=(128 bytes×numUsersBeam)/(total bytes delivered by beam over 3 minutes)=(128 bytes×1000)/ $(300×10^6×3×60)=19×10^{-6}$ (approximately).

Table 2 below is another example of a satellite and cell transition table. SatelliteID is a unique ID assigned to a satellite in the system. The forward link (FL) Band is a positive integer index that identifies a transmission frequency band of the FL. The return link (RL) Band is a positive integer index that identifies a transmission frequency band of the RL.

Handoff Activation Time specifies the time when a UT should stop transmitting and receiving. In some implementations, this time is specified in the source cell in units of System Frame Numbers (SFNs). SFNs may be, for example, sequence numbers assigned to 10 ms physical layer transmission radio frames. The UT stops transmitting and receiving at the beginning of the SFN. For example, if the Handoff Activation Time is specified to be at the SFN 5, then the UT stops transmitting or receiving at sub-frame 0 of the SFN 5.

TABLE 2

| SatelliteID | FL Band | RL Band | ... | RL Band | Handoff Activation Time (e.g., SFN) |
|---|---|---|---|---|---|
| Satellite 1 | $F_1$ | $R_{11}$ | ... | $R_{1M}$ | $a_1$ |
|  | $F_2$ | $R_{21}$ | ... | $R_{2M}$ | $a_2$ |
|  | ... | ... | ... | ... | ... |
|  | $F_{16}$ | $R_{16,1}$ | ... | $R_{16,M}$ | $a_{16}$ |
| Satellite 2 | ... | ... | ... | ... | ... |
|  | ... | ... | ... | ... | ... |
|  | ... | ... | ... | ... | ... |

The UT starts transmitting or receiving in the target cell at the Handoff Activation Time plus a tune-away time. Two examples of UT parameters related to the tune-away time are an inter-cell tune-away time and an inter-satellite tune-away time. These parameters may be included in the UT Capability information.

Inter-Satellite Handoff

Figure 7:
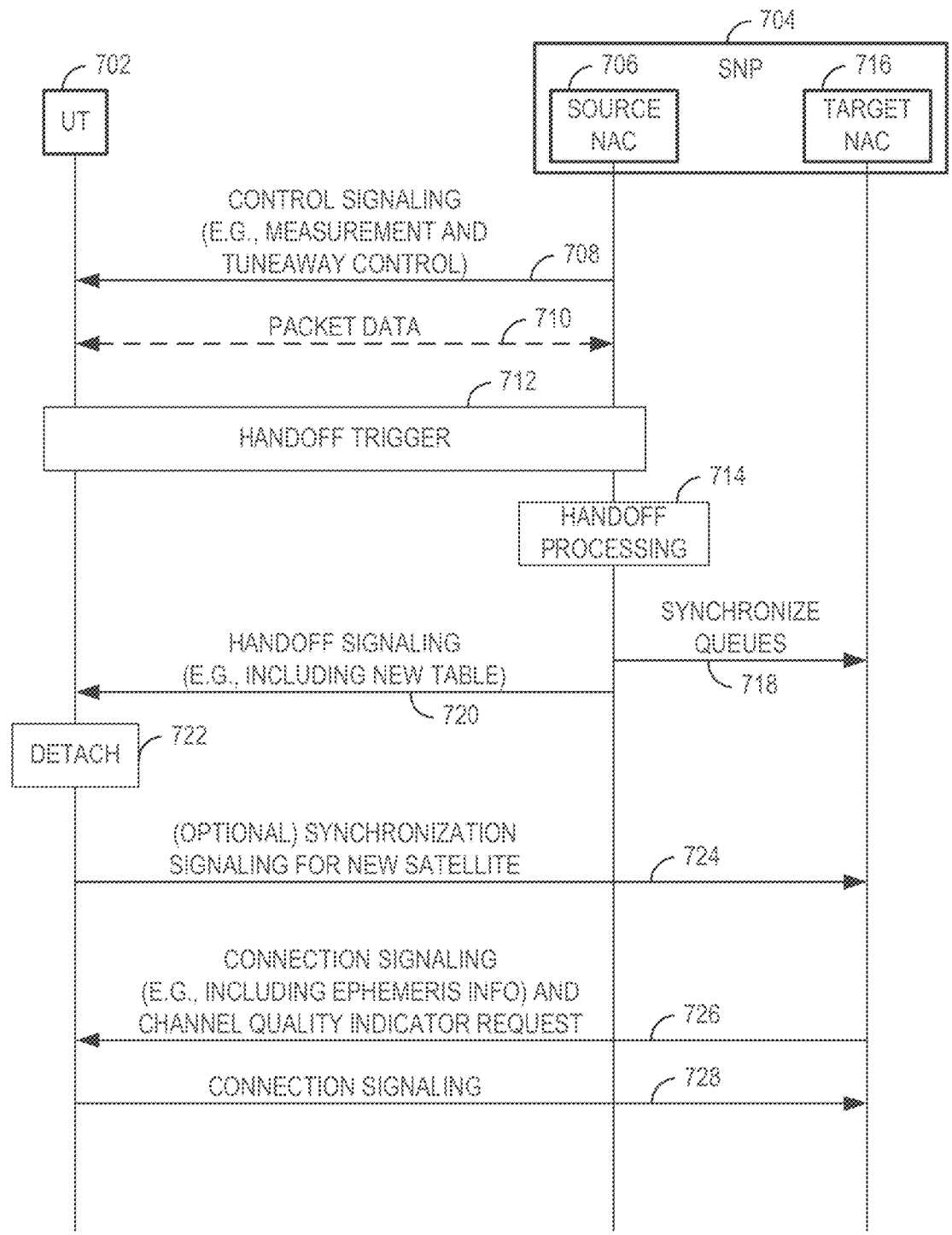
FIG. 7 is a diagram illustrating an example of inter-satellite handoff signaling in accordance with some aspects of the disclosure.
Figure 8:
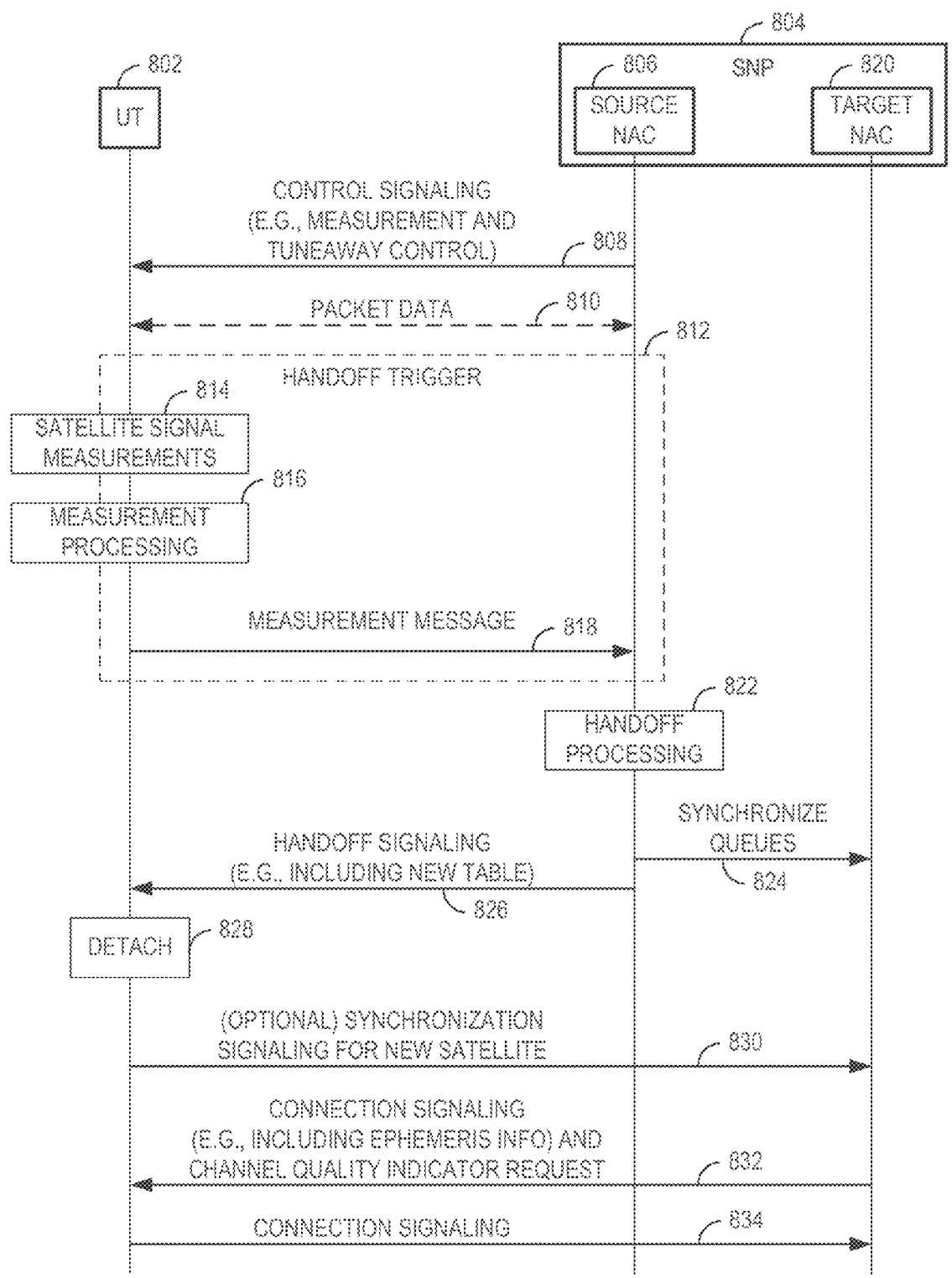
FIG. 8 is a diagram illustrating another example of inter-satellite handoff signaling in accordance with some aspects of the disclosure.

FIGS. 7 and 8 illustrate examples of inter-satellite handoff. In these examples, the SNP includes a source NAC that controls a first satellite and a target NAC that controls a second satellite. In each case, the UT initially is connected to a source satellite (and, hence, the source NAC) and is subsequently handed-off to a target satellite (and, hence, the target NAC). A different number of NACs and satellites could be supported in other implementations. Also, in some implementations, a common (e.g., the same) entity could support multiple satellites.

FIG. 7 is an example where a UT 702 does not send a measurement message. For example, the UT 702 might not support the sensing of multiple cell/beams and/or satellites or the UT 702 may determine that a measurement message need not be sent to an SNP 704. In this case, the UT 702 and the SNP 704 rely on the existing satellite and cell transition table to determine when to transition to the next cell/beam and/or satellite and where to transition (e.g., which cell/beam, which frequency, which satellite). The UT 702 is an example of the UT 400 or the UT 401 of FIG. 1. The SNP 704 is an example of the SNP 200 or the SNP 201 of FIG. 1.

A source NAC 706 sends control signaling 708 to the UT 702. This control signaling 708 may include, for example, measurement information and tune-away control information (e.g., tune-away definitions). In addition, packet data 710 is exchanged between the UT 702 and the source NAC 706. The source NAC 706 is an example of the NAC 612 of FIG. 6.

At some point in time a handoff is triggered 712. For example, the current time may correspond to the time for a transition from one satellite to the next indicated by the satellite and cell transition table.

Other handoff triggers may be employed as well. For example, the SNP 704 (e.g., the source NAC 706) may decide autonomously that the UT 702 needs to be handed-off. Such a trigger may be due to, for example: the current serving satellite is moving out of range of the UT 702; the satellite is moving out of the range of the SNP 704, even if it may be within the range of the UT 702; or the cell/beam serving the UT 702 will be blacked-out due to GEO requirements.

In the event the UT 702 is capable of sensing another cell/beam and/or satellite while connected to the first satellite, the UT 702 may search the signal strength of the default satellite and cell/beam for handoff. It may be assumed that the UT 702 has the location information of this satellite in order to do so. This location information can be obtained from the satellite ephemeris data the UT 702 possesses. If the signal strength is satisfactory, the UT 702 does nothing and waits for the source NAC 706 to start the inter-satellite handoff process.

Thus, in the example of FIG. 7, both the UT 702 and the source NAC 706 will follow the table and commence the handoff to a new serving satellite. To this end, the source NAC 706 will perform handoff processing 714. For example, the source NAC 706 may communicate with a target NAC 716 to commence the handoff. In some aspects, this may involve synchronizing the queues 718 (e.g., packet traffic queues) between the NACs 706 and 716. Also, as the time of the handoff is known ahead of time, the user queues can be transferred ahead of time. The target NAC 716 is an example of the NAC 612 of FIG. 6.

The source NAC 706 then sends handoff signaling 720 to the UT 702. In some aspects, this handoff signaling 720 may include information that enables the UT 702 to communicate with the target NAC 716. In some aspects, this handoff signaling 720 may include a new satellite and cell transition table (e.g., that the source NAC 706 received from the target NAC 716).

The UT 702 then detaches 722 from the first satellite and synchronizes to the second satellite. To this end, the UT 702 may send synchronization signaling 724 for the second satellite to the target NAC 716. In some aspects, this may involve the UT 702 performing a random access procedure at the second satellite.

The UT 702 and the target NAC 716 may then exchange connection signaling 726 and 728. In some aspects, this may involve the target NAC 716 sending ephemeris information to the UT 702 and requesting a channel quality indicator from the UT 702. In some aspects, the UT 702 may use the ephemeris information to synchronize with the second satellite.

Also, the various entities may perform various background operations to ensure that packet forwarding is done properly and any needed clean-up (e.g., cache clean-up) is performed.

FIG. 8 is an example where a UT 802 does send a measurement message. For example, the UT 802 might determine that a measurement message needs to be sent to an SNP 804 because the measured channel conditions (e.g., signal strength) from the serving satellite or the target satellite are unacceptable (e.g., the signal strength is too low). In this case, the SNP 804 may generate a new satellite and cell transition table based on the measurement message. The UT 802 and the SNP 804 will then use the new satellite and cell transition table to determine when to transition to the next cell/beam and/or satellite and where to transition (e.g., which cell/beam, which frequency, which satellite). The UT 802 is an example of the UT 400 or the UT 401 of FIG. 1. The SNP 804 is an example of the SNP 200 or the SNP 201 of FIG. 1.

As in FIG. 7, a source NAC 806 sends control signaling 808 to the UT 802. This control signaling 808 may include, for example, measurement information and tune-away control information (e.g., tune-away definitions). In addition, packet data 810 is exchanged between the UT 802 and the source NAC 806. The source NAC 806 is an example of the NAC 612 of FIG. 6.

At some point in time a handoff is triggered 812. In some cases, the current time corresponding to the time for a transition from one satellite to the next as indicated by the satellite and cell transition table constitutes a handoff trigger. In some cases, a measurement message sent by the UT 802 indicating that a neighbor satellite is materially stronger (e.g., associated with a stronger received signal strength) than a current serving satellite may constitute a handoff trigger.

Other handoff triggers may be employed as well. For example, the SNP 804 (e.g., the source NAC 806) may decide autonomously that the UT 802 needs to be handed-off. Such a trigger may be due to, for example: the current serving satellite is moving out of range of the UT 802; the satellite is moving out of the range of the SNP 804, even if it may be within the range of the UT 802; or the cell/beam serving the UT 802 will be blacked-out due to GEO requirements.

In the example of FIG. 8, the UT 802 is capable of sensing another cell/beam and/or satellite while connected to the first satellite. Thus, the UT 802 may perform channel quality measurements (e.g., satellite signal strength measurements). For example, the UT 802 may measure 814 the signal strength from the current serving satellite (first satellite) and the target satellite (second satellite).

The UT 802 then performs measurement processing 816 to determine, for example, whether either channel quality is inadequate (e.g., signal strength is too low). In the event either channel quality is inadequate, the UT 802 may elect to send a measurement message 818 to the source NAC 806. This measurement message 818 may include, for example, the results of the measurements (e.g., signal strength in dB), an indication that the handoff time needs to be advanced (e.g., because the signal from the source satellite is currently too low), an indication that the handoff time needs to be delayed (e.g., because the signal from the target satellite is currently too low), or some other indication.

Thus, similar to FIG. 7, the UT 802 may search the signal strength of the default satellite and cell/beam for handoff. Again, it may be assumed that the UT 802 has the location information of this satellite in order to do so (e.g., obtained from the satellite ephemeris data the UT 802 possesses). If the signal strength is not satisfactory, the UT 802 may send a measurement message 818 to the source NAC 806 indicating a satellite different from the default one, to trigger the handoff process early or delay it.

The source NAC 806 may thus make a decision to handoff the UT 802 to a target satellite and a target NAC 820 based on the satellite and cell transition table and on any measurement message 818 the source NAC 806 receives from the UT 802. Thus, as indicated in FIG. 8, the source NAC 806 will perform some handoff processing 822. For example, the source NAC 806 may decide, based on the measurement message 818, whether the handoff time needs to be advanced (early handoff) or delayed (late handoff), or whether some other satellite should be selected as the target. In addition, the source NAC 806 may communicate with a target NAC 820 to commence the handoff. In some aspects, this may involve synchronizing the queues 824 (e.g., packet traffic queues) between the NACs 806 and 820. The target NAC 820 is an example of the NAC 612 of FIG. 6.

The source NAC 806 then sends handoff signaling 826 to the UT 802. In some aspects, this handoff signaling 826 may include information that enables the UT 802 to communicate with the target NAC 820. In some aspects, this handoff signaling 826 may include a new satellite and cell transition table (e.g., that the source NAC 806 received from the target NAC 820).

The UT 802 then detaches 828 from the first satellite and synchronizes to the second satellite. To this end, the UT 802 may send synchronization signaling 830 for the second satellite to the target NAC 820.

The UT 802 and the target NAC 820 may then exchange connection signaling 832 and 834. In some aspects, this may involve the target NAC 820 sending ephemeris information to the UT 802 and requesting a channel quality indicator from the UT 802. Again, the various entities may perform various background operations to ensure that packet forwarding is done properly and any needed clean-up (e.g., cache clean-up) is performed.

With normal inter-satellite handoff, hybrid automatic repeat request (HARQ) processes may be terminated. However, the source NAC may know exactly when the handoff will happen, therefore the source NAC can ensure that the forward link data buffers are drained. Also, the gap for data flow can be minimized since the time of handoff is known.

Inter-Beam Handoff

Inter-cell/beam handoff is executed by the SNP and the UT synchronously according to the timeline specified in the satellite and cell transition table. Using the tune-away periods or dual receive capability, the UT detects the presence of the next cell/beam specified in the satellite and cell transition table. If the UT detects the next cell/beam successfully, a normal inter-cell/beam handoff is executed without any signaling between the UT and the SNP.

With normal inter-cell/beam handoff, forward link HARQ processes may be carried over from one cell/beam to the next. In addition, reverse assignments may be cancelled as the UT hands-off from one cell/beam to the next. For example, the UT may instead send new request messages to send reverse link data.

Exception Scenarios

If the UT loses the current serving cell/beam before the expiration of the specified time in the satellite and cell transition table, the UT enters into radio link failure (RLF) mode. In RLF mode, the UT may attempt to find an alternate cell/beam or satellite (e.g., based on the ephemeris information at the UT). For example, the UT may attempt to connect to the next satellite that should be serving the UT. If the UT successfully establishes another connection, the UT can send signaling messages to the SNP to continue communication where the UT left off before the RLF.

While being served by a cell/beam, the UT may fail to detect the next cell/beam specified in the satellite and cell transition table, but may detect another cell/beam. This may happen, for example, to a fast moving UT (e.g., a UT attached to an airplane). In this case, the UT may send a measurement message to initiate another handoff procedure. In addition, the UT may also send a position update if it has moved since the last time a position update was sent. In response, the SNP may send an updated satellite and cell transition table. In this case, the UT follows the updated table. Alternatively, the SNP may start a completely new handoff process.

Example Connected Mode Handoff Details

Referring now to FIGS. 9-19, various aspects of radio connected mode handoff in accordance with the teachings herein will be described in more detail. The following describes examples of call flows for various connected mode handoff operations. In addition, the following details describe several procedures that may be used to improve handoff performance. In various aspects, these procedures may be used to define handoff measurements, determine when to trigger the measurements, determine when to handoff a UT, or determine whether to trigger a UT to obtain return link synchronization after a handoff. For purposes of explanation, these details will be discussed in the context of a NAC that comprises two components, a B×P and an A×P, for controlling and/or communicating with a satellite.

Figure 9:
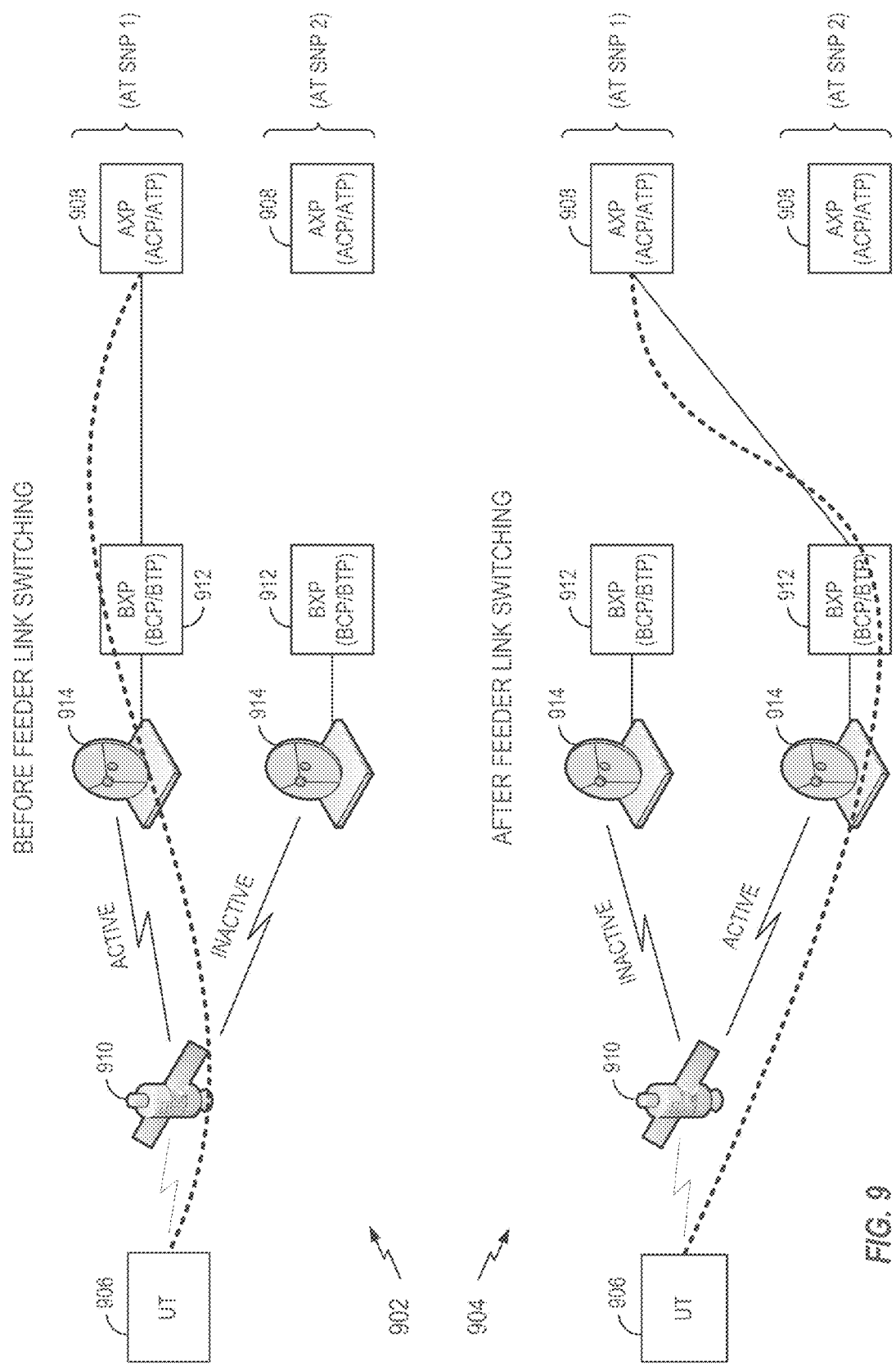
FIG. 9 is a diagram illustrating an example of feeder link switching in accordance with some aspects of the disclosure.

FIG. 9 illustrates an example deployment of B×P and A×P components in a satellite system. At a given point in time, a UT 902 communicates with one of the A×Ps 904 via a satellite 906 and one of the B×Ps 908, where each B×P 908 includes or is associated with a satellite RF subsystem 910.

A B×P refers to a combination of a BCP and a BTP (hence, the acronym B×P). In some aspects, a B×P may include radio network components for controlling a satellite. For example, a B×P may include, for a given cell/beam of a satellite, a corresponding set of digital circuits that serves that cell/beam. Thus, in some aspects, a B×P corresponds to a particular antenna. Also, in some aspects, a given B×P may be associated with a particular band for a given cell/beam of a satellite.

An A×P refers to a combination of an ACP and an ATP (hence, the acronym A×P). In some aspects, an A×P corresponds to an anchor point. In some aspects, an anchor point may be associated with a particular region (e.g., an administrative region, a country boundary, etc.). A given A×P may serve one or more satellites. Also, a given satellite may service one or more A×Ps.

In the above scenario, a UT in connected mode may undergo two types of handoff: B×P handoff or A×P handoff. For example, as satellites move in a non-GSO satellite system, the cells/beams (and, hence, the circuits and antennas associated with those cells/beams) used to serve a given UT will change over time. Thus, in some aspects, a B×P handoff may correspond to a handoff to a different cell/beam (or antenna, etc.). As another example, rain fade on a particular cell/beam operating on a first band may necessitate a switch to a different band for that cell/beam. Thus, in some aspects, a B×P handoff may correspond to a handoff to a different band for a given cell/beam. An A×P handoff corresponds to handoff to a different anchor point. For example, a UT may move to a different administrative region, thereby necessitating a change in the serving A×P. A B×P handoff might or might not be associated with an A×P handoff.

In some aspects, the disclosure that follows addresses satellite pointing errors that may occur in a satellite communication system. These errors may result from various causes in the system.

Figure 10:
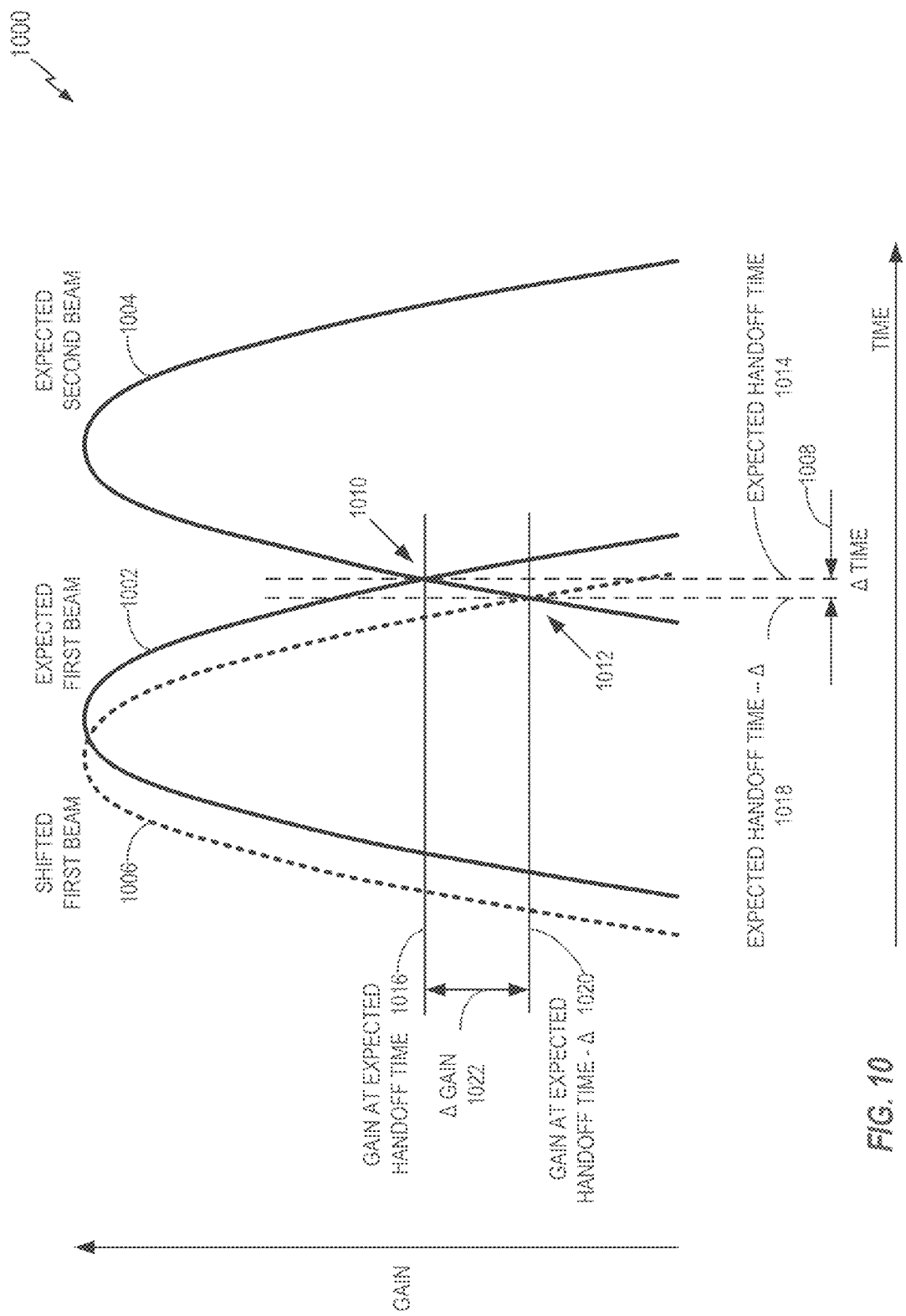
FIG. 10 is a diagram illustrating an example of a satellite pointing error in accordance with some aspects of the disclosure.

The graph 1000 of FIG. 10 illustrates expected gain contours 1002 and 1004 from different satellite beams, a first expected beam and a second expected beam, respectively. In some aspects, these beam gain contours may be used to determine when to handoff a UT from one beam to the next. For example, a UT may be handed over when the beam gain from the first expected beam (a source beam) that is currently serving the UT drops below the beam gain of the second expected beam (a candidate target beam).

For the first expected beam, FIG. 10 illustrates an actual beam gain contour 1006 that may be seen by a UT due to a satellite pointing error. As indicated in FIG. 10, a shift 1008 in the gain contour due to a satellite pointing error shifts the gain contour intersection between the two beam contours from a first intersection 1010 to a second intersection 1012. Thus, at the expected (ideal) handoff time 1014, the gain from the first beam will be lower (by the indicated amount) than the expected gain 1016, thereby adversely affecting handoff performance. As a result, the signal quality at the UT may be lower than desired immediately prior to handoff. To address this issue, the ideal handoff time may be shifted by a Δ (earlier in time in this example) based on the shift 1008 in the beam contour due to the satellite pointing error. Thus, handoff will occur at a new handoff time 1018. As shown in FIG. 10, the gain 1020 at the new handoff time 1018 may be lower by a Δ gain 1022 than the expected gain 1016 associated with the expected first beam.

To this end, a UT may conduct measurements of satellite signals (e.g., inter-satellite and intra-satellite) and send this information to an SNP. Based on these signals, the SNP may modify the handoff time for the UT. Accordingly, an SNP may send updated handoff information to a UT (e.g., via a satellite and cell transition table or a subset of the satellite and cell transition table) to account for the satellite pointing error.

In some aspects, a random access procedure may be used in scenarios where a UT has not yet achieved synchronization with a satellite during a handoff. For example, a random access procedure based on UT measurements of satellite signals may allow a UT to achieve return link synchronization.

BxP Handoff

A logical BxP may be uniquely identified by a 4-tuple including a satellite access network (SAN), an SNP antenna, a Satellite Beam, and a forward service link (FSL) Frequency, where SNP Antenna refers to the antenna in FIG. 9. A BxP handoff occurs for a UT in radio connected mode if the BxP 4-tuple of its connection changes.

Table 3 lists an example of these four types of BxP handoffs and the changes (highlighted in bold) associated with the BxP 4-tuple for each type of BxP handoff. For the Feeder Link Switching handoff, only the BxP changes, not the entire SAN.

TABLE 3

| Type of BxP handoff | BxP-4 tuple changes (in bold) |
| --- | --- |
| Intra-Sat handoff | (SAN, SNP Antenna, Sat Beam, FSL Frequency) |
| Inter-Sat handoff | (SAN, SNP Antenna, Sat Beam, FSL Frequency) |
| Feeder Link Switching handoff | (SAN, SNP Antenna, Sat Beam, FSL Frequency) |
| Intra-SNP, SNP antenna failover | (SAN, SNP Antenna, Sat Beam, FSL Frequency) |

The BxP handoff occurs at either a handoff time based upon a priori information, denoted as THO_a_priori, or a new handoff time recalculated using UT measurement reports, denoted as THO_recalc, where THO_recalc=THO_a_priori±Δ (e.g., as in FIG. 10).

If the satellite antenna pointing errors are well known a priori, then the BxP handoff shall be initiated by the UT based solely upon its Satellite Handoff Table (e.g., satellite and cell transition table). Otherwise, the BxP handoff may require UT measurements of the target cell and subsequent measurement reporting by the UT to the source AxP based upon which the source AxP shall update the UTs satellite and cell transition table.

BxP Handoff—Feeder Link Switching

Referring again to FIG. 9, a first configuration 902 and a second configuration 904 illustrate a feeder link switching BxP handoff. Each satellite has dual feeder link connections to two SNPs, but only one feeder link connection is active at any one time. The dual feeder link connections allow instantaneous switching of the active feeder link connection at a satellite. The feeder link switching appears as an idempotent handoff in which the UT hands over to the same satellite, the same cell and the same frequency. However, the feeder link switching BxP handoff can also be made to occur at the same time as a cell handoff for some UTs, in which case the target cell is different from the source cell.

Figure 11:
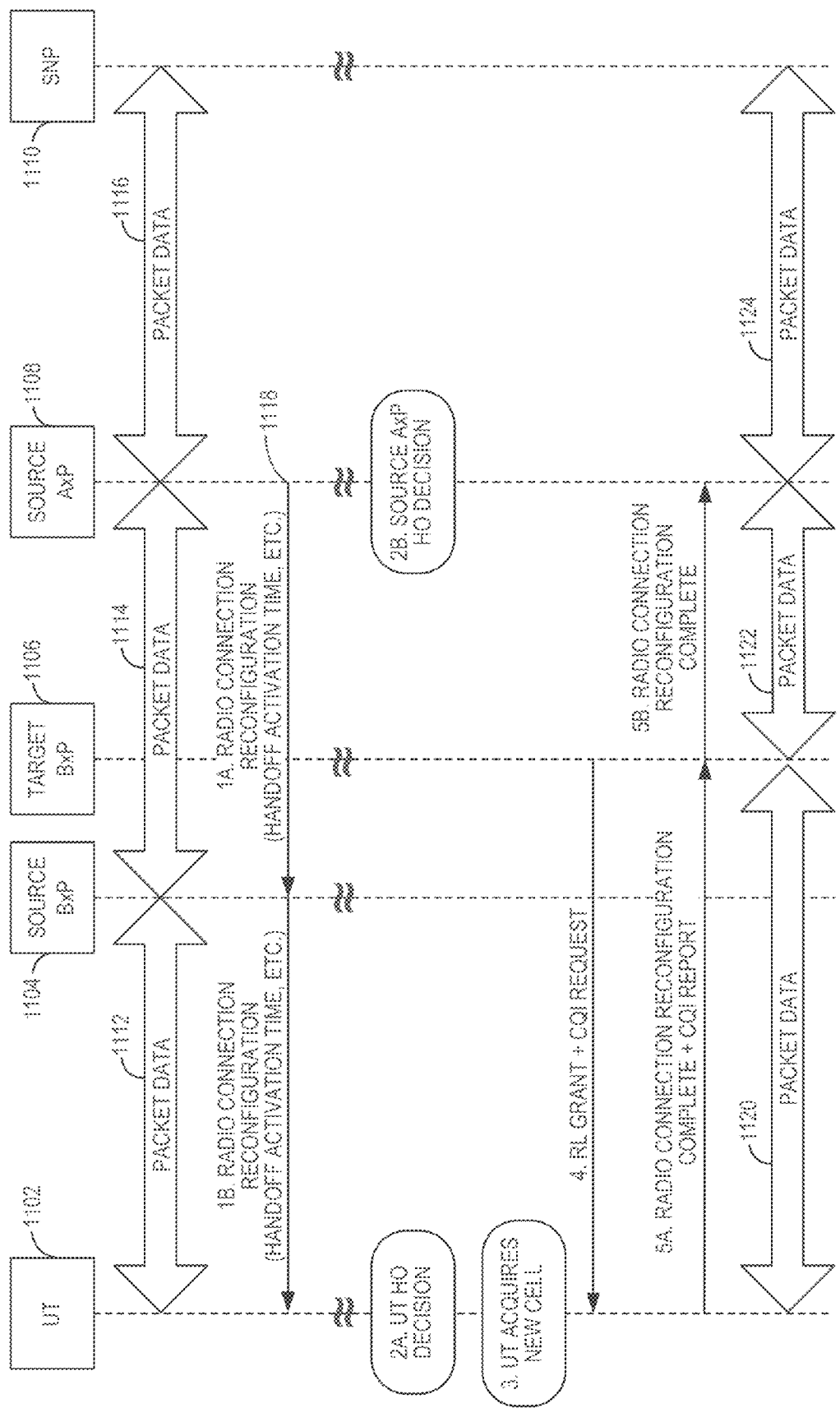
FIG. 11 is a diagram illustrating an example of a call flow for a non-random access-based B×P handoff in accordance with some aspects of the disclosure.
Figure 13:
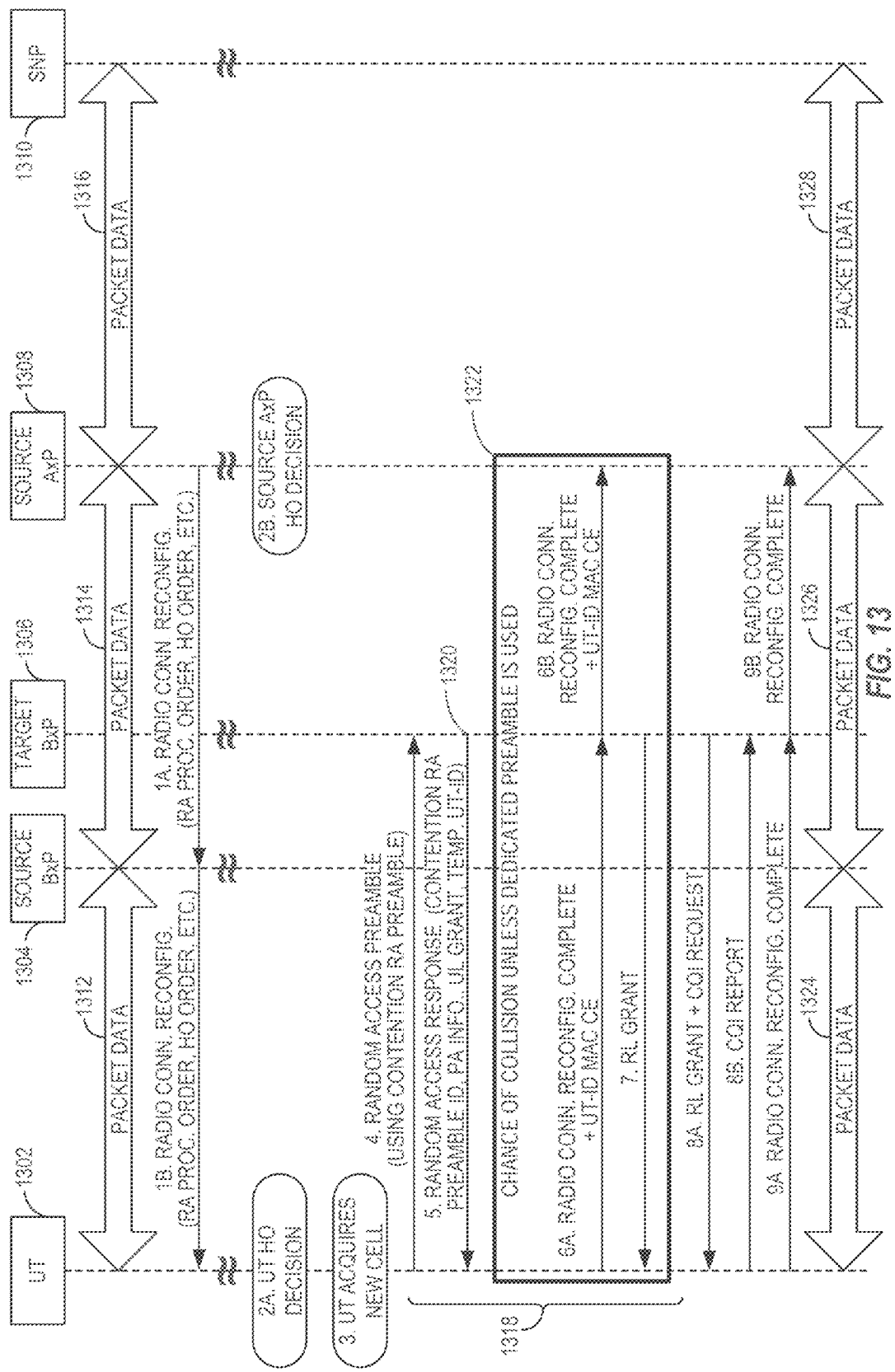
FIG. 13 is a diagram illustrating an example of a call flow for a random access-based B×P handoff in accordance with some aspects of the disclosure.

The call flows for feeder link switching BxP handoff are the same as those illustrated in FIG. 11 and FIG. 13 discussed below. The call flow in FIG. 11 is applicable for the case where the UT does not need to perform a Random Access procedure in order to achieve RL synchronization after the feeder link switching occurs. The call flow in FIG. 13 is applicable for the case where the UT does need to perform a Random Access procedure in order to achieve RL synchronization after the feeder link switching occurs.

BxP Handoff—Non-Random Access

FIG. 11 illustrates a non-Random Access-based BxP handoff call flow without UT measurements and measurement reporting. A typical use-case is an intra-satellite BxP handoff. The call flow is between a UT 1102, a source BxP 1104, a target BxP 1106, a source AxP 1108, and an SNP 1110.

A description of the steps in the non-Random Access-based BxP handoff call flow without UT measurements and measurement reporting is provided below. Initial packet data flow is represented by lines 1112, 1114, and 1116.

At point 1118, the source AxP 1108 pre-configures the target BxP 1106 for handoff before (e.g., 1 second before) the handoff activation time (e.g., before THO_a_priori). At step 1A, the source AxP 1108 sends a Radio Connection Reconfiguration message to the UT 1102. At step 1B, the message is sent to the UT 1102 sufficiently in advance of the handoff activation time so that the UT 1102 has adequate time to receive the message. This message may include satellite handoff information such as a row of a transition table (e.g., indicative of a handoff activation time) and other parameters. The UT 1102 starts timer T-4. If T-4 expires (e.g., a handoff failure occurs), then the UT 1102 performs the Radio Connection Re-establishment procedure.

At steps 2A and 2B, based upon the single row of the satellite and cell transition table contained in the Radio Connection Reconfiguration message in step 1, both the UT 1102 and source AxP 1108 simultaneously prepare for BxP handoff at the handoff activation time (e.g., at THO_a_priori). Thus, the UT 1102 prepares to handoff from the source BxP 1104 to the target BxP 1106, and the source AxP 1108 prepares to handoff the UT 1102 from the source BxP 1104 to the target BxP 1106.

At step 3, the UT 1102 resets the media access control (MAC) state. The UT 1102 then acquires the new cell (e.g., FL synchronization).

At step 4, after the handoff activation+Inter-Cell Tuneaway time, the target BxP 1106 sends to the UT 1102 an RL grant+channel quality indicator (CQI) request. The RL grant is addressed to the UT identifier (UT-ID) that the source AxP 1108 assigned to the UT 1102 in the Radio Connection Reconfiguration message (see Step 1).

At step 5, upon receiving the RL grant from the target BxP 1106, the UT 1102 stops timer T-4 (e.g., the handoff is successful) and sends a CQI report and Radio Connection Reconfiguration Complete message to the target BxP 1106 (step 5A) for forwarding to the source AxP 1108 (step 5B). The Radio Connection Reconfiguration Complete message contains no information elements (IEs) and is integrity protected and encrypted with the old keys (e.g., Kint and Kenc, respectively). Final packet data flow is represented by lines 1120, 1122, and 1124.

Figure 12:
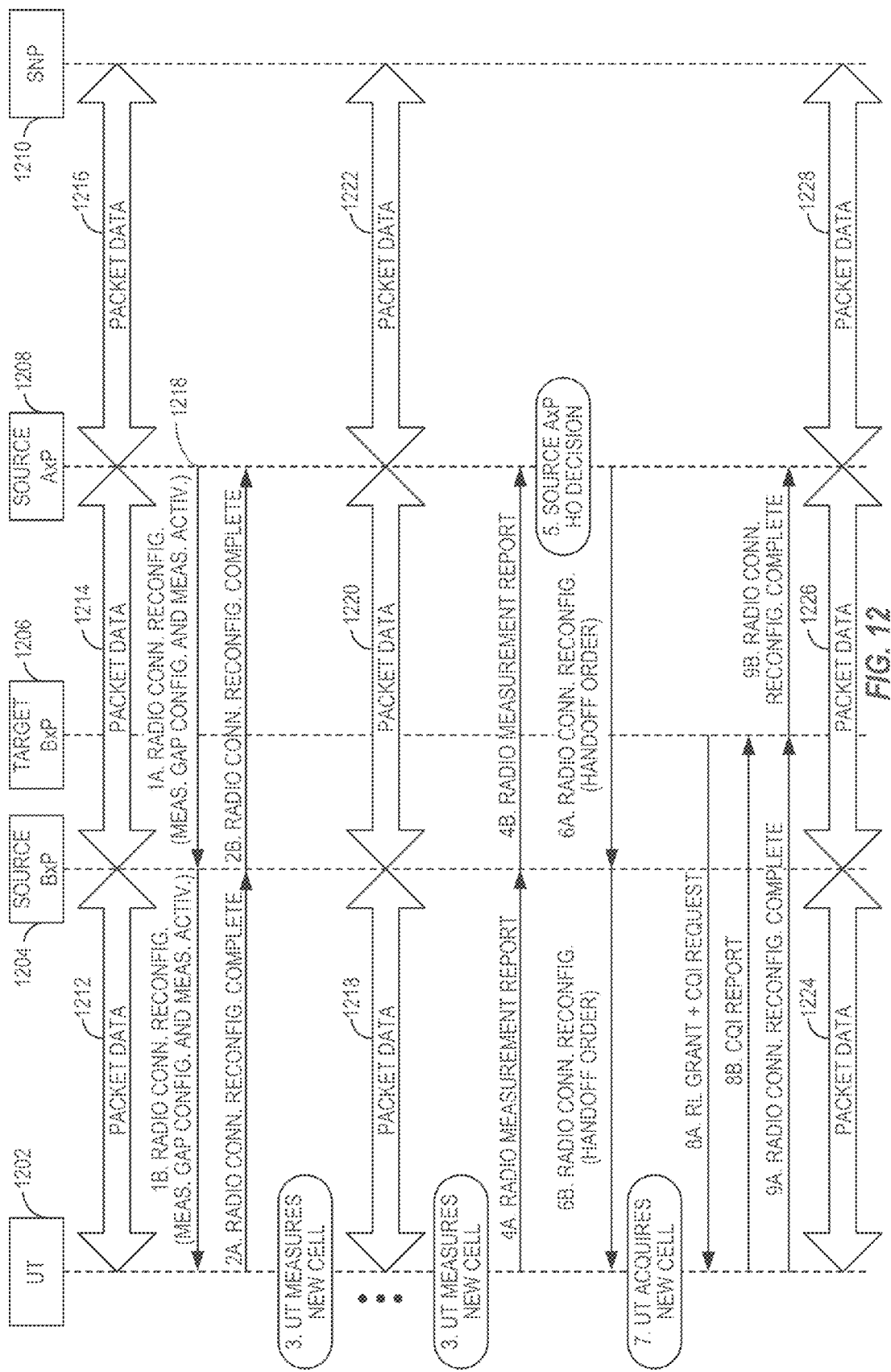
FIG. 12 is a diagram illustrating an example of a call flow for a non-random access-based B×P handoff with user terminal (UT) measurements in accordance with some aspects of the disclosure.

FIG. 12 illustrates a non-Random Access-based BxP handoff call flow with UT measurements and measurement reporting. A typical use-case is an intra-satellite BxP handoff. The call flow is between a UT 1202, a source BxP 1204, a target BxP 1206, a source AxP 1208, and an SNP 1210.

A description of the steps in the non-Random Access-based B×P handoff call flow with UT measurements and measurement reporting follows. Initial packet data flow is represented by lines 1212, 1214, and 1216.

A Radio Connection Reconfiguration message sent to the UT 1202 while the UT 1202 is served by a given source cell may instruct the UT 1202 when to conduct measurements for the next target cell. Thus, at point 1218, while in the previous cell, the source A×P 1208 may configure the UT 1202 with measurement gap information (e.g., a gap pattern) corresponding to a measurement time. The source A×P 1208 may send this information because satellite pointing error may require satellite handoff to occur at the ideal handoff time+/− Δ, thereby necessitating measurements by the UT 1202. At steps 1A and 1B, the source A×P 1208 sends a Radio Connection Reconfiguration message to the UT 1202. The message includes measurement gap configuration information and measurement activation/deactivation time (in addition to handoff activation time and other IEs described herein). At step 3, the UT 1202 measures the signal strength of the target cell according to the measurement gap configuration information that it received from the source A×P 1208. Packet data flow continues as represented by lines 1218, 1220, and 1222.

At steps 4A and 4B, the UT 1202 sends a Measurement Report to the source A×P 1208 indicating the signal strength (e.g., RSRP) of both the source cell and target cell using event-based reporting of the signal strength. The source A×P 1208 configures the UT 1202 to use an Event 1 (source cell becomes better than a threshold) as the criteria to trigger a measurement report. The source A×P 1208 sets the threshold low enough so that the signal strength of the source cell is always greater than the threshold, thereby triggering the UT 1202 to send a measurement report to the source A×P 1208. Similarly, the source A×P 1208 configures the UT 1202 to use an Event 4 (target cell becomes better than a threshold) as the criteria to trigger a measurement report. The source A×P 1208 sets the threshold low enough so that the signal strength of the target cell is always greater than the threshold, thereby triggering the UT 1202 to send a measurement report to the source A×P 1208. Other reporting criteria can also be used.

At step 5, based upon the UT measurement report (see Step 4), the source A×P 1208 calculates a new handoff activation time (e.g., THO_recalc) and pre-configures the target B×P 1206 for handoff before the new handoff activation time (e.g., before THO_recalc). For example, based on satellite ephemeris information, beam patterns, and the UT measurement report, the source A×P 1208 may prepare for B×P handover to occur at the ideal handover time+/−Δ. At steps 6A and 6B, the source A×P 1208 sends a Radio Connection Reconfiguration message to the UT 1202. The contents of the message are described herein, including the new handoff activation time. Optionally, the message may also contain measurement gap configuration information and measurement activation/deactivation time. The message is sent to the UT 1202 sufficiently in advance of the new handoff activation time so that the UT 1202 has adequate time to receive the message. The UT 1202 starts timer T-4. If T-4 expires (e.g., a handoff failure occurs), then the UT 1202 performs the Radio Connection Re-establishment procedure. Also, if the source A×P 1208 does not receive the measurement report from the UT 1202 in a timely manner, then the source A×P 1208 uses the old handoff activation time (e.g., THO_a_priori) when configuring both the target B×P 1206 and the UT 1202 for handoff.

Based upon the single row of the satellite and cell transition table contained in the Radio Connection Reconfiguration message in Step 6, both the UT 1202 and source A×P 1208 simultaneously prepare for B×P handoff at the new handoff activation time (e.g., THO_recalc).

At step 7, the UT 1202 resets the MAC state. The UT 1202 acquires the new cell (e.g., FL synchronization).

At step 8A, after the handoff activation+Inter-Cell Tune-away time, the target B×P 1206 sends to the UT 1202 an RL grant+CQI request. The RL grant is addressed to the UT-ID that the source A×P 1208 assigned to the UT 1202 in the Radio Connection Reconfiguration message (see Step 3).

Upon receiving the RL grant from the target B×P 1206, the UT 1202 stops timer T-4 (e.g., the handoff is successful) and sends a CQI report (step 8A) and Radio Connection Reconfiguration Complete message to the target B×P 1206/source A×P 1208 (steps 9A and 9B). The Radio Connection Reconfiguration Complete message contains no IEs and is integrity protected and encrypted with the old keys (e.g., Kint and Kenc, respectively). Final packet data flow is represented by lines 1224, 1226, and 1228.

B×P Handoff—Random Access

FIG. 13 illustrates a Random Access-based B×P handoff call flow without UT measurements and measurement reporting. A typical use-case is an inter-satellite B×P handoff. The call flow is between a UT 1302, a source B×P 1304, a target B×P 1306, a source A×P 1308, and an SNP 1310.

A description of the steps in the Random Access-based B×P handoff call flow without UT measurements and measurement reporting follows. Initial packet data flow is represented by lines 1312, 1314, and 1316.

At steps 1A and 1B, the source A×P 1308 pre-configures the target B×P 1306 for handoff before the handoff activation time (e.g., before THO_a_priori). The source A×P 1308 sends a Radio Connection Reconfiguration message to the UT 1302. The contents of the message are described herein. The message is sent to the UT 1302 sufficiently in advance of the handoff activation time so that the UT 1302 has adequate time to receive the message. The UT 1302 starts timer T-4. If T-4 expires (e.g., a handoff failure occurs), then the UT 1302 performs the Radio Connection Re-establishment procedure.

At step 2, based upon the single row of the satellite and cell transition table contained in the Radio Connection Reconfiguration message in Step 1, both the UT 1302 and the source A×P 1308 simultaneously prepare for B×P handoff at the handoff activation time (e.g., at THO_a_priori). These operations may be similar to the corresponding operations discussed above in conjunction with FIG. 11.

At step 3, the UT 1302 resets the MAC state. The UT 1302 acquires the new cell (e.g., FL synchronization). As represented by bracket 1318, if step 1 does not include an RA procedure order, steps 4-7 are not required.

After the handoff activation+Inter-Satellite Tune-away time, the target B×P 1306 sends a FL control channel (FLCC) order to the UT 1302 containing a dedicated preamble signature in order to trigger the UT 1302 to perform a non-contention based Random Access procedure. This enables the UT 1302 to subsequently achieve RL synchronization.

At step 4, the UT 1302 sends a non-contention based Random Access Preamble on the Random Access to the target B×P 1306. Upon receiving the non-contention based Random Access Preamble from the UT 1302, the target B×P 1306 validates the received signature sequence.

At step 5, the target B×P 1306 sends a Random Access Response to the UT 1302 that is addressed to the appropriate group of UTs (e.g., RA-RNTI). The Random Access Response contains the paging area (PA), RL grant (which includes a CQI request), and temporary UT-ID.

If a dedicated preamble signature is used, the RL grant may include a CQI request. In this case, the process may skip from point 1320 to step 8B. Otherwise, the operations of block 1322, including steps 6 and 7, and the operations of step 8A may be performed.

Upon receiving the RL grant+CQI request from the target BxP 1306 (e.g., in step 8A), the UT 1302 stops timer T-4 (e.g., the handoff is successful) and sends a CQI report (step 8B) to the target BxP 1306. If a dedicated preamble signature is used, the UT 1302 also sends a Radio Connection Reconfiguration Complete message to the target BxP 1306 (step 9A) for forwarding to the source AxP 1308 (step 9B). The Radio Connection Reconfiguration Complete message contains no IEs and is integrity protected and encrypted with the old keys (e.g., Kint and Kenc, respectively). Final packet data flow is represented by lines 1324, 1326, and 1328.

Figure 14:
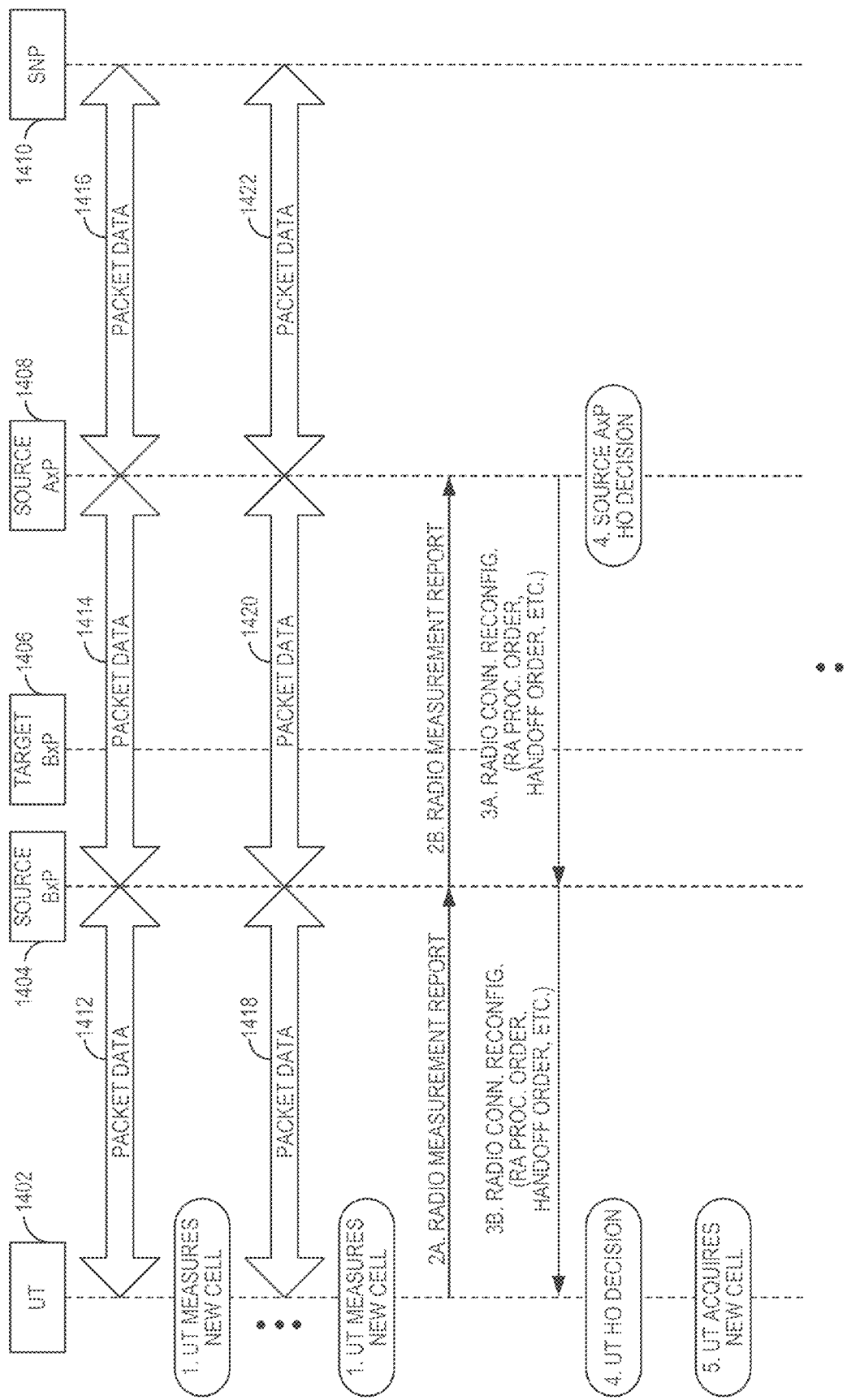
FIGS. 14 and 15 are diagrams illustrating an example of a call flow for a random access-based B×P handoff with UT measurements in accordance with some aspects of the disclosure.
Figure 15:
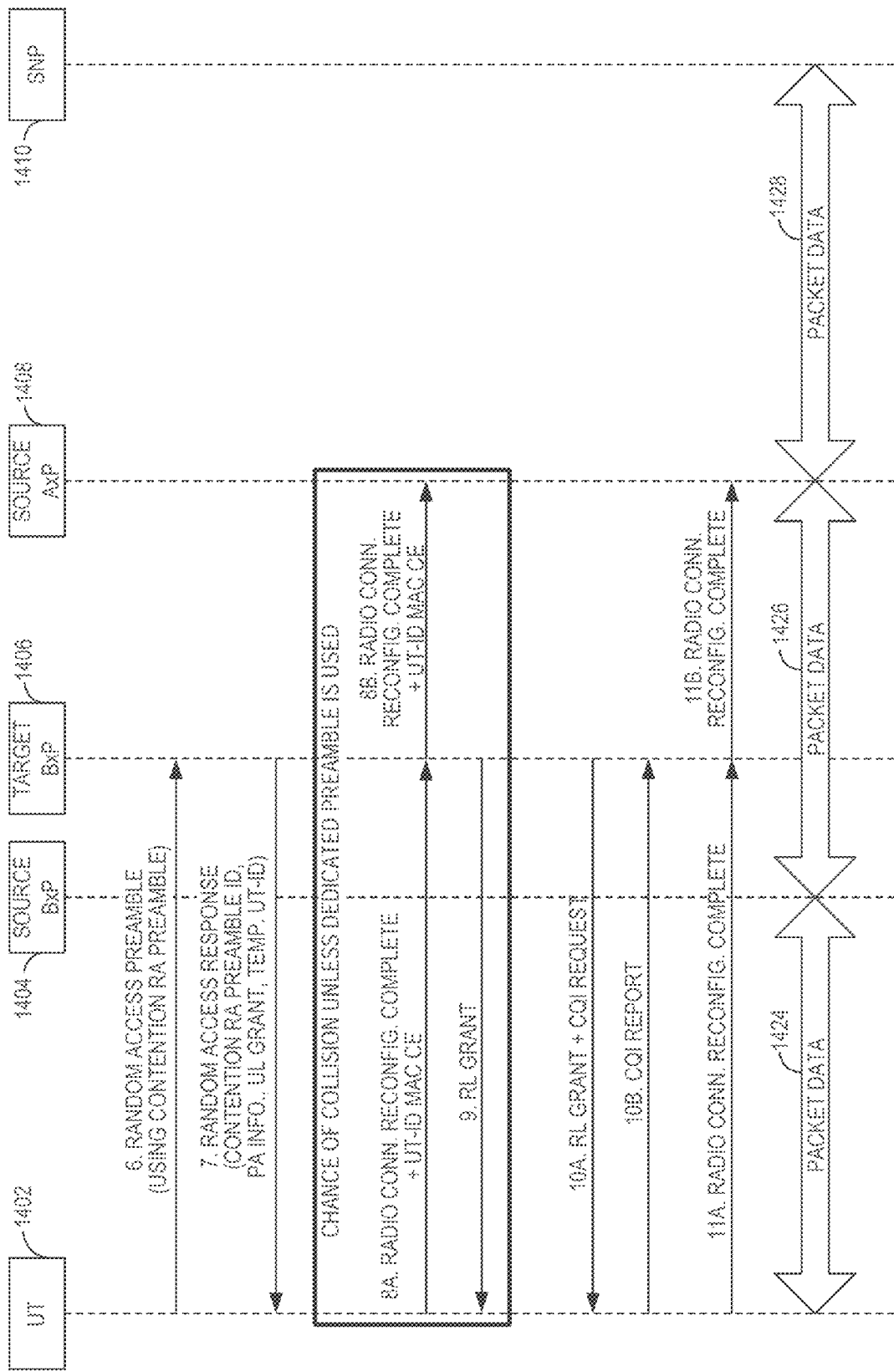

FIGS. 14 and 15 illustrate a random access-based BxP handoff call flow with UT measurements and measurement reporting. A typical use-case is an inter-satellite BxP handoff. The call flow is between a UT 1402, a source BxP 1404, a target BxP 1406, a source AxP 1408, and an SNP 1410.

A description of the steps in the Random Access-based BxP handoff with UT measurements and measurement reporting follows. Initial packet data flow is represented by lines 1412, 1414, and 1416.

Referring initially to FIG. 14, while in the previous cell, the UT 1402 was configured by the source AxP 1408 in a Radio Connection Reconfiguration message with measurement gap configuration information and measurement activation/deactivation time (in addition to handoff activation time and other IEs described herein). At step 1, the UT 1402 measures the signal strength of the target cell according to the measurement gap configuration information that it received from the source AxP 1408. Packet data flow continues as represented by lines 1418, 1420, and 1422.

At step 2, the UT 1402 sends a Measurement Report to the source AxP 1408 indicating that the signal strength (e.g., RSRP) of both the source cell and target cell using event-based reporting of the signal strength. The source AxP 1408 configures the UT 1402 to use an Event 1 (source cell becomes better than a threshold) as the criteria to trigger a measurement report. The source AxP 1408 sets the threshold low enough so that the signal strength of the source cell is always greater than the threshold, thereby trigger the UT 1402 to send a measurement report to the source AxP 1408. Similarly, the source AxP 1408 configures the UT 1402 to use an Event 4 (target cell becomes better than a threshold) as the criteria to trigger a measurement report. The source AxP 1408 sets the threshold low enough so that the signal strength of the target cell is always greater than the threshold, thereby triggering the UT 1402 to send a measurement report to the source AxP 1408. Other reporting criteria can also be used.

Based upon the UT measurement report (see Step 2), the source AxP 1408 calculates a new handoff activation time (e.g., THO_recalc) and pre-configures the target BxP 1406 for handoff before the new handoff activation time (e.g., before THO_recalc).

The operations of steps 3-11 correspond to steps 1-9 of FIG. 13. Thus, these operations will be discussed briefly. At step 3, the source AxP 1408 sends a Radio Connection Reconfiguration message to the UT 1402. The contents of the message are described herein, including the handoff activation time. Optionally, the message may also contain measurement gap configuration information and measurement activation/deactivation time. The message is sent to the UT 1402 sufficiently in advance of the handoff activation time so that the UT 1402 has adequate time to receive the message. The UT 1402 starts timer T-4. If T-4 expires (e.g., a handoff failure occurs), then the UT 1402 performs the Radio Connection Re-establishment procedure. Also, if the source AxP 1408 does not receive the measurement report from the UT 1402 in a timely manner, then the source AxP 1408 uses the old handoff activation time (e.g., THO_a_priori) when configuring both the target BxP 1406 and UT 1402 for handoff.

At step 4, based upon the single row of the satellite and cell transition table contained in the Radio Connection Reconfiguration message in Step 3, both the UT 1402 and the source AxP 1408 simultaneously prepare for BxP handoff at the new handoff activation time (e.g., THO_recalc).

At step 5, the UT 1402 resets the MAC state. The UT 1402 acquires the new cell (e.g., FL synchronization).

Referring to FIG. 15, after the handoff activation+Inter-Cell Tune-away time, the target BxP 1406 sends an FLCC order to the UT 1402 containing a dedicated preamble signature in order to trigger the UT 1402 to perform a non-contention based Random Access procedure. This enables the UT 1402 to subsequently achieve RL synchronization.

At step 6, the UT 1402 sends a non-contention based Random Access Preamble on the Random Access to the target BxP 1406. Upon receiving the non-contention based Random Access Preamble from the UT 1402, the target BxP 1406 validates the received signature sequence.

At step 7, the target BxP 1406 sends a Random Access Response to the UT 1402 that is addressed to the appropriate RA-RNTI. The Random Access Response contains the paging area, RL grant (which includes a CQI request), and temporary UT-ID.

Upon receiving the RL grant+CQI request from the target BxP 1406 (step 10A), the UT 1402 stops timer T-4 (e.g., the handoff is successful) and sends a CQI report to the target BxP 1406 (step 10B) and a Radio Connection Reconfiguration Complete message to the target BxP 1406/source AxP 1408 (step 11). The Radio Connection Reconfiguration Complete message contains no IEs and is integrity protected and encrypted with the old keys (e.g., Kint and Kenc, respectively). Final packet data flow is represented by lines 1424, 1426, and 1428.

BxP Handoff—Failover

In an intra-SNP, SNP antenna failover, an antenna assembly serving the satellite has failed. This this case, one of two scenarios are possible. In a first scenario, the UT experiences a brief interruption in connectivity and data service which is managed by the SNP as a part of normal operation (e.g., scheduling of FL and RL resources for the UT by the SNP, HARQ retransmissions and ARQ retransmissions). In a second scenario, the UT experiences a loss of FL synchronization or there is a significant interruption in connectivity and data service which results in a radio link failure (RLF).

AxP Handoff

Inter-AxP handoffs may be performed for load-balancing purposes or for non-stationary UTs that require an inter-AxP handoff due to a change in the UT's location resulting in a crossing of an Administrative Region boundary. An AxP handoff procedure comprises three distinct phases: AxP handoff preparation, AxP handoff execution, and AxP handoff completion.

The following procedures may be used for AxP Handoff Preparation.

For Radio Control (RC) acknowledged mobile (AM) data bearers, if direct forwarding of data applies, then tunnels may be established per RL-AM data bearer (one way from source A×P to target A×P) for both forward link and reverse link data forwarding. Conversely, if indirect forwarding of data applies, then tunnels may be established per RL-AM data bearer (one way from source A×P to target A×P via the SNP) for both forward link and reverse link data forwarding.

For RC unacknowledged mobile (UM) data bearers, if direct forwarding of data applies, then tunnels may be established per RL-UM data bearer (one way from source A×P to target A×P) for forward link data forwarding only. Reverse link data is not forwarded from source A×P to target A×P but instead is sent by the source A×P to the SNP. Conversely, if indirect forwarding of data applies, then tunnels may be established per RL-UM data bearer (one way from source A×P to target A×P) for forward link data forwarding only. Reverse link data is not forwarded from source A×P to target A×P but instead is sent by the source A×P to the SNP.

The following procedures may be used for A×P Handoff Execution. For RL-AM data bearers, the reverse link forwarded data contains sequence numbers (SNs). The forward link forwarded data may contain SNs or may not if the forward link data is received from the SNP without having been assigned a SN by the source A×P yet. The source A×P sends both forward link and reverse link SN and frame number (FN) information to the target A×P. The MAC and RL states are reset.

For RL-UM data bearers, the forward link forwarded data may contain SNs or may not if the forward link data is received from the SNP without having been assigned a SN by the source A×P yet. If the forward link forwarded data contains a SN, then the target A×P should send this data to the UT first (after resetting both the SN and FN). The state is reset (e.g., the forward link and reverse link SN and FN are reset). The MAC and RL states are reset.

The following procedures may be used for Handoff Completion.

For RL-AM data bearers, the UT may send a list of missing/received forward link protocol data units (PDUs) to the target A×P and the target A×P may send a list of missing/received reverse link PDUs to the UT. For both RL-AM and RL-UM data bearers, the forward link tunnels per data bearer are switched from the source A×P to the target A×P and UT resources are released at the source AP.

Figure 16:
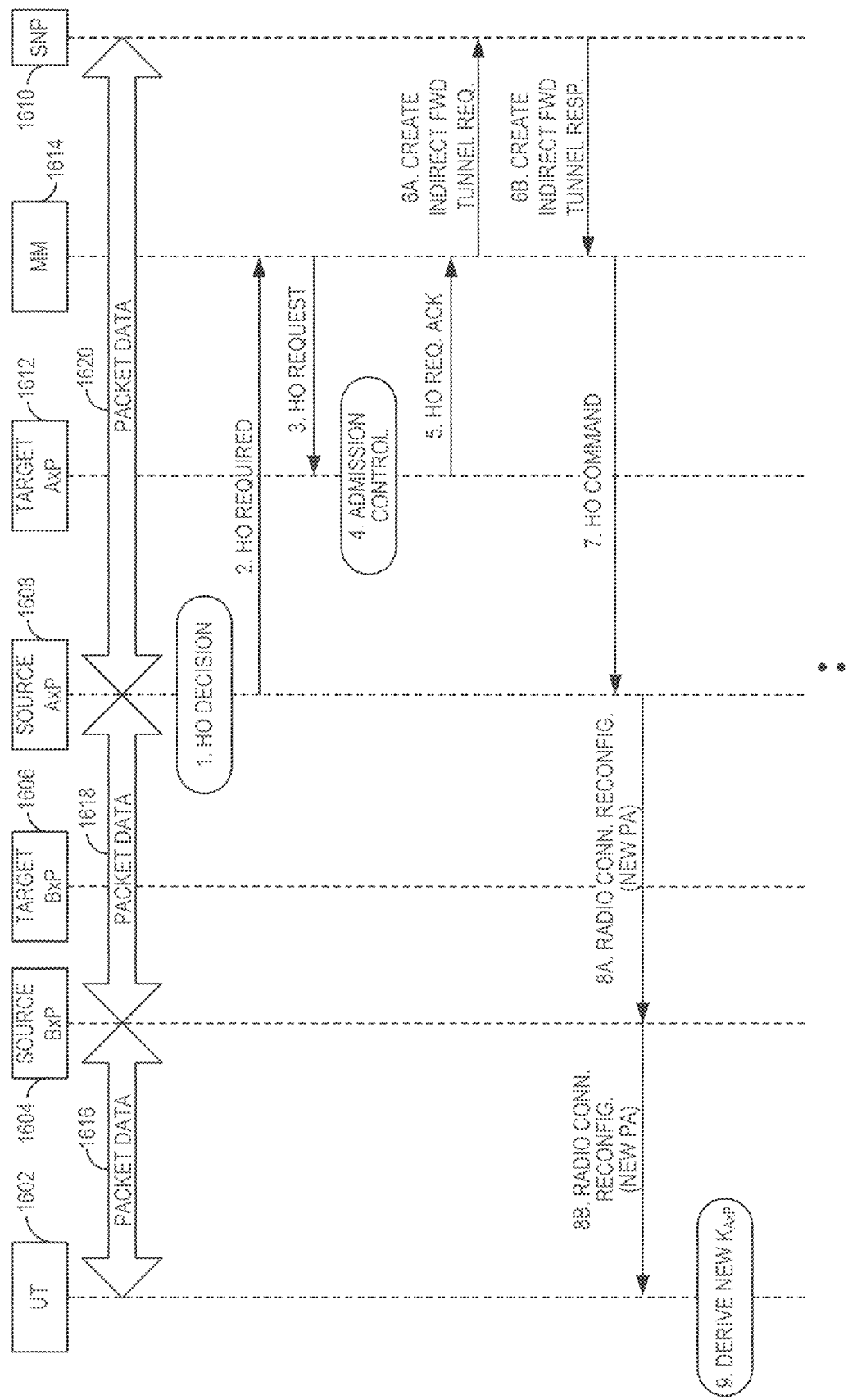
Figure 17:
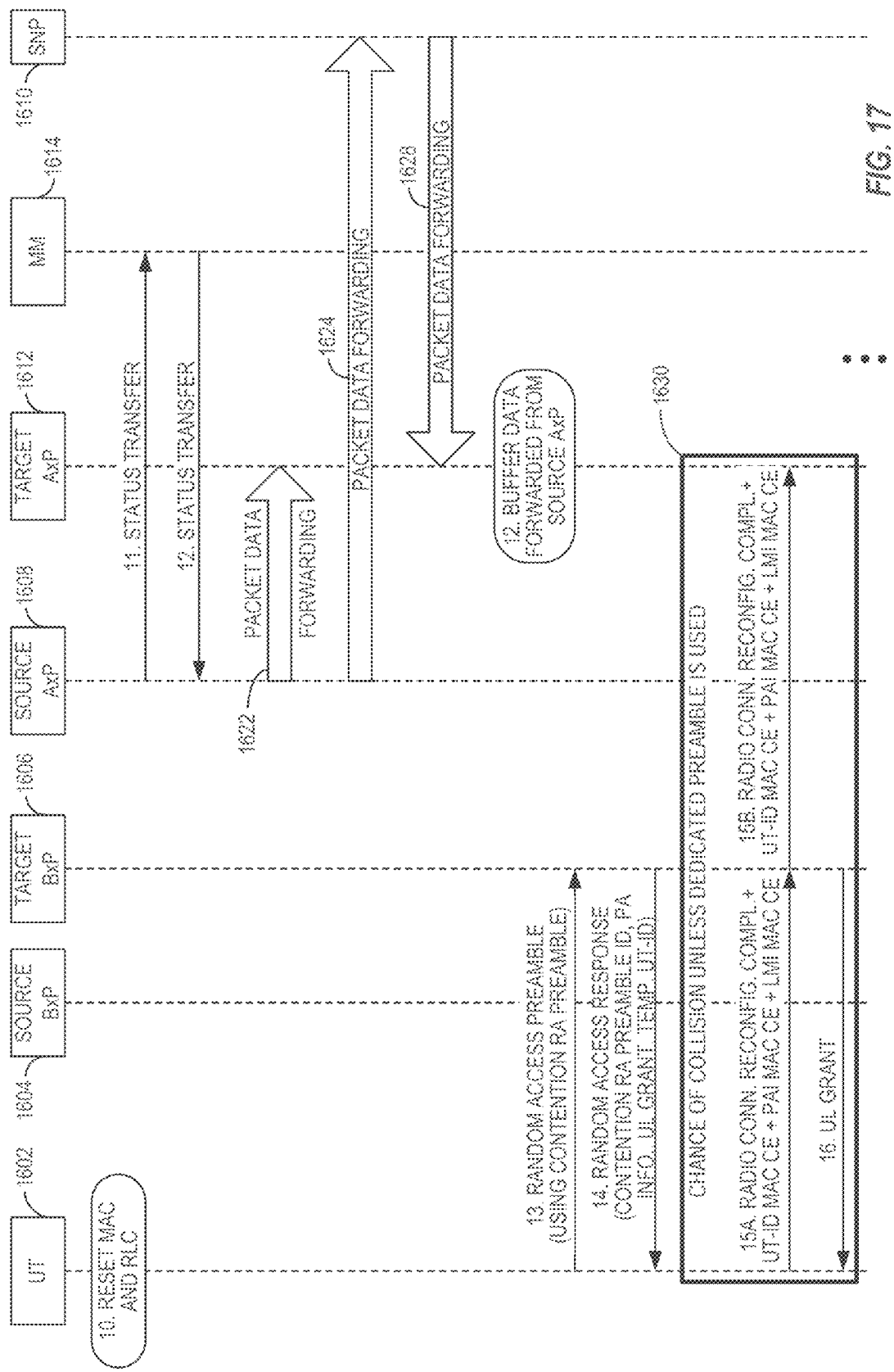
Figure 16:
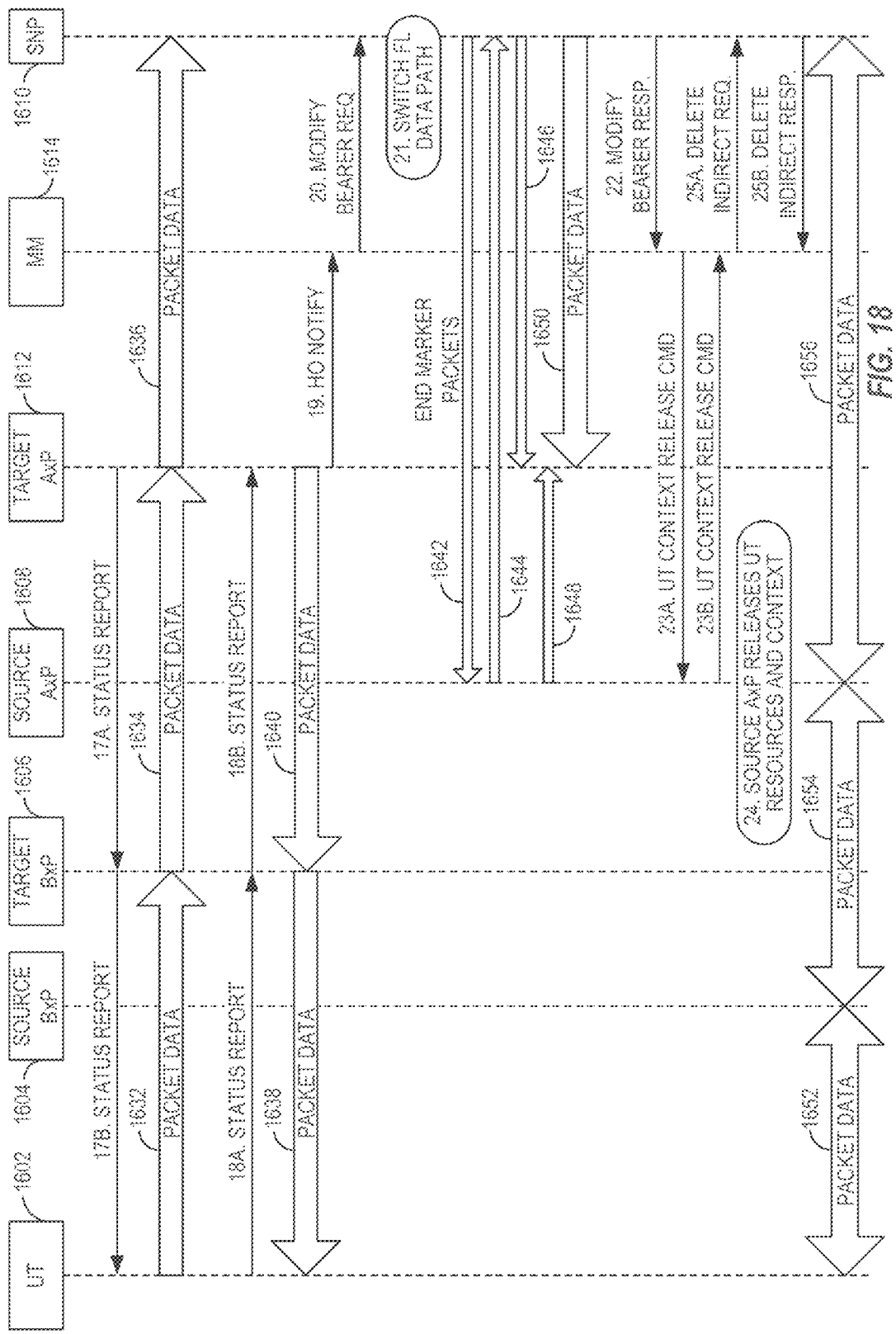

FIGS. 16-18 illustrate an A×P handoff call flow without mobility management (MM) relocation and without SNP relocation. FIG. 16 depicts handoff preparation. FIG. 17 depicts handoff execution. FIG. 18 depicts handoff completion. A description of the steps in the A×P handoff call flow follows.

Referring initially to FIG. 14, the call flow is between a UT 1602, a source B×P 1604, a target B×P 1606, a source A×P 1608, a target A×P 1612, a mobility management (MM) component 1614, and an SNP 1610. Initial packet data flow is represented by lines 1616, 1618, and 1620.

At step 1, the source A×P 1608 makes a decision to hand over the UT 1602 to a target cell and a target A×P 1612 based on the satellite ephemeris information and beam patterns.

At step 2, the source A×P 1608 sends a Handoff Required message to the MM 1614 in order to request the preparation of resources at the target A×P 1612. The message contains the paging area identifier (PAI) of the target A×P 1612 (so that the MM 1614 can determine to which target A×P 1612 it should send the Handoff Request message in step 3), whether or not a direct data forwarding path is available (e.g., via an appropriate interface), and a source-to-target transparent container (passed transparently through the MM 1614) that carries a Handoff Preparation Information message which comprises the following: the UT's radio resource configuration in the source A×P 1608, the UT's security configuration in the source A×P 1608, target cell ID (e.g., target B×P ID indicating the beam to be prepared), and radio bearer information (including whether or not the source A×P 1608 proposes to do forward link data forwarding).

In step 3, the MM 1614 sends a Handoff Request message to the target A×P 1612 in order to request the preparation of resources at the target A×P 1612. The message contains the source-to-target transparent container carried in the Handoff Required message (see Step 2), a list of data bearers to be set up (e.g., quality of service (QoS) information, SNP tunneling protocol (TP) addressing information per data bearer), and security context information (e.g., one pair of NH, NCC for 1-hop security during the target A×P's derivation of new security keys for user plane traffic and radio signaling).

At step 4, upon receiving the Handoff Request message from the MM 1614, the target A×P 1612 decides that it can establish the UE context.

At step 5, the target A×P 1612 sends a Handoff Request Acknowledge message to the MM 1614 to inform the MM 1614 about the prepared resources at the target A×P 1612. The message contains a target-to-source transparent container (passed transparently through the MM 1614) that carries a Handoff Command message to be used by the source A×P 1608 when constructing the Radio Connection Reconfiguration message (see step 8). The Handoff Request Acknowledge message also contains a list of data bearers to be setup, which includes the target A×P downlink TP addressing information on a designated interface per data bearer (e.g., for data sent directly to the target A×P 1612 from the SNP 1610, not via the source A×P 1608). The Handoff Request message may also include additional target A×P 1612 forward link TP addressing information per data bearer (if the source A×P 1608 proposed to do forward link data forwarding for a data bearer and the target A×P 1612 accepts the proposal) and target A×P reverse link TP addressing information per data bearer (if the target A×P 1612 requests the source A×P 1608 to do reverse link data forwarding for an RL-AM data bearer).

At step 6, if indirect forwarding of data applies (e.g., via the designated interface), the MM 1614 sends a Create Indirect Data Forwarding Tunnel Request message to the SNP 1610. The message contains a list of data bearers which includes the following information per data bearer: data bearer ID, the target A×P's tunnel ID and IP address for the indirect forwarding of forward link data on a designated interface, and the target A×P's tunnel ID and IP address for the indirect forwarding of reverse link data on the designated interface, as applicable. Subsequently, the SNP 1610 sends a Create Indirect Data Forwarding Tunnel Response message to the MM 1614. The message contains the following information per data bearer: data bearer ID, the SNP's tunnel ID and IP address for the indirect forwarding of forward link data on the designated interface, and the SNP's tunnel ID and IP address for the indirect forwarding of reverse link data on the designated interface, as applicable.

At step 7, the MM 1614 sends a Handoff Command message to the source A×P 1608 to inform the source A×P 1608 that resources for the handoff have been prepared at the target A×P 1612. The message contains the target-to-source transparent container carried in the Handoff Request Acknowledge message (see Step 5) to be used by the source A×P 1608 when constructing the Radio Connection Reconfiguration message (see Step 8). The Handoff Command message also contains a list of data bearers to be set up. If direct forwarding of data applies (e.g., via an appropriate interface), the message may contain the target A×P forward link TP addressing information per data bearer (if the source A×P 1608 proposed to do forward link data forwarding for a data bearer and the target A×P 1612 accepts the proposal), and target A×P reverse link TP addressing information per data bearer (if the target A×P 1612 requests the source A×P 1608 to do reverse link data forwarding for an RL-AM data bearer). If indirect forwarding of data applies (e.g., via the designated interface), the message may contain the SNP forward link TP addressing information per data bearer (if the source A×P 1608 proposed to do forward link data forwarding for a data bearer and the target A×P 1612 accepts the proposal), and SNP reverse link TP addressing information per data bearer (if the target A×P 1612 requests the source A×P 1608 to do reverse link data forwarding for an RL-AM data bearer). See Step 6. Also, the message contains a new satellite and cell transition table. Upon receiving the Handoff Command message, the source A×P 1608 freezes the transmitter/receiver status for the UT's data bearers.

At step 8, the source A×P 1608 sends a Radio Connection Reconfiguration message to the UT 1602. The message contains a new UT-ID, the PCI and frequency for the target B×P 1606, security information, radio resource common and dedicated configuration information as needed (e.g., Random Access information, CQI reporting information), and target data bearer configuration information (if there are any changes from the current configuration). The message also contains a new paging area identifier that uniquely identifies the target A×P 1612. Upon receiving the Radio Connection Reconfiguration message from the source A×P 1608, the UE starts timer T-4. If T-4 expires (e.g., a handoff failure occurs), then the UT 1602 performs the Radio Connection Re-establishment procedure.

At step 9, the UT 1602 derives the new KA×P, KUPenc, Kint, and Kenc to be used when the UT 1602 performs the handoff to the target A×P 1612.

Referring to FIG. 17, for RL-AM data bearers, the UT 1602 resets the MAC and RL states (step 10). For RL-UM data bearers, the UT 1602 resets the MAC, RL, and states. The UT 1602 subsequently acquires the new cell (e.g., FL synchronization).

At steps 11 and 12, the source A×P 1608 sends a UT Status Transfer message to the target A×P 1612 via the MM 1614. The source A×P 1608 sends this message to the target A×P 1612 only if at least one data bearer is configured for RL-AM operation. The message contains the following information per RL-AM data bearer: reverse link SN and FN receiver status, forward link SN and FN transmitter status, and (optionally) the receive status of reverse link service data units (SDUs) (if the target A×P 1612 requested the source A×P 1608 to do reverse link data forwarding for an RL-AM data bearer and the source A×P 1608 accepted the request). Also, for RL-AM and RL-UM data bearers, the source A×P 1608 begins to forward in order forward link data (stored in the source A×P 1608 data bearer buffers) to the target A×P 1612. For RL-AM data bearers, this includes all forward link SDUs with their SN for which successful delivery of the corresponding PDU was not confirmed by the UT 1602 (e.g., via RL Status PDU). For RL-AM and RL-UM data bearers, this also includes new forward link data arriving on the designated interface from the SNP 1610. For RL-AM data bearers for which reverse link data forwarding applies, the source A×P 1608 begins to forward reverse link SDUs with their SN that have been received out-of-sequence to the target A×P 1612. For RL-AM data bearers for which reverse link data forwarding does not apply, the source A×P 1608 discards reverse link SDUs that have been received out-of-sequence. For RL-UM data bearers, the source A×P 1608 sends reverse link SDUs that have been received out-of-sequence to the SNP 1610 via the designated interface. Note: If direct forwarding of data applies, the source A×P 1608 forwards data to the target A×P 1612 on an appropriate interface.

If indirect forwarding of data applies, the source A×P 1608 forwards data 1622 to the target A×P 1612 on the designated interface via the SNP 1610. The forwarded data is stored in the target A×P data bearer buffers (step 12).

At step 12, the UT 1602 sends a contention-based Random Access Preamble on the Random Access to the target B×P 1606 (where the source B×P 1604 and the target B×P 1606 may be the same entity). Upon receiving the Random Access Preamble from the UT 1602, the target B×P 1606 validates the received signature sequence. If a dedicated preamble signature is available in the target B×P 1606 and the UT 1602 is assigned a dedicated preamble signature in Step 8, then the UT 1602 sends a contention-free Random Access Preamble on the Random Access to the target B×P 1606 and, consequently, there is no chance of a collision.

At step 14, the target B×P 1606 sends a Random Access Response to the UT 1602 that is addressed to the appropriate RA-RNTI. The Random Access Response contains the paging area, RL grant, and temporary UT-ID.

In the operations of block 1630, the UT 1602 sends a Radio Connection Reconfiguration Complete message to the target A×P 1612 (step 15). The message contains no IEs. The Radio Connection Reconfiguration Complete message is integrity protected and encrypted with the new Kint and Kenc, respectively, and sent in conjunction with a UT-ID MAC control element (CE) and two new MAC control elements: a PAI MAC control element and a location management information (LMI) MAC control element. The UT-ID MAC control element contains the UT-ID assigned to the UT 1602 by the target A×P 1612 in the Radio Connection Reconfiguration message (see Step 8). The PAI MAC control element contains the PAI assigned to the UT 1602 by the target A×P 1612 in Step 8. The LMI MAC control element contains the UT's latest location information. The target B×P 1606 parses the PAI MAC control element in order to determine to which A×P it should forward the Radio Connection Reconfiguration Complete message. The target B×P 1606 may send a Handover Notify message to the MM 1614 at this time (e.g., instead of at step 19). The UT 1602 starts the Contention Resolution Timer.

At step 16, the target B×P 1606 sends to the UT 1602 an RL grant for a new transmission. The RL grant is addressed to the UT-ID that the target A×P 1612 assigned to the UT 1602 in the Radio Connection Reconfiguration message (see Step 8). Upon receiving the RL grant from the target B×P 1606, the UT 1602 stops the Contention Resolution Timer and timer T-4. The UT 1602 may begin to send reverse link signaling on signaling radio bearers (e.g., SRB1 and SRB2) and reverse link data on all data radio bearers (DRBs). The UT 1602 may also begin to receive forward link signaling on SRB1 and SRB2 and forward link forwarded data on all DRBs.

Referring now to FIG. 18, for RL-AM data bearers for which reverse link data forwarding applies, the target A×P 1612 sends a Status Report message to the UT 1602 containing a list of missing and received reverse link PDUs (step 17). The target A×P 1612 uses the information in the UT Status Transfer message from the source A×P 1608 via the MM 1614 (see Step 11) to construct the Status Report. Upon receiving the Status Report message from the target A×P 1612, the UT 1602 does not perform retransmission of any PDU whose successful delivery is confirmed by the Status Report message. After the reverse link PDU retransmissions have been successfully completed, the UT 1602 begins to send new RL-AM reverse link PDUs to the target A×P 1612. Since the reverse link SN is maintained on an RL-AM data bearer basis, the target A×P 1612 uses a windows-based mechanism for in-sequence delivery and duplication avoidance. For RL-UM data bearers, the UT 1602 begins to send new RL-UM reverse link PDUs to the target A×P 1612. The above packet data flow is represented by the arrows 1632, 1634, and 1636.

For all RL-AM data bearers for which the source A×P 1608 has configured the UT 1602 to send a Status Report on the reverse link during re-establishment, the UT 1602 sends a Status Report message to the target A×P 1612 containing a list of missing and received forward link PDUs (step 18). Upon receiving this message, the target A×P 1612 begins to send forward link PDUs to the UE that have been forwarded to the target A×P 1612 by the source A×P 1608 with and without their SNs. This packet data flow is represented by the arrows 1638 and 1640. The target A×P 1612 continues to do this until it receives one or more TP End Marker packets from the source A×P 1608 for that RL-AM data bearer. The target A×P 1612 does not perform retransmission of any PDU whose successful delivery is confirmed by the Status Report message from the UT 1602. Since the forward link SN is maintained on an RL-AM data bearer basis, the UT 1602 uses a windows-based mechanism for in-sequence delivery and duplication avoidance. For RL-UM data bearers, the target A×P 1612 begins to send forward link PDUs to the UT 1602 that have been forwarded to the target A×P 1612 by the source A×P 1608 (without continuing their original SNs because the SN is not maintained on an RL-UM data bearer basis). The target A×P 1612 continues to do this until it receives one or more TP End Marker packets from the source A×P 1608 for each RL-UM data bearer.

Step 19 may occur immediately after Step 15. At step 19, the target A×P 1612 sends a Handoff Notify message to the MM 1614 to inform the MM 1614 that the UT 1602 has been identified in the target cell and the handoff has been completed. The message contains the PAI of the target A×P 1612 and the target cell ID (e.g., target B×P ID indicating the beam in which the UT 1602 has been identified).

At step 20, the MM 1614 sends a Modify Bearer Request message to the SNP 1610. The message contains a list of data bearers which includes the follow information per data bearer: data bearer ID and the target A×P's tunnel ID and IP address for the forward link user plane (in order to uniquely identify the UT's data bearers).

At step 21, the SNP 1610 switches the forward link data path from the source A×P 1608 to the target A×P 1612 and sends one or more TP End Marker packets 1642 per data bearer to the source A×P 1608. The SNP 1610 also begins to send forward link data intended for the UT 1602 directly to the target A×P 1612 (arrows 1644 and 1646). The source A×P 1608 forwards the TP End Marker packet(s) per data bearer to the target A×P 1612. Upon receiving the TP End Marker packet(s) per data bearer from the source A×P 1608, the target A×P 1612 may begin to send forward link data received directly from the SNP 1610 to the UT 1602. Note: If direct forwarding of data applies, the source A×P 1608 forwards the TP End Marker packet(s) 1648 to the target A×P 1612 on an appropriate interface. If indirect forwarding of data applies, the source A×P 1608 forwards data to the target A×P 1612 via the SNP 1610 (arrow 1650).

At step 22, the SNP 1610 sends a Modify Bearer Response message to the MM 1614. The message contains a list of data bearers which includes the following information per data bearer: data bearer ID and cause (e.g., request accepted). At step 23A, the MM 1614 sends a UE Context Release Command message to the source A×P 1608 to request the release of the UT-associated S1-logical connection over the S1 interface. Subsequently, at step 23B, the source A×P 1608 sends a UE Context Release Command message to the MM 1614 to confirm the release of the UT-associated logical connection over the appropriate interface. At step 24, the source A×P 1608 releases the UT radio resources and context. At step 25, the indirect data forwarding tunnel request (from step 6) is deleted. Final packet data flow is represented by lines 1652, 1654, and 1656.

Use of Satellite and Cell Transition Table

In some implementations, an A×P may generate and/or update a satellite and cell transition table, as needed, using one or more of: UT location and/or speed, satellite location, satellite beam/cell patterns, satellite beam/cell turn on/off schedules, or satellite pointing error. The location and/or of a UT, if specified, may be sent by the UT via Radio signaling messages. The locations of a satellite over time may be obtained from the ephemeris data. For example, in a given satellite access network (SAN) that includes multiple SNPs, the NOC/SOC in the SAN may provide the updated satellite ephemeris information to all A×Ps in the SAN.

In some implementations, the system provides to a UT a single row of the satellite and cell transition table (e.g., a row of Table 2 set forth above) to be used for connected mode handoffs. For example, the source A×P/B×P could include the single row of the satellite and cell transition table in an information element (IE) of a Radio Connection Reconfiguration message that is sent to the UT while the UT is still on the serving cell. Thus, while a UT is being served by one cell/beam, the UT may receive satellite and cell transition information that the UT is to use to transition to another cell/beam.

Configuration Messages at B×P Handoff

As mentioned above, each satellite beam may be regarded as a separate cell with its own data and control channels, and signals. When a UT is handing over from one to another cell, some of the radio configuration parameters that were valid for the source cell may change and need to be updated for UT operation on the target cell.

The radio message used for radio reconfiguration of the radio parameters for the serving cell is also used to deliver the updated configuration parameters for the target cell.

The A×P communicates the reconfiguration parameters for the target cell to the source cell (step 1 in FIG. 11, and also applicable to the Radio Connection Reconfiguration delivery in FIG. 12, FIG. 13, and FIG. 14). The reconfiguration message for the target cell is delivered to a UT by the source cell before the handoff occurs, as depicted in the step 1 in FIG. 11. The transmission of the message needs to be done sufficiently in advance of the handoff, so the UT has time to receive the message in a timely manner to allow for reliable transmission. Upon receiving the reconfiguration message for the target cell, the UT stores it and applies the reconfiguration once it starts the communication on the target cell.

The handoff is performed based on the handoff transition table (Table 3), and follows the procedures defined for B×P handoff. The new configuration is applied at the handoff time, so that the UT is appropriately configured for the new serving cell before the data and control exchange starts.

The Radio Reconfiguration message for the target beam may include the radio parameters that are UT specific (dedicated) and cell specific (common). Those can be the following: Dedicated, MAC configuration, Parameters related to discontinuous reception (DRX), Power headroom reporting (PHR), Buffer status reporting (BSR) scheduling request (SR), HARQ, SPS configuration, Parameters for semi-persistent scheduling (periodicity, resources), PHY configuration, Dedicated PHY parameters related to the power control of data and control channels, CQI reporting, sounding reference signal (SRS), and SR, Random Access configuration, UT-ID, PCI, Common Radio resource configuration, Common parameters for Random Access (such as preamble info, power control, supervision info), Physical Random Access (such as root sequence info and Physical Random Access configuration index), reference signal power and power control, RL reference signals, ACK/NACK and CQI mapping, SRS (such as bandwidth and sub-frame configuration), p-Max (used to limit UTs' RL transmission power in the cell). Note that since the UT-ID is provided to a UT for each serving cell, the 16 bit UT-ID may be sufficient to uniquely address the provisioned number of about 5000 UTs per cell.

Radio Link Failure

During normal operation, when a UT is handed-off from one satellite or cell/beam to another satellite or cell/beam, the signaling for the handoff is completed between the SNP entity supporting the handoff and the UT. If the UT loses communication with the SNP before the handoff signaling is completed, a radio link failure (RLF) may be declared (e.g., at the UT). RLF can occur in the system because of a UT losing connection to a cell for various possible reasons—for example, fading effects due to rain or snow, or due to blocking by a building or a tree. In this case, the UT may employ an RLF recovery mechanism to re-establish communication with the SNP. The RLF procedure tries to re-connect the UT to the same source cell or to a different (e.g., target) cell.

Figure 19:
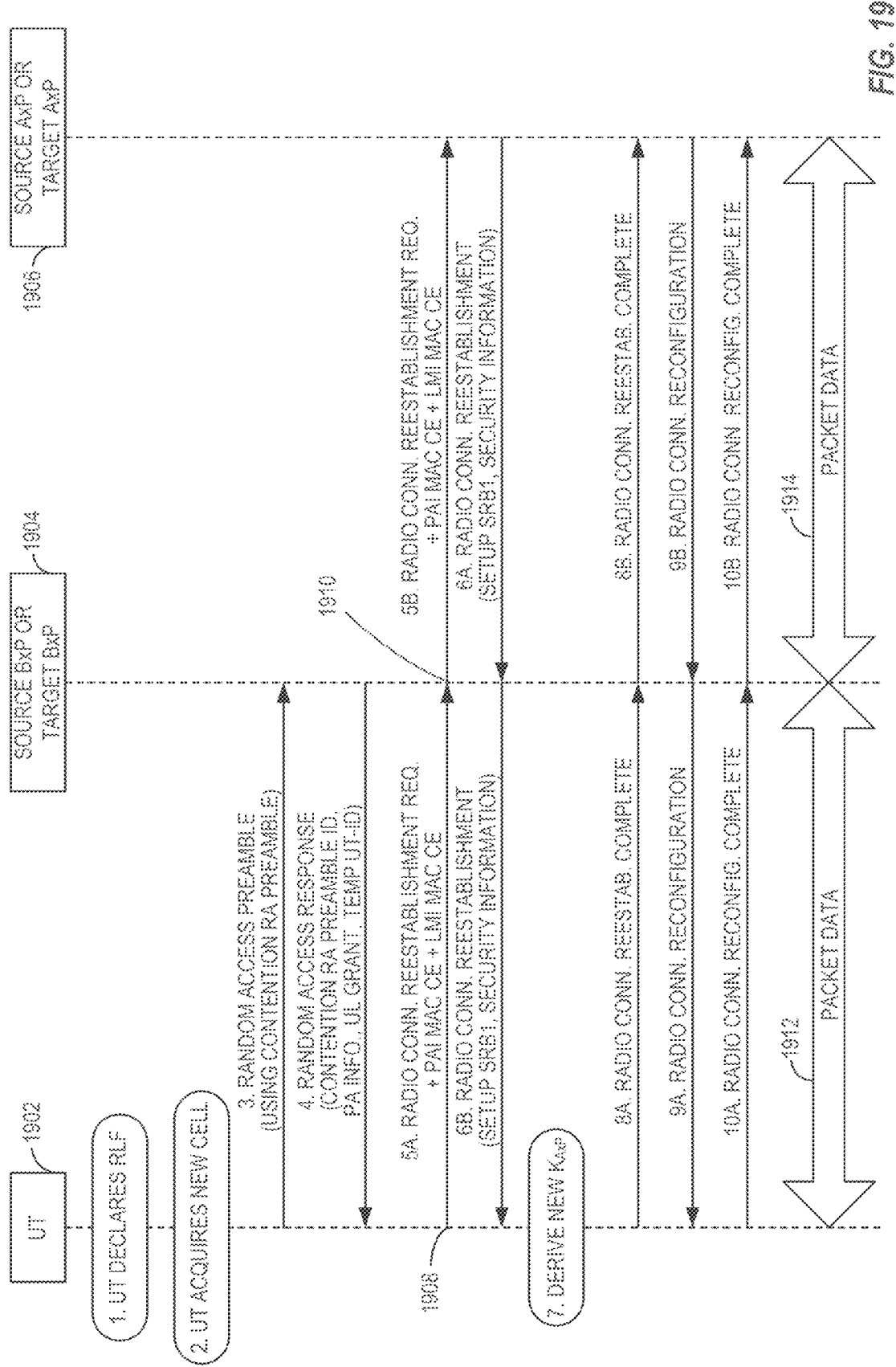
FIG. 19 is a diagram illustrating an example of a call flow for radio link failure in accordance with some aspects of the disclosure.

FIG. 19 illustrates an example of a call flow for an RLF procedure. The call flow is between a UT 1902, a source B×P a target B×P 1904, and a source A×P or a target A×P 1906. A description of the steps of the call flow follows.

At step 1, radio link detection procedures are used to detect RLF (e.g., problems with the radio link connection). This can be done either at the physical layer (example: if SNR is lower than a certain threshold), or at the MAC layer (example: if a certain number of packets are decoded in error), or at the RL layer (example: if maximum number of RL retransmissions has been reached for a message). The UT 1902 initiates a Radio Connection Re-establishment procedure by starting a target satellite and cell search and selection procedure.

After the UT 1902 acquires a suitable target satellite and cell (step 2), the UT 1902 sends a contention-based Random Access Preamble on the Random Access to the target B×P 1904 (step 3). Upon receiving the Random Access Preamble from the UT 1902, the target B×P 1904 validates the received signature sequence. The target B×P 1904 could be the same as the source B×P (e.g., the UT 1902 chooses the same cell that it was connected to before RLF occurred).

At step 4, the target B×P 1904 sends a Random Access Response to the UT 1902 that is addressed to the appropriate UT-ID. The Random Access Response contains the paging area, an RL grant, and a temporary UT-ID.

At step 5, the UT 1902 sends a Radio Connection Reestablishment Request message in conjunction with two new MAC control elements (PAI MAC control element and LMI MAC control element) to the appropriate target A×P 1906. The Radio Connection Reestablishment message contains the UT's old UT-ID, old PCI and a MAC-I for verification during the Radio Connection Re-establishment procedure. The PAI MAC control element contains the most recent PAI assigned to the UT 1902 by the source A×P. The PAI belongs to the target A×P if the handover was in progress before RLF; otherwise, the PAI belongs to the source A×P. The LMI MAC control element contains the UT's latest location information. The target B×P 1904 parses the PAI MAC control element and LMI MAC control element to determine to which A×P it should forward the Radio Connection Reestablishment Request message. If the LMI MAC control element indicates an Administrative Region not handled by the A×P mapped to the PAI MAC control element, then the target B×P 1904 forwards the Radio Connection Reestablishment Request message to the appropriate target A×P (which will result in a Radio Connection Re-establishment procedure failure and cause the UT 1902 to initiate a NAS recover procedure (e.g., a Service Request procedure)). The UT 1902 starts timer T-3. If T-3 expires (e.g., the Radio Connection Re-establishment procedure fails), then the UT 1902 performs the NAS Service Request procedure.

At step 6, the target A×P 1906 sends a Radio Connection Reestablishment message in conjunction with a UE Contention Resolution Identity MAC control element (in order to provide contention resolution) to the UT 1902. The Radio Connection Reestablishment message contains security configuration information that is used by the UT 1902 to derive new control plane and user plane keys (see Step 7). The message may also contain SRB1 configuration information.

At step 7, the UT 1902 derives the new KA×P, KUPenc, Kint, and Kenc to be used with the re-established radio connection.

At step 8, the UT 1902 sends a Radio Connection Reestablishment Complete message to the target A×P 1906. The message contains no IEs and is integrity protected and encrypted with the new Kint and Kenc, respectively.

At step 9, the target A×P 1906 sends a Radio Connection Reconfiguration message to the UT 1902. The message contains SRB2 and DRB configuration information.

At step 10, the UT 1902 sends a Radio Connection Reconfiguration Complete message to the target A×P 1906. The message contains no IEs. Final packet data flow is represented by lines 1912 and 1914.

Example Operations

With the above in mind, additional examples of operations that may be performed by a UT and/or an SNP in support of handoff of the UT will now be described with respect to FIGS. 20-34.

Figure 20:
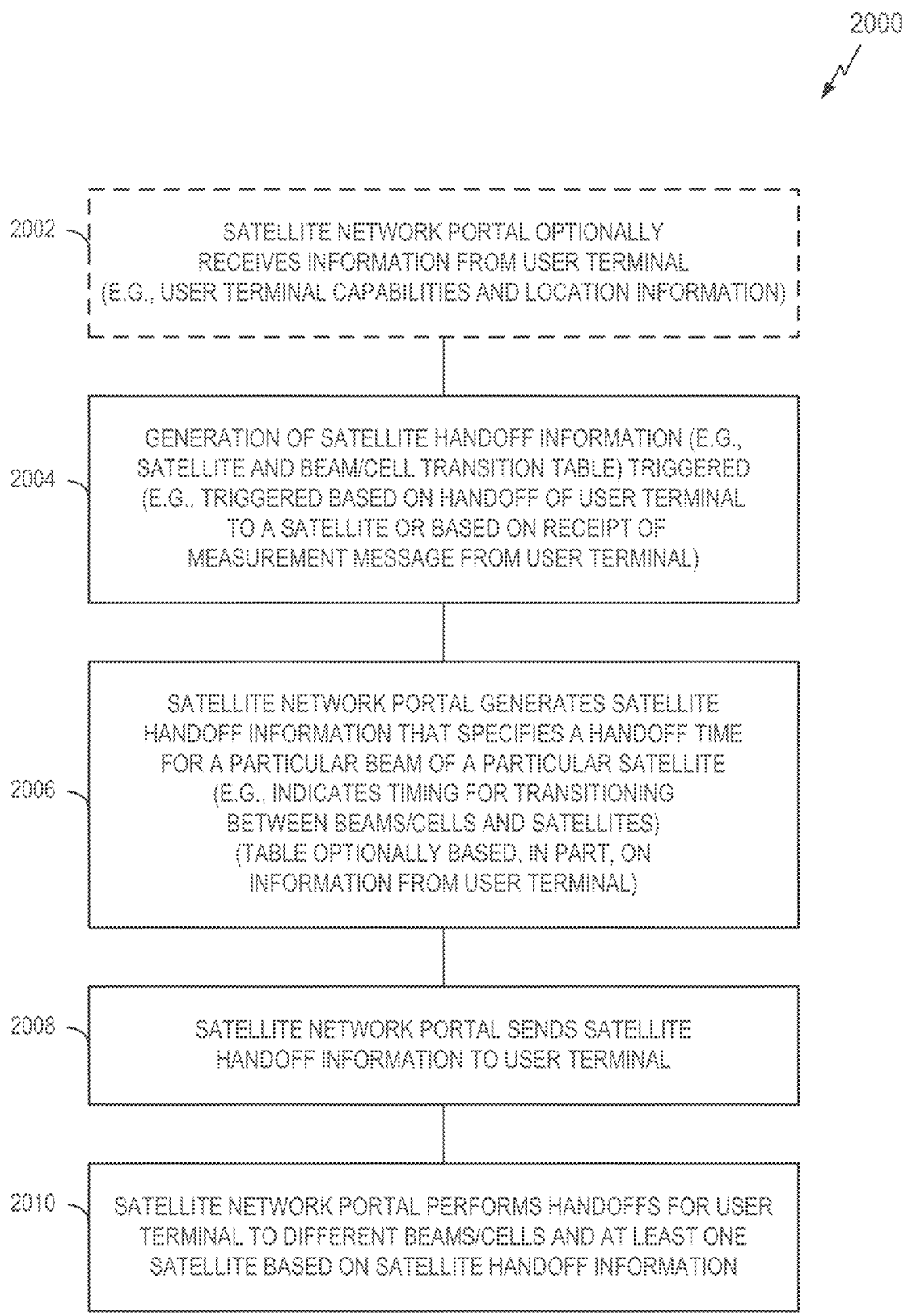
FIG. 20 is a diagram illustrating an example of generating and using a satellite and cell transition table in accordance with some aspects of the disclosure.

FIG. 20 is a diagram illustrating an example of a process 2000 for generating and using satellite handoff information in accordance with some aspects of the disclosure. The process 2000 may take place within a processing circuit which may be located in an SNP or some other suitable apparatus (device). In some implementations, the process 2000 represents operations performed by the SNP controller 250 of FIG. 2. In some implementations, the process 2000 represents operations performed by the apparatus 3500 of FIG. 35 (e.g., by the processing circuit 3510). Of course, in various aspects within the scope of the disclosure, the process 2000 may be implemented by any suitable apparatus capable of supporting communication-related operations.

At block 2002, an SNP (or other suitable apparatus) optionally receives information from a user terminal. For example, the SNP may receive user terminal capabilities and location information.

At block 2004, the generation of satellite handoff information is triggered at the SNP (or other suitable apparatus). This information may comprise some or all of a satellite and beam/cell transition table. For example, the generation of the table may be triggered based on handoff of a user terminal to a satellite or based on receipt of a measurement message from the user terminal.

At block 2006, the SNP (or other suitable apparatus) generates satellite handoff information that specifies a handoff time for a particular beam of a particular satellite. For example, the information may be a table that indicates timing for transitioning between cells/beams and satellites. In some aspects, the table is optionally based, in part, on information received from the user terminal at block 2002.

At block 2008, the SNP (or other suitable apparatus) sends the satellite handoff information to the user terminal.

At block 2010, the SNP (or other suitable apparatus) performs handoffs for the user terminal to different cells/beams and at least one satellite based on the satellite handoff information.

Figure 21:
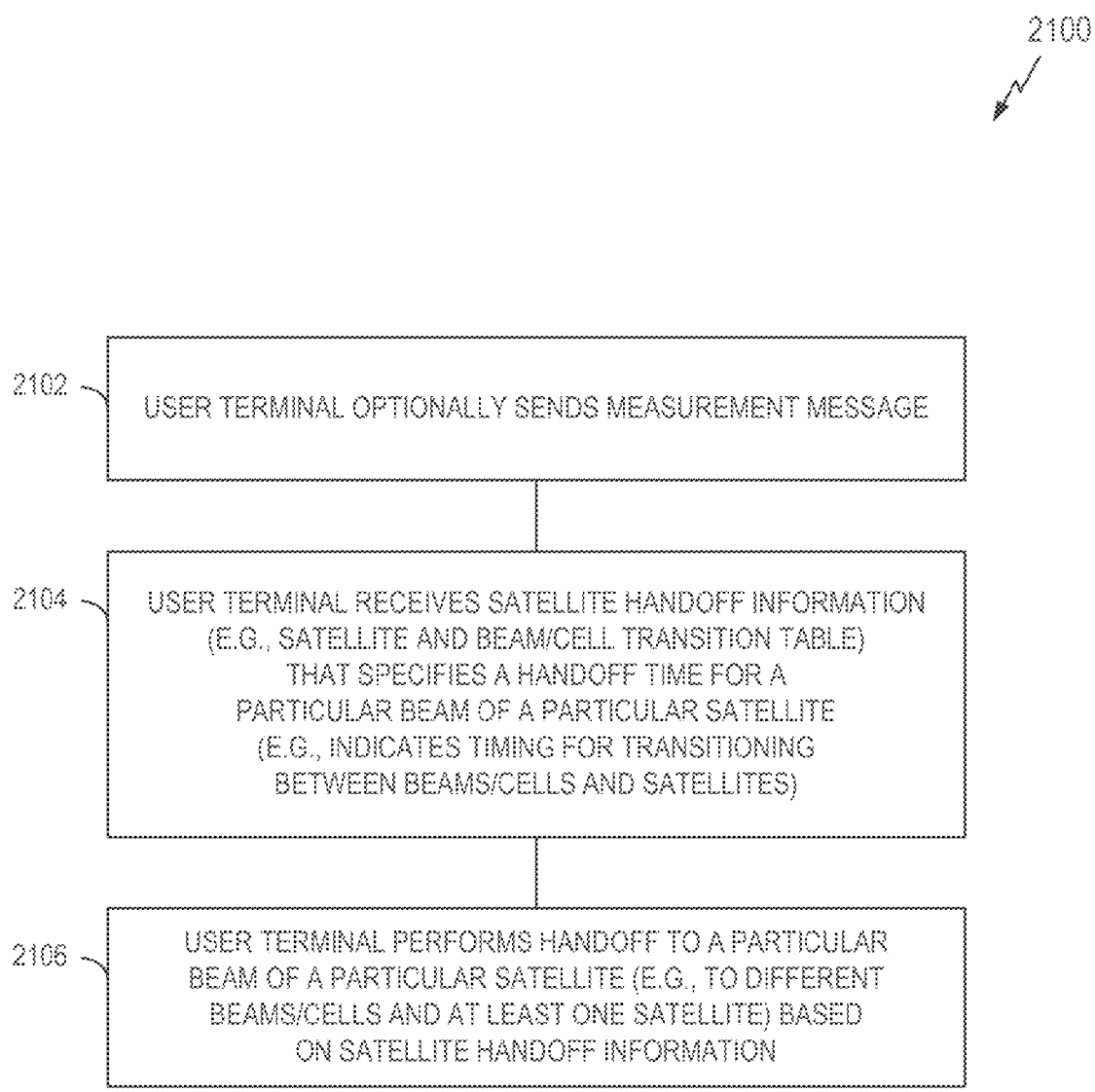
FIG. 21 is a diagram illustrating an example of using a satellite and cell transition table in accordance with some aspects of the disclosure.

FIG. 21 is a diagram illustrating an example of a process 2100 for using satellite handoff information in accordance with some aspects of the disclosure. The process 2100 may take place within a processing circuit which may be located in a user terminal or some other suitable apparatus (device). In some implementations, the process 2100 represents operations performed by the control processor 420 of FIG. 4. In some implementations, the process 2100 represents operations performed by the apparatus 3800 of FIG. 38 (e.g., by the processing circuit 3810). Of course, in various aspects within the scope of the disclosure, the process 2100 may be implemented by any suitable apparatus capable of supporting communication-related operations.

At block 2102, a user terminal (or other suitable apparatus) optionally sends a measurement message.

At block 2104, the user terminal (or other suitable apparatus) receives satellite handoff information that specifies a handoff time for a particular beam of a particular satellite. For example, the information may be a table that indicates timing for transitioning between cells/beams and satellites.

At block 2106, the user terminal (or other suitable apparatus) performs handoffs to a particular beam of a particular satellite (e.g., to different cells/beams and at least one satellite) based on the satellite handoff information.

Figure 22:
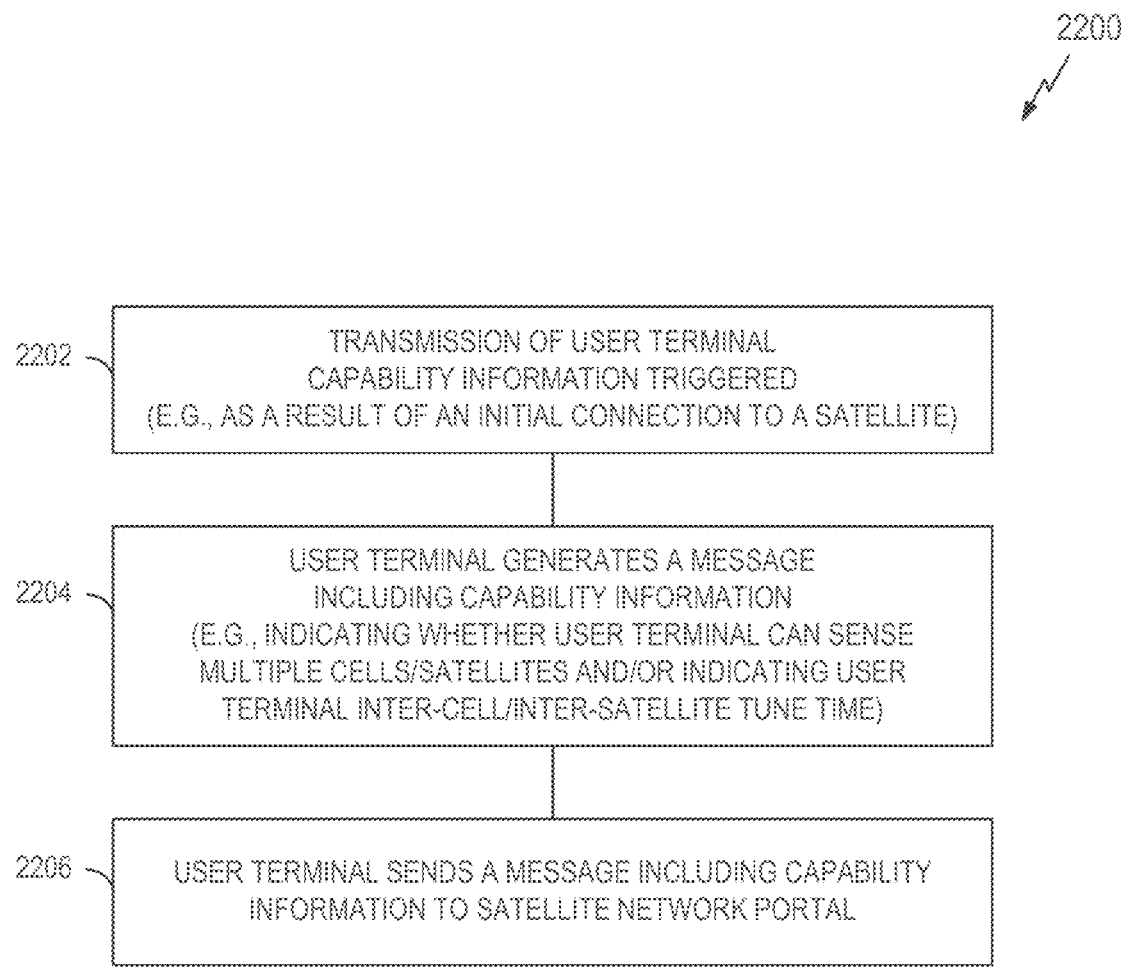
FIG. 22 is a diagram illustrating an example of signaling user terminal capabilities in accordance with some aspects of the disclosure.

FIG. 22 is a diagram illustrating an example of a process 2200 for signaling user terminal capability information in accordance with some aspects of the disclosure. The process 2200 may take place within a processing circuit which may be located in a user terminal or some other suitable apparatus (device). In some implementations, the process 2200 represents operations performed by the control processor 420 of FIG. 4. In some implementations, the process 2200 represents operations performed by the apparatus 3800 of FIG. 38 (e.g., by the processing circuit 3810). Of course, in various aspects within the scope of the disclosure, the process 2200 may be implemented by any suitable apparatus capable of supporting communication-related operations.

At block 2202, the transmission of user terminal capability information is triggered at a user terminal (or other suitable apparatus). For example, the transmission may be triggered as a result of an initial connection to a satellite.

At block 2204, the user terminal (or other suitable apparatus) generates a capabilities message. In some aspects, the message indicates whether the UT can sense multiple cells/beams and/or satellites and/or the message indicates UT inter-cell/beam and/or inter-satellite tune time.

At block 2206, the user terminal (or other suitable apparatus) sends the capabilities message to an SNP.

Figure 23:
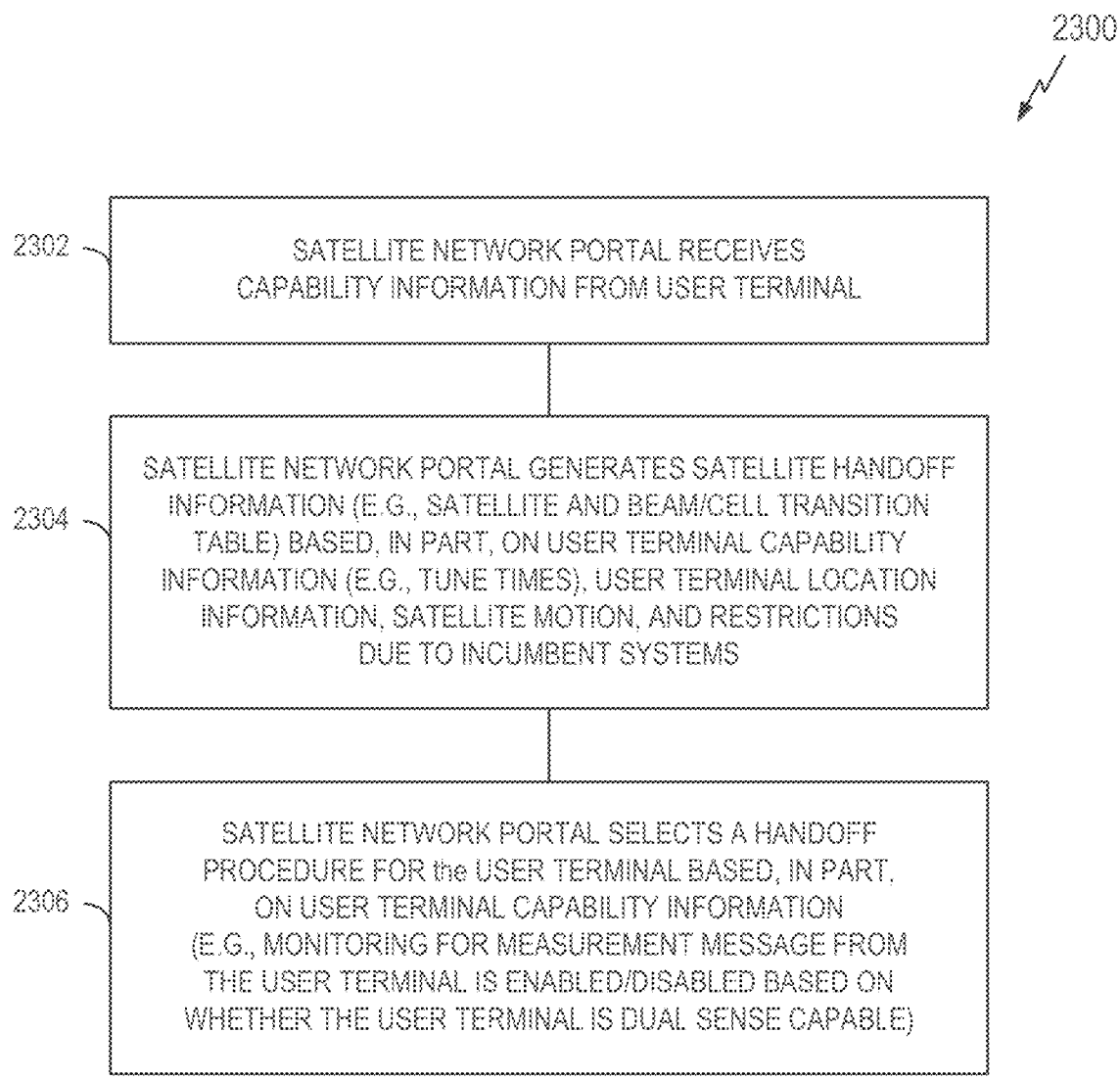
FIG. 23 is a diagram illustrating an example of using user terminal capabilities in accordance with some aspects of the disclosure.

FIG. 23 is a diagram illustrating an example of a process 2300 for using user terminal capabilities in accordance with some aspects of the disclosure. The process 2300 may take place within a processing circuit which may be located in an SNP or some other suitable apparatus (device). In some implementations, the process 2300 represents operations performed by the SNP controller 250 of FIG. 2. In some implementations, the process 2300 represents operations performed by the apparatus 3500 of FIG. 35 (e.g., by the processing circuit 3510). Of course, in various aspects within the scope of the disclosure, the process 2300 may be implemented by any suitable apparatus capable of supporting communication-related operations.

At block 2302, an SNP (or other suitable apparatus) receives a capabilities message from a user terminal. This capabilities message includes user terminal capability information.

At block 2304, the SNP (or other suitable apparatus) generates satellite handoff information. For example, a table or a portion of a table may be generated based, in part, on the user terminal capability information (e.g., tune times), user terminal location information, satellite motion, ephemeris information, and a restriction due to incumbent systems.

At block 2306, the SNP (or other suitable apparatus) selects a handoff procedure for the user terminal based, in part, on the user terminal capability information. For example, monitoring for a measurement message from a user terminal may be enabled or disabled based on whether the user terminal is dual sense capable. Thus, an apparatus may enable or disable whether the apparatus monitors for a measurement message based on the user terminal capability information.

Figure 24:
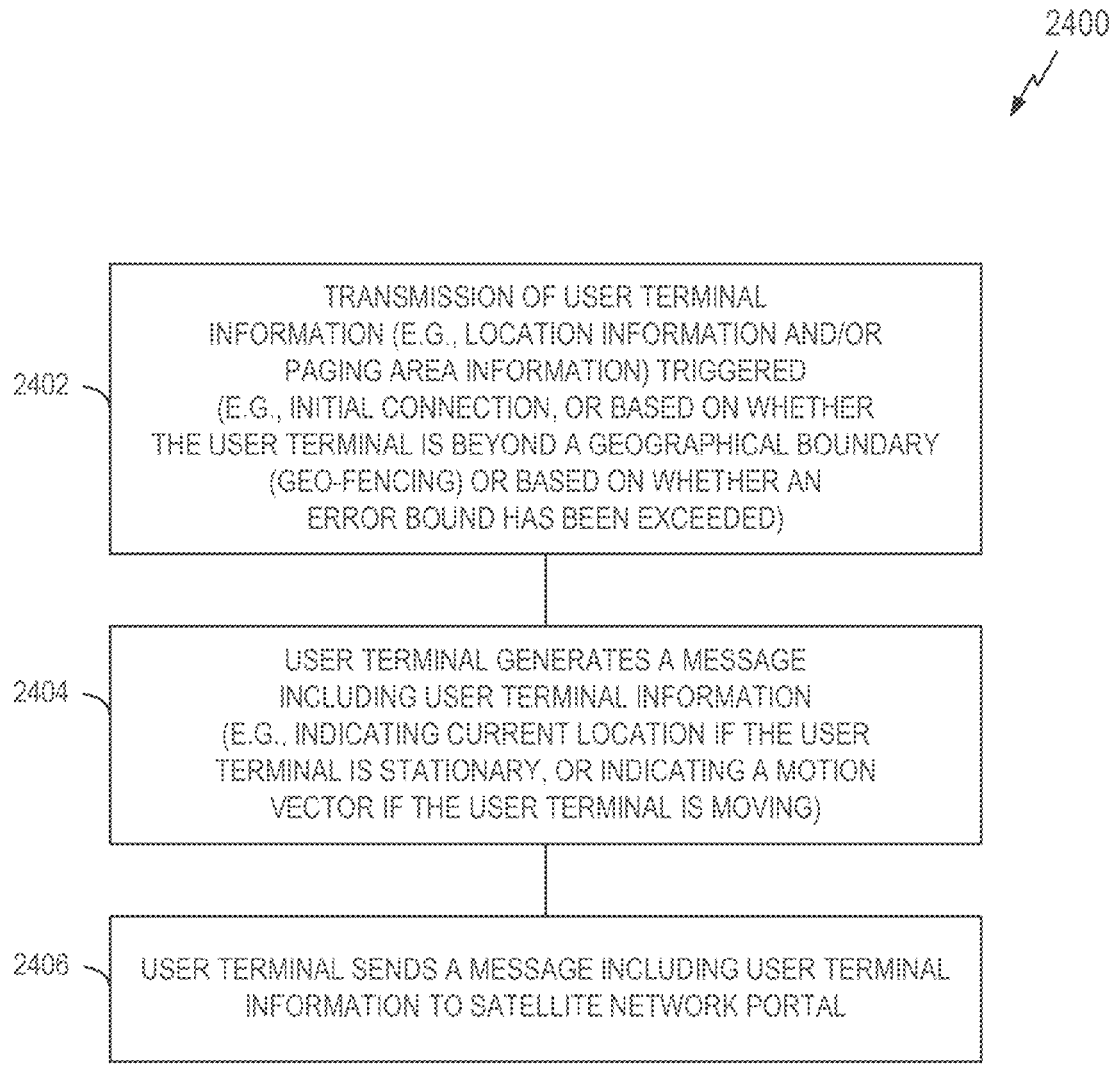
FIG. 24 is a diagram illustrating an example of signaling user terminal location information in accordance with some aspects of the disclosure.

FIG. 24 is a diagram illustrating an example of a process 2400 for signaling user terminal location information in accordance with some aspects of the disclosure. The process 2400 may take place within a processing circuit which may be located in a user terminal or some other suitable apparatus (device). In some implementations, the process 2400 represents operations performed by the control processor 420 of FIG. 4. In some implementations, the process 2400 represents operations performed by the apparatus 3800 of FIG. 38 (e.g., by the processing circuit 3810). Of course, in various aspects within the scope of the disclosure, the process 2400 may be implemented by any suitable apparatus capable of supporting communication-related operations.

At block 2402, the transmission of user terminal location information is triggered at a user terminal (or other suitable apparatus). This may be the result of an initial connection, or based on whether the UT is beyond a geographical boundary (geo-fencing), or based on whether an error bound has been exceeded.

At block 2404, the user terminal (or other suitable apparatus) generates a location message. In some aspects, the message may indicate the current location if the UT is stationary, or indicate a motion vector if the UT is moving.

At block 2406, the user terminal (or other suitable apparatus) sends the location message to an SNP.

Figure 25:
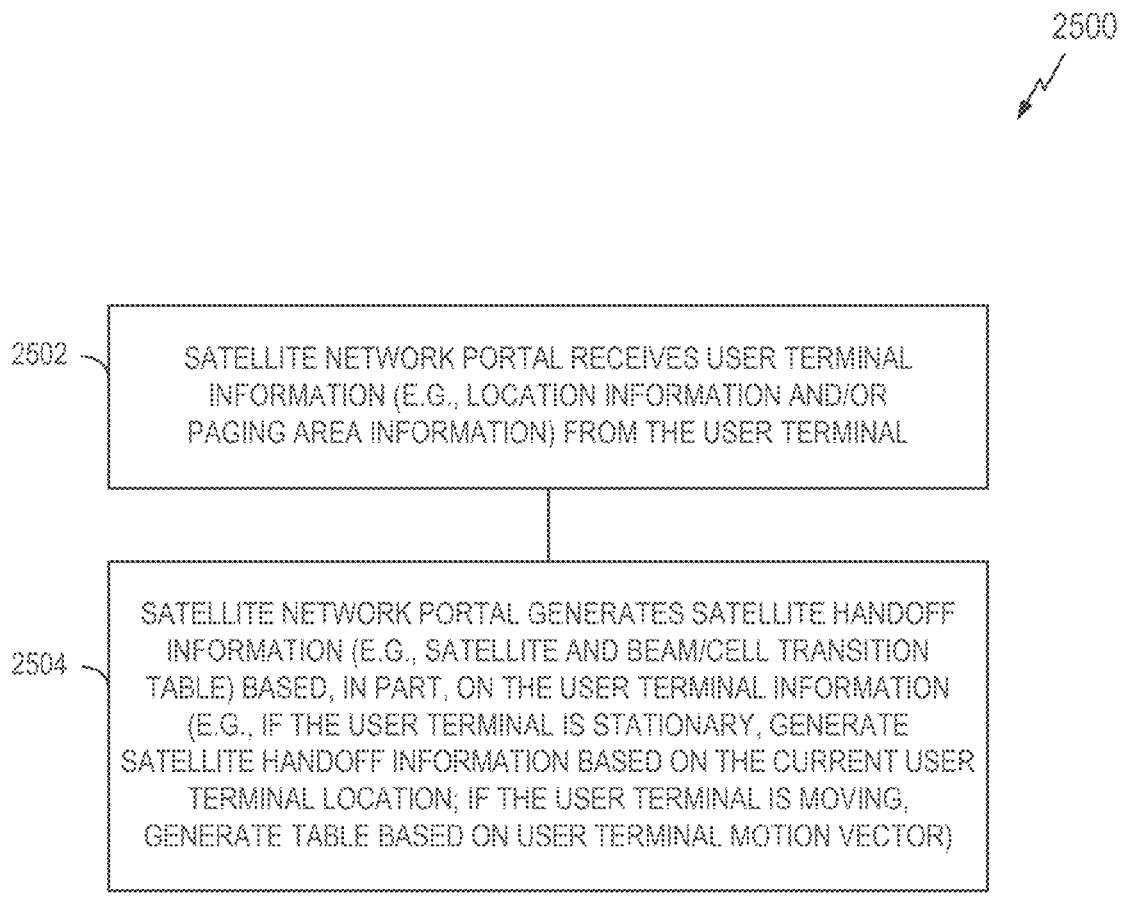
FIG. 25 is a diagram illustrating an example of using user terminal location information in accordance with some aspects of the disclosure.

FIG. 25 is a diagram illustrating an example of a process 2500 for using user terminal location information in accordance with some aspects of the disclosure. The process 2500 may take place within a processing circuit which may be located in an SNP or some other suitable apparatus (device).

In some implementations, the process 2500 represents operations performed by the SNP controller 250 of FIG. 2. In some implementations, the process 2500 represents operations performed by the apparatus 3500 of FIG. 35 (e.g., by the processing circuit 3510). Of course, in various aspects within the scope of the disclosure, the process 2500 may be implemented by any suitable apparatus capable of supporting communication-related operations.

At block 2502, an SNP (or other suitable apparatus) receives a location message from a user terminal. This location message includes user terminal location information.

At block 2504, the SNP (or other suitable apparatus) generates satellite handoff information based, in part, on user terminal location information. For example, if the UT is stationary, the SNP may generate a table or a portion of a table based on the current UT location. As another example, if the UT is moving, the SNP may generate the table (or portion) based on a UT motion vector.

Figure 26:
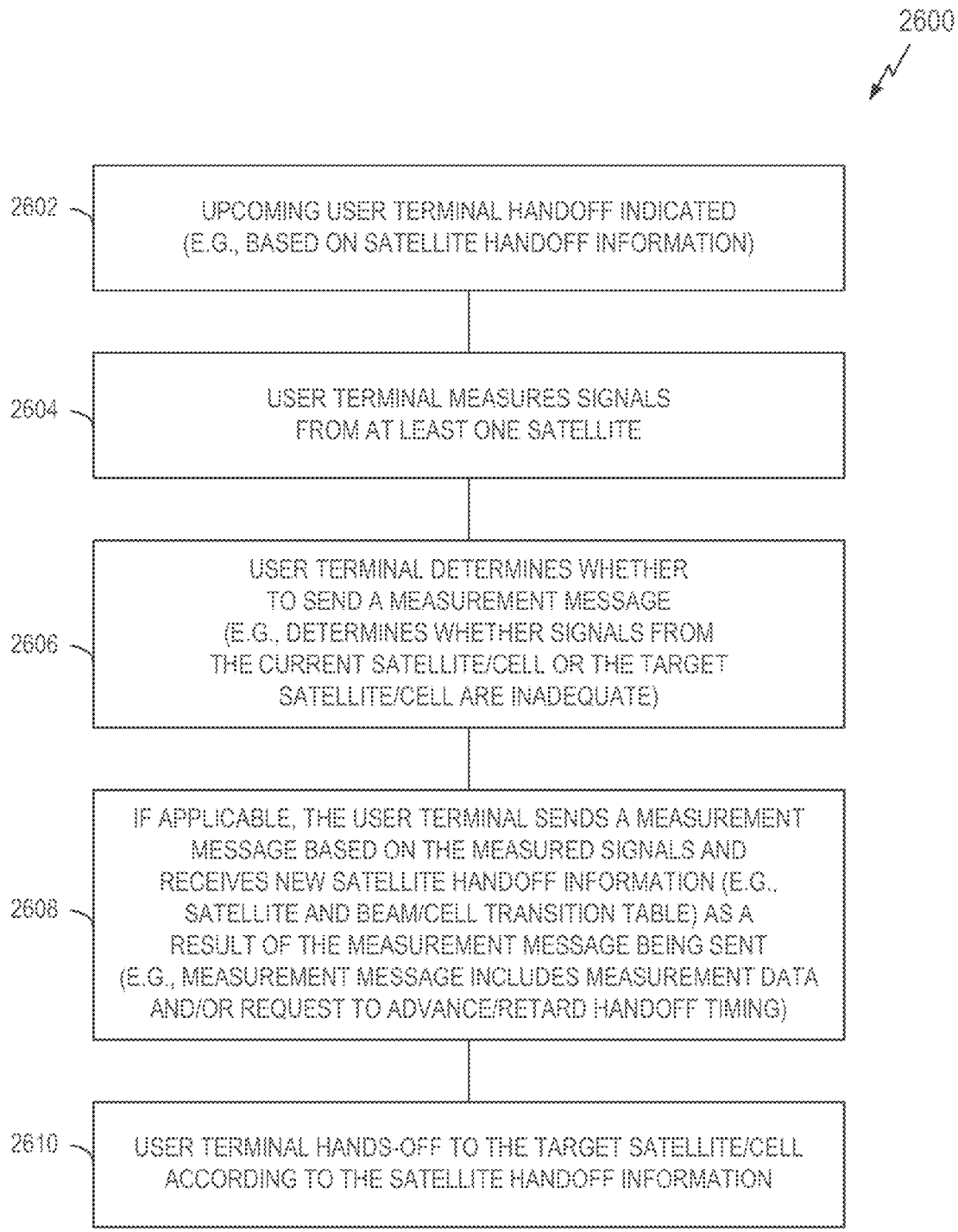
FIG. 26 is a diagram illustrating an example of user terminal handoff operations in accordance with some aspects of the disclosure.

FIG. 26 is a diagram illustrating an example of a user terminal handoff process 2600 in accordance with some aspects of the disclosure. The process 2600 may take place within a processing circuit which may be located in a user terminal or some other suitable apparatus (device). In some implementations, the process 2600 represents operations performed by the control processor 420 of FIG. 4. In some implementations, the process 2600 represents operations performed by the apparatus 3800 of FIG. 38 (e.g., by the processing circuit 3810). Of course, in various aspects within the scope of the disclosure, the process 2600 may be implemented by any suitable apparatus capable of supporting communication-related operations.

At block 2602, an upcoming user terminal handoff is indicated at a user terminal (or other suitable apparatus). For example, the handoff may be indicated based on satellite handoff information.

At block 2604, the user terminal (or other suitable apparatus) measures satellite signals (e.g., signals from the satellites indicated in the satellite handoff information).

At block 2606, the user terminal (or other suitable apparatus) determines whether to send a measurement message. In some aspects, this determination may involve determining whether signals from the current cell/beam and/or satellite or whether signals from the target cell/beam and/or satellite are inadequate.

At block 2608, if applicable, the user terminal (or other suitable apparatus) sends a measurement message and receives new satellite handoff information. In some aspects, the message may include measurement data and/or a request to advance/retard handoff timing. Thus, in some aspects, the user terminal may send a measurement message based on the signals measured at block 2604 and receive the satellite handoff information as a result of sending the measurement message.

At block 2610, the user terminal (or other suitable apparatus) hands-off to the target cell/beam and/or satellite according to the satellite handoff information.

Figure 27:
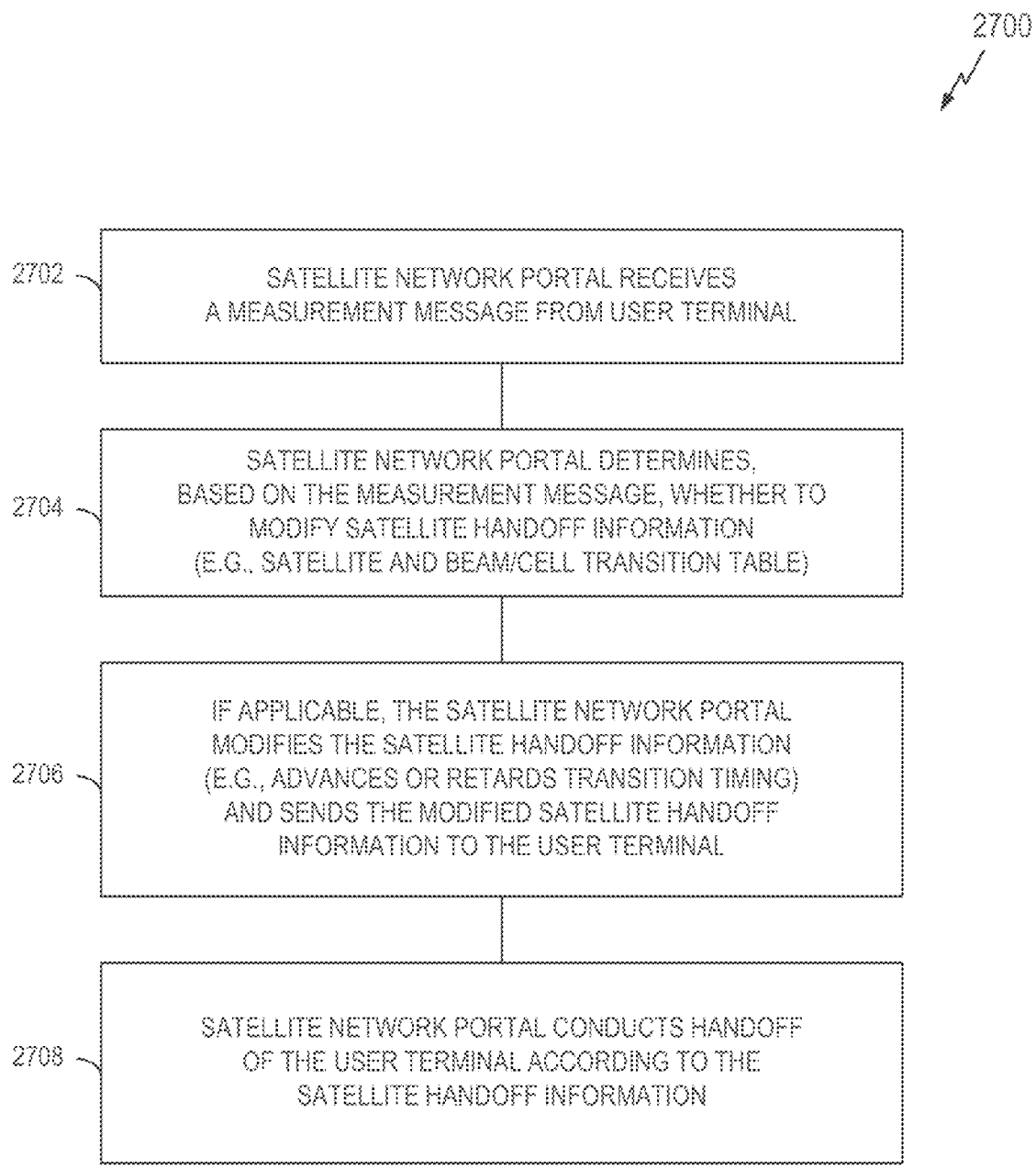
FIG. 27 is a diagram illustrating an example of SNP handoff operations in accordance with some aspects of the disclosure.

FIG. 27 is a diagram illustrating an example of an SNP handoff process 2700 in accordance with some aspects of the disclosure. The process 2700 may take place within a processing circuit which may be located in an SNP or some other suitable apparatus (device). In some implementations, the process 2700 represents operations performed by the SNP controller 250 of FIG. 2. In some implementations, the process 2700 represents operations performed by the apparatus 3500 of FIG. 35 (e.g., by the processing circuit 3510). Of course, in various aspects within the scope of the disclosure, the process 2700 may be implemented by any suitable apparatus capable of supporting communication-related operations.

At block 2702, an SNP (or other suitable apparatus) receives a measurement message from a user terminal.

At block 2704, the SNP (or other suitable apparatus) determines, based on the measurement message, whether to modify the satellite handoff information.

At block 2706, if applicable, the SNP (or other suitable apparatus) modifies the satellite handoff information (e.g., advances or retards transition timing) and sends the modified satellite handoff information to the user terminal.

At block 2708, the SNP (or other suitable apparatus) conducts a handoff of the user terminal according to the satellite handoff information.

Figure 28:
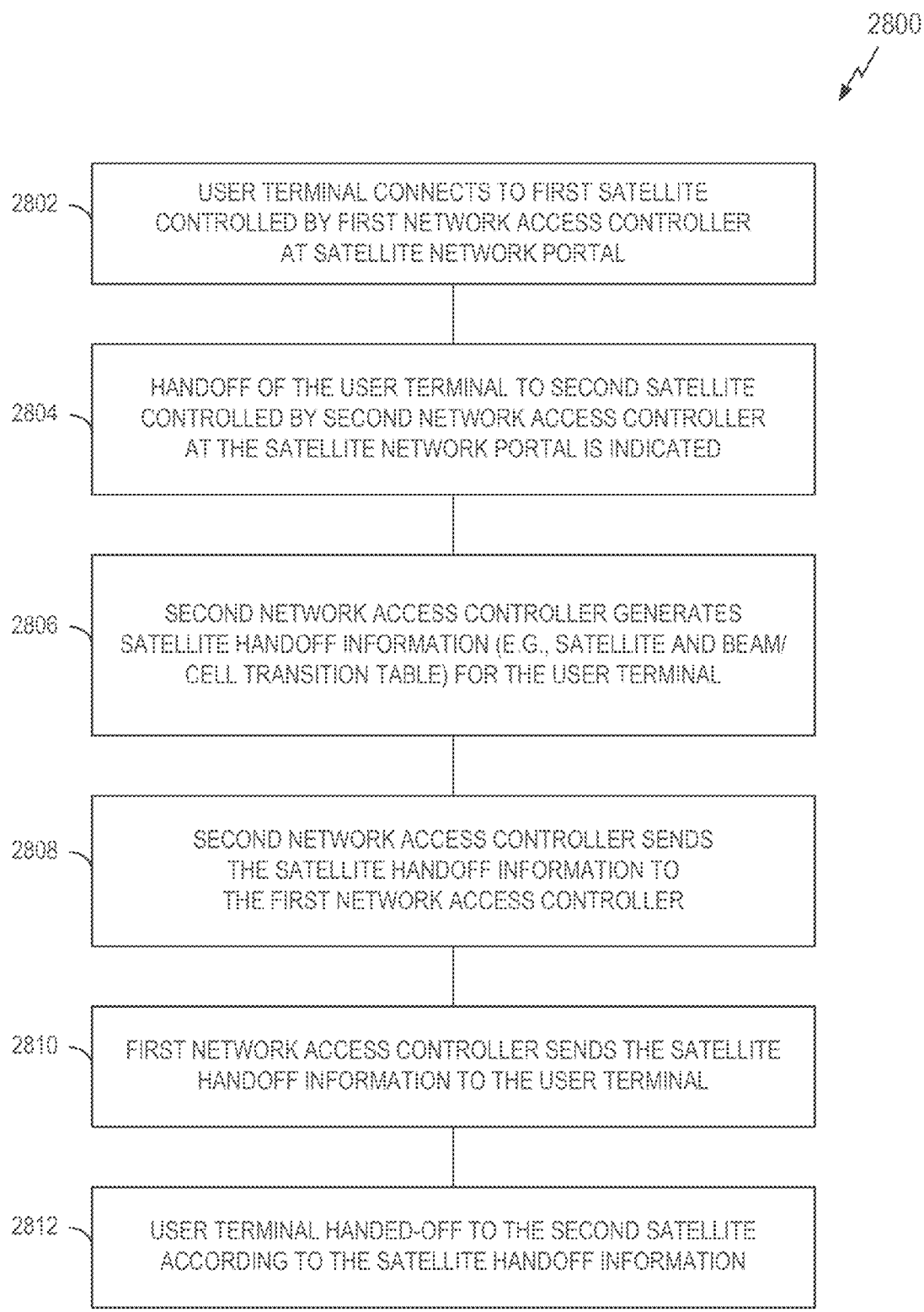
FIG. 28 is a diagram illustrating another example of inter-satellite handoff signaling in accordance with some aspects of the disclosure.

FIG. 28 is a diagram illustrating another example of an inter-satellite handoff signaling process 2800 in accordance with some aspects of the disclosure. The process 2800 may take place within a processing circuit which may be located in an SNP, a user terminal, or some other suitable apparatuses (devices). In some implementations, the process 2800 represents one or more operations performed by the SNP controller 280 of FIG. 2. In some implementations, the process 2800 represents one or more operations performed by the control processor 420 of FIG. 4. In some implementations, the process 2800 represents one or more operations performed by the apparatus 3500 of FIG. 35 (e.g., by the processing circuit 3510). In some implementations, the process 2800 represents one or more operations performed by the apparatus 3800 of FIG. 38 (e.g., by the processing circuit 3810). Of course, in various aspects within the scope of the disclosure, the process 2800 may be implemented by any suitable apparatuses capable of supporting communication-related operations.

At block 2802, a user terminal (or other suitable apparatus) connects to a first satellite controlled by a first NAC at an SNP.

At block 2804, handoff of the user terminal (or other suitable apparatus) to a second satellite controlled by a second NAC at the SNP is indicated.

At block 2806, the second NAC (or other suitable apparatus) generates satellite handoff information for the user terminal.

At block 2808, the second NAC (or other suitable apparatus) sends the satellite handoff information to the first NAC.

At block 2810, the first NAC (or other suitable apparatus) sends the satellite handoff information to the user terminal.

At block 2812, the user terminal (or other suitable apparatus) is handed-off to a second satellite according to the satellite handoff information.

Figure 29:
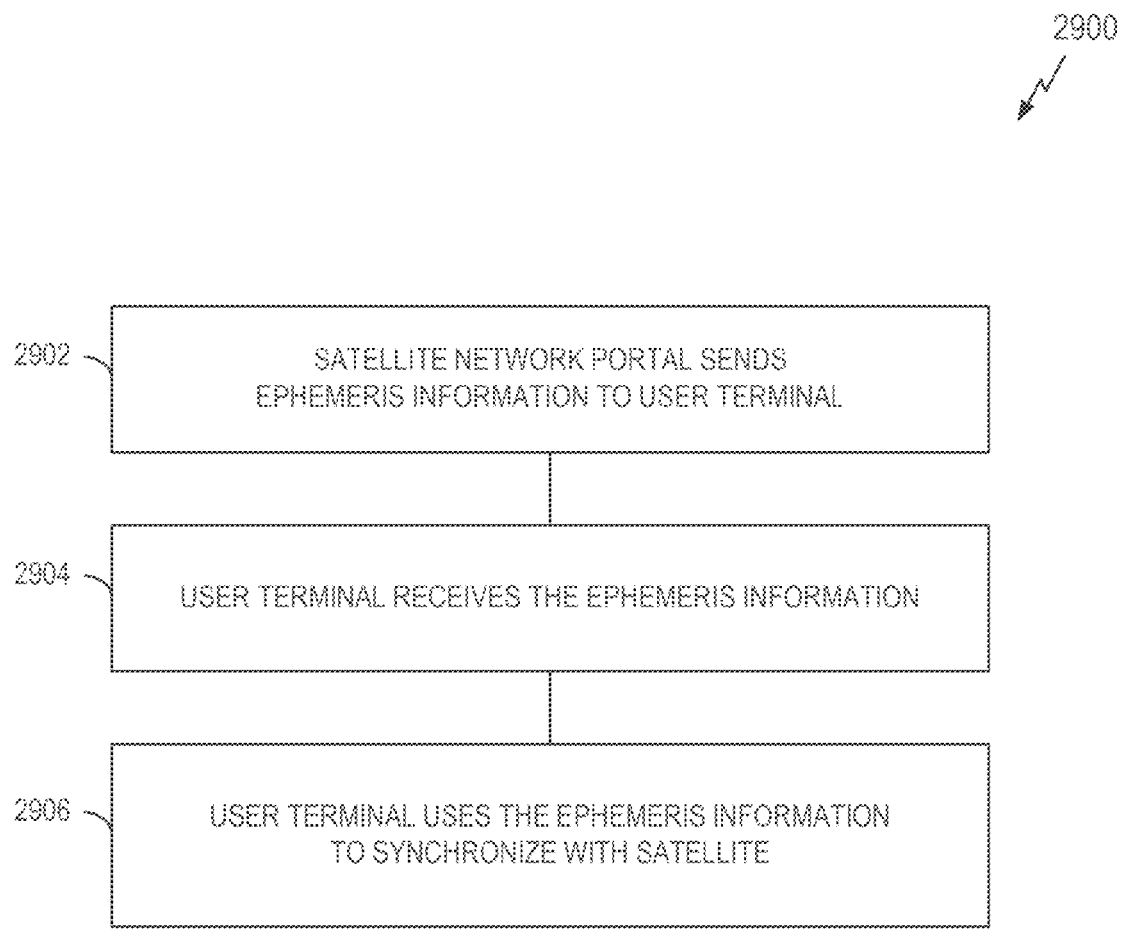
FIG. 29 is a diagram illustrating an example of signaling ephemeris information in accordance with some aspects of the disclosure.

FIG. 29 is a diagram illustrating an example of a process 2900 for signaling ephemeris information in accordance with some aspects of the disclosure. The process 2900 may take place within a processing circuit which may be located in an SNP, a user terminal, or some other suitable apparatuses (devices). In some implementations, the process 2900 represents one or more operations performed by the SNP controller 250 of FIG. 2. In some implementations, the process 2900 represents one or more operations performed by the control processor 420 of FIG. 4. In some implementations, the process 2900 represents one or more operations performed by the apparatus 3500 of FIG. 35 (e.g., by the processing circuit 3510). In some implementations, the process 2900 represents one or more operations performed by the apparatus 3800 of FIG. 38 (e.g., by the processing circuit 3810). Of course, in various aspects within the scope of the disclosure, the process 2900 may be implemented by any suitable apparatuses capable of supporting communication-related operations.

At block 2902, an SNP (or other suitable apparatus) sends ephemeris information to a user terminal.

At block 2904, the user terminal (or other suitable apparatus) receives the ephemeris information.

At block 2906, the user terminal (or other suitable apparatus) uses the ephemeris information to synchronize with a satellite.

Figure 30:
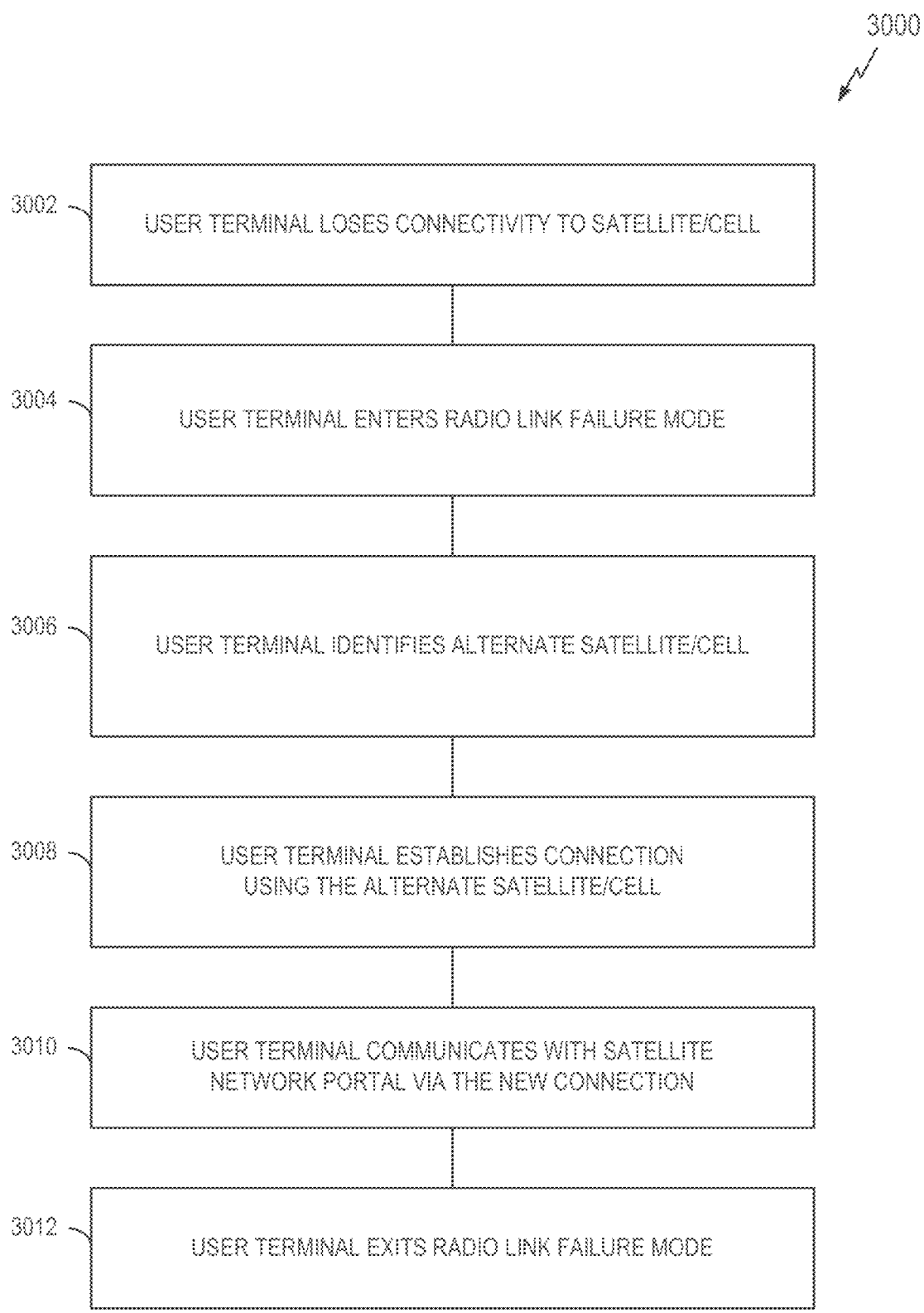
FIG. 30 is a diagram illustrating an example of radio link failure operations in accordance with some aspects of the disclosure.

FIG. 30 is a diagram illustrating an example of a radio link failure process 3000 in accordance with some aspects of the disclosure. The process 3000 may take place within a processing circuit which may be located in a user terminal or some other suitable apparatus (device). In some implementations, the process 3000 represents operations performed by the control processor 420 of FIG. 4. In some implementations, the process 3000 represents operations performed by the apparatus 3800 of FIG. 38 (e.g., by the processing circuit 3810). Of course, in various aspects within the scope of the disclosure, the process 3000 may be implemented by any suitable apparatus capable of supporting communication-related operations.

At block 3002, a user terminal (or other suitable apparatus) loses connectivity to a cell/beam or a satellite.

At block 3004, the user terminal (or other suitable apparatus) enters radio link failure mode.

At block 3006, the user terminal (or other suitable apparatus) identifies an alternate cell/beam and/or satellite (e.g., based on ephemeris information stored at the user terminal).

At block 3008, the user terminal (or other suitable apparatus) establishes a connection using the alternate cell/beam and/or satellite.

At block 3010, the user terminal (or other suitable apparatus) communicates with an SNP via the new connection.

At block 3012, the user terminal (or other suitable apparatus) exits radio link failure mode.

Figure 31:
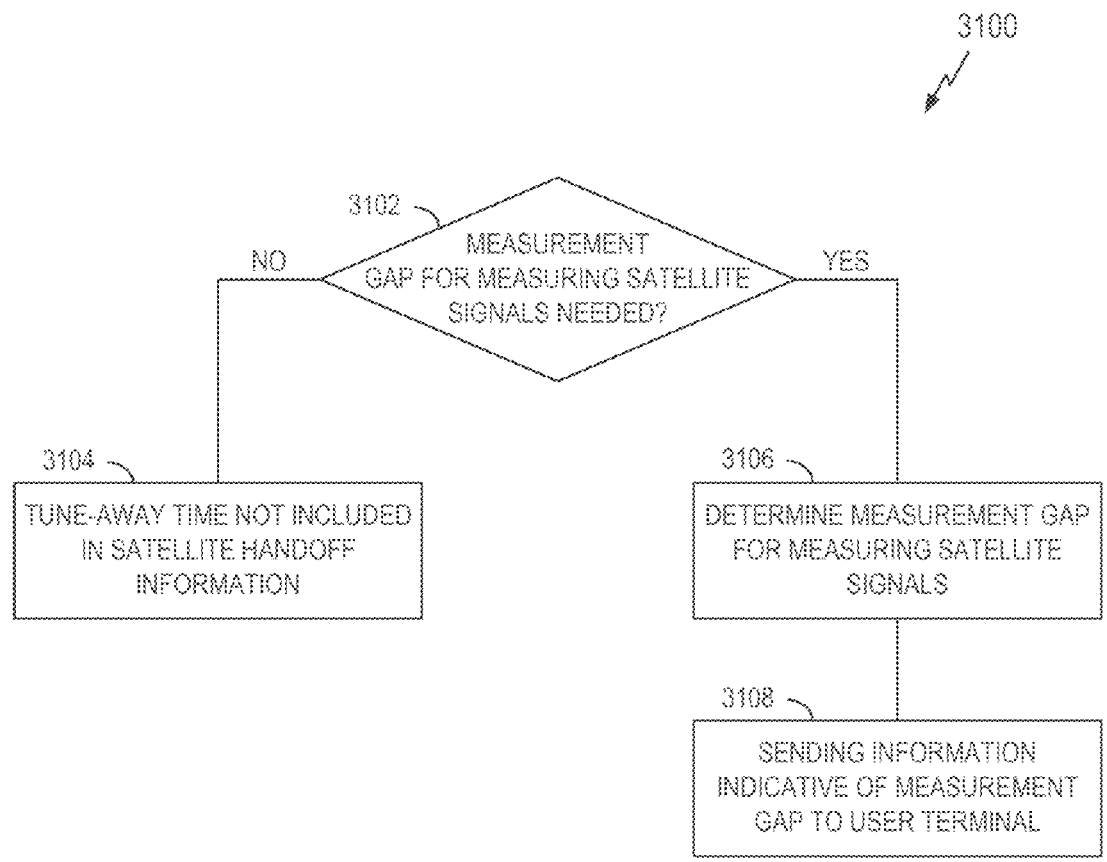
FIG. 31 is a diagram illustrating an example of measurement gap-related operations in accordance with some aspects of the disclosure.

FIG. 31 is a diagram illustrating an example of a measurement gap-related process 3100 in accordance with some aspects of the disclosure. The process 3100 may take place within a processing circuit which may be located in an SNP or some other suitable apparatus (device). In some implementations, the process 3100 represents operations performed by the SNP controller 250 of FIG. 2. In some implementations, the process 3100 represents operations performed by the apparatus 3500 of FIG. 35 (e.g., by the processing circuit 3510). Of course, in various aspects within the scope of the disclosure, the process 3100 may be implemented by any suitable apparatus capable of supporting communication-related operations.

At block 3102, an SNP (or other suitable apparatus) determines whether a measurement gap is needed for measuring satellite signals.

At block 3104, if a measurement gap is not needed, the SNP (or other suitable apparatus) does not include a tune-away time in the satellite handoff information.

At block 3106, if a measurement gap is needed, the SNP (or other suitable apparatus) determines the measurement gap to be used for measuring satellite signals.

At block 3108, the SNP (or other suitable apparatus) sends information indicative of the measurement gap to a user terminal.

Figure 32:
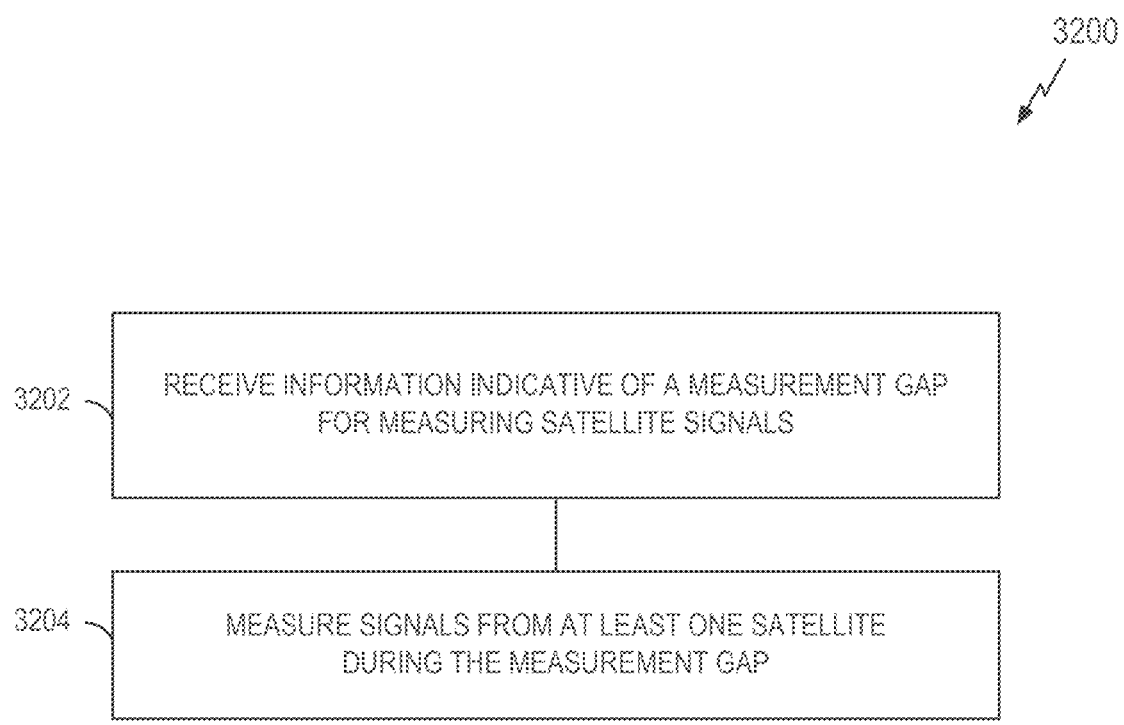
FIG. 32 is a diagram illustrating another example of measurement gap-related operations in accordance with some aspects of the disclosure.

FIG. 32 is a diagram illustrating an example of a measurement gap-related process 3200 in accordance with some aspects of the disclosure. The process 3200 may take place within a processing circuit which may be located in a user terminal or some other suitable apparatus (device). In some implementations, the process 3200 represents operations performed by the control processor 420 of FIG. 4. In some implementations, the process 3200 represents operations performed by the apparatus 3800 of FIG. 38 (e.g., by the processing circuit 3810). Of course, in various aspects within the scope of the disclosure, the process 3200 may be implemented by any suitable apparatus capable of supporting communication-related operations.

At block 3202, a user terminal (or other suitable apparatus) receives information indicative of a measurement gap for measuring satellite signals (e.g., from an SNP).

At block 3204, the user terminal (or other suitable apparatus) measures signals from at least one satellite during the measurement gap (indicated by the received information).

Figure 33:
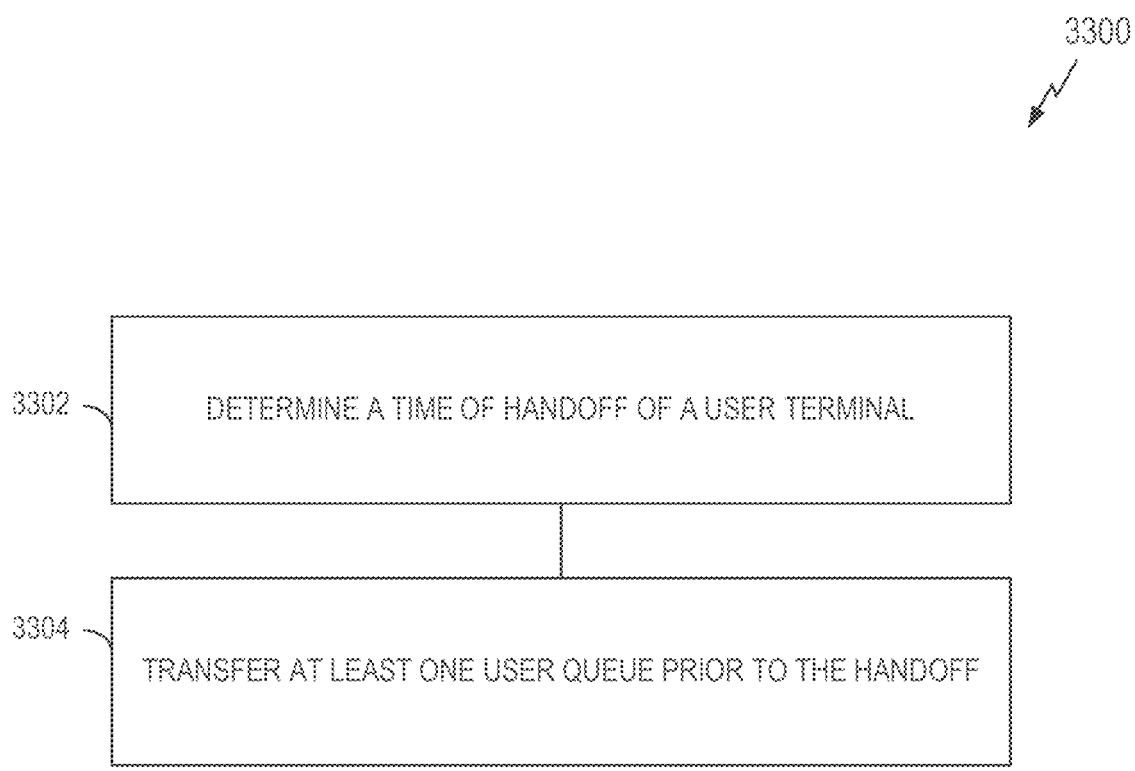
FIG. 33 is a diagram illustrating an example of user queue-related operations in accordance with some aspects of the disclosure.

FIG. 33 is a diagram illustrating an example of a user queue process 3300 in accordance with some aspects of the disclosure. The process 3300 may take place within a processing circuit which may be located in an SNP or some other suitable apparatus (device). In some implementations, the process 3300 represents operations performed by the SNP controller 250 of FIG. 2. In some implementations, the process 3300 represents operations performed by the apparatus 3500 of FIG. 35 (e.g., by the processing circuit 3510). Of course, in various aspects within the scope of the disclosure, the process 3300 may be implemented by any suitable apparatus capable of supporting communication-related operations.

At block 3302, an SNP (or other suitable apparatus) determines a time of handoff of a user terminal.

At block 3304, the SNP (or other suitable apparatus) transfers at least one user queue prior to the handoff.

Figure 34:
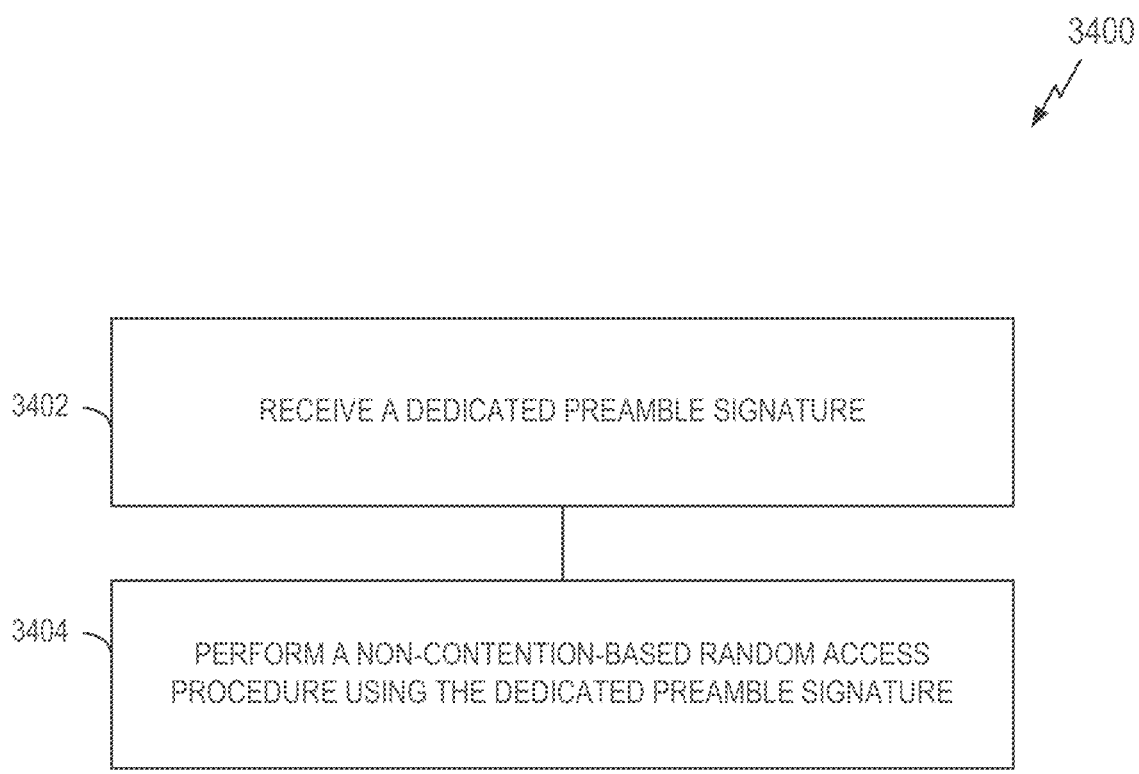
FIG. 34 is a diagram illustrating an example of random access-related operations in accordance with some aspects of the disclosure.

FIG. 34 is a diagram illustrating an example of a random access process 3400 in accordance with some aspects of the disclosure. The process 3400 may take place within a processing circuit which may be located in a user terminal or some other suitable apparatus (device). In some implementations, the process 3400 represents operations performed by the control processor 420 of FIG. 4. In some implementations, the process 3400 represents operations performed by the apparatus 3800 of FIG. 38 (e.g., by the processing circuit 3810). Of course, in various aspects within the scope of the disclosure, the process 3400 may be implemented by any suitable apparatus capable of supporting communication-related operations.

At block 3402, a user terminal (or other suitable apparatus) receives a dedicated preamble signature (e.g., a UT receives a dedicated preamble signature from an SNP in a control channel order).

At block 3404, the user terminal (or other suitable apparatus) performs a non-contention-based random access procedure using the dedicated preamble signature.

Example Apparatus

Figure 35:
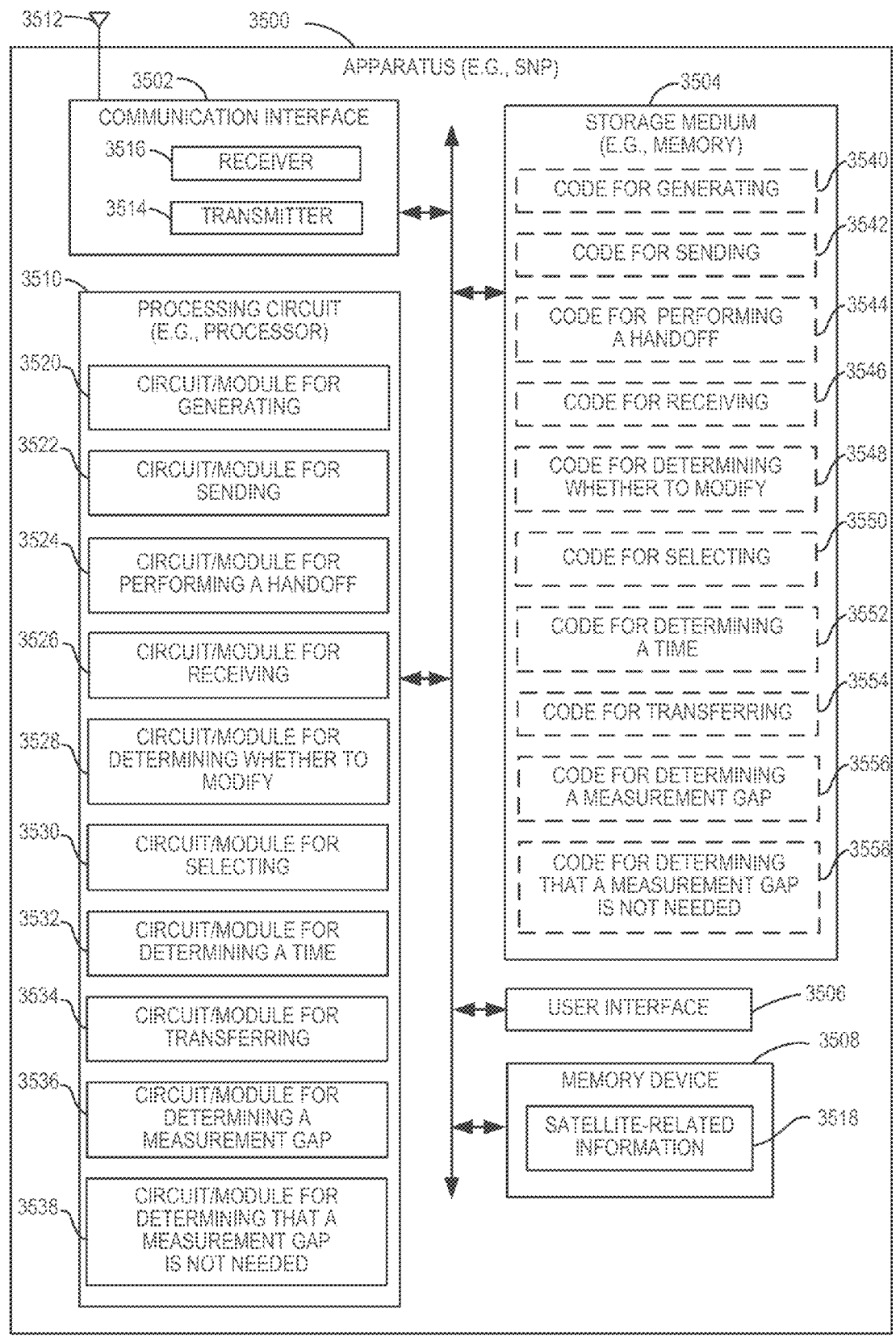
FIG. 35 is a block diagram illustrating an example hardware implementation for an apparatus (e.g., an electronic device) that can support satellite-related communication in accordance with some aspects of the disclosure.

FIG. 35 illustrates a block diagram of an example hardware implementation of an apparatus 3500 configured to communicate according to one or more aspects of the disclosure. For example, the apparatus 3500 could embody or be implemented within an SNP or some other type of device that supports satellite communication. Thus, in some aspects, the apparatus 3500 could be an example of the SNP 200 or the SNP 201 of FIG. 1. In various implementations, the apparatus 3500 could embody or be implemented within a gateway, a ground station, a vehicular component, or any other electronic device having circuitry.

The apparatus 3500 includes a communication interface (e.g., at least one transceiver) 3502, a storage medium 3504, a user interface 3506, a memory device (e.g., a memory circuit) 3508, and a processing circuit (e.g., at least one processor) 3510. In various implementations, the user interface 3506 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 35. The signaling bus may include any number of interconnecting buses and bridges depending on the specific application of the processing circuit 3510 and the overall design constraints. The signaling bus links together various circuits such that each of the communication interface 3502, the storage medium 3504, the user interface 3506, and the memory device 3508 are coupled to and/or in electrical communication with the processing circuit 3510. The signaling bus may also link various other circuits (not shown) such as timing sources, peripherals, voltage regulators, and power management circuits, which are well known in the art, and therefore, will not be described any further.

The communication interface 3502 provides a means for communicating with other apparatuses over a transmission medium. In some implementations, the communication interface 3502 includes circuitry and/or programming adapted to facilitate the communication of information bi-directionally with respect to one or more communication devices in a network. In some implementations, the communication interface 3502 is adapted to facilitate wireless communication of the apparatus 3500. In these implementations, the communication interface 3502 may be coupled to one or more antennas 3512 as shown in FIG. 35 for wireless communication within a wireless communication system. The communication interface 3502 can be configured with one or more standalone receivers and/or transmitters, as well as one or more transceivers. In the illustrated example, the communication interface 3502 includes a transmitter 3514 and a receiver 3516. The communication interface 3502 serves as one example of a means for receiving and/or means transmitting.

The memory device 3508 may represent one or more memory devices. As indicated, the memory device 3508 may maintain satellite-related information 3518 along with other information used by the apparatus 3500. In some implementations, the memory device 3508 and the storage medium 3504 are implemented as a common memory component. The memory device 3508 may also be used for storing data that is manipulated by the processing circuit 3510 or some other component of the apparatus 3500.

The storage medium 3504 may represent one or more computer-readable, machine-readable, and/or processor-readable devices for storing programming, such as processor executable code or instructions (e.g., software, firmware), electronic data, databases, or other digital information. The storage medium 3504 may also be used for storing data that is manipulated by the processing circuit 3510 when executing programming. The storage medium 3504 may be any available media that can be accessed by a general purpose or special purpose processor, including portable or fixed storage devices, optical storage devices, and various other mediums capable of storing, containing or carrying programming.

By way of example and not limitation, the storage medium 3504 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 3504 may be embodied in an article of manufacture (e.g., a computer program product). By way of example, a computer program product may include a computer-readable medium in packaging materials. In view of the above, in some implementations, the storage medium 3504 may be a non-transitory (e.g., tangible) storage medium.

The storage medium 3504 may be coupled to the processing circuit 3510 such that the processing circuit 3510 can read information from, and write information to, the storage medium 3504. That is, the storage medium 3504 can be coupled to the processing circuit 3510 so that the storage medium 3504 is at least accessible by the processing circuit 3510, including examples where at least one storage medium is integral to the processing circuit 3510 and/or examples where at least one storage medium is separate from the processing circuit 3510 (e.g., resident in the apparatus 3500, external to the apparatus 3500, distributed across multiple entities, etc.).

Programming stored by the storage medium 3504, when executed by the processing circuit 3510, causes the processing circuit 3510 to perform one or more of the various functions and/or process operations described herein. For example, the storage medium 3504 may include operations configured for regulating operations at one or more hardware blocks of the processing circuit 3510, as well as to utilize the communication interface 3502 for wireless communication utilizing their respective communication protocols.

The processing circuit 3510 is generally adapted for processing, including the execution of such programming stored on the storage medium 3504. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 3510 is arranged to obtain, process and/or send data, control data access and storage, issue commands, and control other desired operations. The processing circuit 3510 may include circuitry configured to implement desired programming provided by appropriate media in at least one example. For example, the processing circuit 3510 may be implemented as one or more processors, one or more controllers, and/or other structure configured to execute executable programming. Examples of the processing circuit 3510 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 3510 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 3510 are for illustration and other suitable configurations within the scope of the disclosure are also contemplated.

According to one or more aspects of the disclosure, the processing circuit 3510 may be adapted to perform any or all of the features, processes, functions, operations and/or routines for any or all of the apparatuses described herein. For example, the processing circuit 3510 may be configured to perform one or more of the steps, functions, and/or processes described with respect to FIGS. 7, 8, 11-20, 23, 25, 27-29, 31, 33, 36, and 37. As used herein, the term "adapted" in relation to the processing circuit 3510 may refer to the processing circuit 3510 being one or more of configured, employed, implemented, and/or programmed to perform a particular process, function, operation and/or routine according to various features described herein.

The processing circuit 3510 may be a specialized processor, such as an application specific integrated circuit (ASIC) that serves as a means for (e.g., structure for) carrying out one or more of the operations described in conjunction with FIGS. 7, 8, 11-20, 23, 25, 27-29, 31, 33, 36, and 37. The processing circuit 3510 serves as one example of a means for transmitting and/or a means for receiving. In some implementations, the processing circuit 3510 incorporates the functionality of the SNP controller 250 of FIG. 2.

According to at least one example of the apparatus 3500, the processing circuit 3510 may include one or more of a circuit/module for generating 3520, a circuit/module for sending 3522, a circuit/module for performing handoffs 3524, a circuit/module for receiving 3526, a circuit/module for determining whether to modify 3528, a circuit/module for selecting 3530, a circuit/module for determining a time 3532, a circuit/module for transferring 3534, a circuit/module for determining a measurement gap 3536, or a circuit/module for determining that a measurement gap is not needed 3538. In various implementations, the circuit/module for generating 3520, the circuit/module for sending 3522, the circuit/module for performing handoffs 3524, the circuit/module for receiving 3526, the circuit/module for determining whether to modify 3528, the circuit/module for selecting 3530, the circuit/module for determining a time 3532, the circuit/module for transferring 3534, the circuit/module for determining a measurement gap 3536, and the circuit/module for determining that a measurement gap is not needed 3538 may correspond, at least in part, to the SNP controller 250 of FIG. 2.

The circuit/module for generating 3520 may include circuitry and/or programming (e.g., code for generating 3540 stored on the storage medium 3504) adapted to perform several functions relating to, for example, generating satellite and cell transition information that specifies a time to start and a time to terminate communication with a particular cell of a particular satellite. In some implementations, the circuit/module for generating 3520 calculates the information (e.g., the data for Table 1) based on satellite ephemeris data and user terminal location data. To this end, the circuit/module for generating 3520 collects this data, processes the data to generate the information and sends the information to a component of the apparatus 3500 (e.g., the memory device 3508). For example, for a given location of a user terminal, the circuit/module for generating 3520 can determine when a particular cell of a particular satellite will provide coverage for the user terminal based on the location of the satellite and the directionality and coverage of the cells of the satellite over time.

The circuit/module for sending 3522 may include circuitry and/or programming (e.g., code for sending 3542 stored on the storage medium 3504) adapted to perform several functions relating to, for example, sending information (e.g., data) to another apparatus. Initially, the circuit/module for sending 3522 obtains the information to be sent (e.g., from the memory device 3508, the circuit/module for generating 3520, or some other component). In various implementations, the information to be sent may include satellite and cell transition information to be sent to a user terminal. In various implementations, the information to be sent may include information indicative of a measurement gap. The circuit/module for sending 3522 may then format the information for sending (e.g., in a message, according to a protocol, etc.). The circuit/module for sending 3522 then causes the information to be sent via a wireless communication medium (e.g., via satellite signaling). To this end, the circuit/module for sending 3522 may send the data to the communication interface 3502 (e.g., a digital subsystem or an RF subsystem) or some other component for transmission. In some implementations, the communication interface 3502 includes the circuit/module for sending 3522 and/or the code for sending 3542.

The circuit/module for performing a handoff 3524 may include circuitry and/or programming (e.g., code for performing a handoff 3544 stored on the storage medium 3504) adapted to perform several functions relating to, for example, performing handoffs for a user terminal to different cells and at least one satellite. In some implementations, the circuit/module for performing a handoff 3524 identifies the target satellite and/or the target cell based on the satellite and cell transition information (e.g., Table 1). To this end, the circuit/module for performing a handoff 3524 collects this information, processes the information to identify the target, and reconfigures its communication parameters to cause communication with the user terminal to be conducted via the target. For example, for a given location of a user terminal, the circuit/module for performing a handoff 3524 can determine whether a particular cell of a particular satellite would provide sufficient coverage for the user terminal based on the location of the satellite and the directionality and coverage of the cells of the satellite over time. If the satellite/cell would provide sufficient coverage, the circuit/module for performing a handoff 3524 can designate that satellite/cell as the target for the handoff and commence handoff signaling accordingly.

The circuit/module for receiving 3526 may include circuitry and/or programming (e.g., code for receiving 3546 stored on the storage medium 3504) adapted to perform several functions relating to, for example, receiving information (e.g., data) from another apparatus. In various implementations, the information to be received may include a measurement message from a user terminal. In various implementations, the information to be received may include capability information from a user terminal. In various implementations, the information to be received may include a message from a user terminal. Initially, the circuit/module for receiving 3526 obtains received information. For example, the circuit/module for receiving 3526 may obtain this information from a component of the apparatus 3500 (e.g., the communication interface 3502 (e.g., a digital subsystem or an RF subsystem), the memory device 3508, or some other component) or directly from a device (e.g., a satellite) that relayed the information from the user terminal. In some implementations, the circuit/module for receiving 3526 identifies a memory location of a value in the memory device 3508 and invokes a read of that location.

In some implementations, the circuit/module for receiving 3526 processes (e.g., decodes) the received information. The circuit/module for receiving 3526 outputs the received information (e.g., stores the received information in the memory device 3508 or sends the information to another component of the apparatus 3500). In some implementations, the communication interface 3502 includes the circuit/module for receiving 3526 and/or the code for receiving 3542.

The circuit/module for determining whether to modify 3528 may include circuitry and/or programming (e.g., code for determining whether to modify 3548 stored on the storage medium 3504) adapted to perform several functions relating to, for example, determining whether to modify the satellite and cell transition information. In some implementations, the circuit/module for determining whether to modify 3528 makes this determination based on the received measurement message. To this end, the circuit/module for determining whether to modify 3528 collects this measurement message information (e.g., from the circuit/module for receiving 3526, the memory device 3508, or some other component of the apparatus 3500). The circuit/module for determining whether to modify 3528 may then process the information to determine whether the current timing parameters need to be changed (e.g., due to poor RF conditions or improved RF conditions). For example, the circuit/module for determining whether to modify 3528 may compare signal quality information contained in a measurement message with one or more signal quality thresholds. Finally, the circuit/module for determining whether to modify 3528 generates an indication of this determination (e.g., indicative of advancement of a handoff or delay of a handoff).

The circuit/module for selecting 3530 may include circuitry and/or programming (e.g., code for selecting 3550 stored on the storage medium 3504) adapted to perform several functions relating to, for example, selecting a handoff procedure for a user terminal. In some implementations, the circuit/module for selecting 3530 makes this determination based on capability information received from the user terminal. To this end, the circuit/module for selecting 3530 collects this capability information, processes the information to identify a handoff procedure, and generates an indication of this determination. For example, the selection of the handoff procedure may involve determining whether the user terminal is dual sense capable, and enabling or disabling monitoring for a measurement message from the user terminal based on whether the user terminal is dual sense capable. Thus, in some implementations, the circuit/module for selecting 3530 acquires configuration information about the user terminal (e.g., from the memory device 3508, from the receiver 3516, or from some other component), checks this information to identify the capability of the user terminal to select a supported handoff procedure, and generates an indication of this determination (e.g., that is sent to the memory device 3508, the circuit/module for performing a handoff 3524, or some other component).

The circuit/module for determining a time 3532 may include circuitry and/or programming (e.g., code for determining a time 3552 stored on the storage medium 3504) adapted to perform several functions relating to, for example, determining a time of handoff of a user terminal. In some implementations, the circuit/module for determining a time 3532 makes this determination based on the satellite and cell transition information (e.g., Table 1). To this end, the circuit/module for determining a time 3532 acquires this information (e.g., from the circuit/module for receiving 3526, the memory device 3508, or some other component of the apparatus 3500). The circuit/module for a time 3532 may then process the information to determine the time (e.g., the frame number) for the next handoff of the user terminal. For example, the circuit/module for a time 3532 may compare a current time indication (e.g., a frame number) with the timing indications in Table 1. The circuit/module for determining a time 3532 generates an indication of this determination (e.g., indicative of the time of handoff) and sends the indication to a component of the apparatus 3500 (e.g., the circuit/module for transferring 3534, the memory device 3508, or some other component).

The circuit/module for transferring 3534 may include circuitry and/or programming (e.g., code for transferring 3554 stored on the storage medium 3504) adapted to perform several functions relating to, for example, transferring user queues prior to handoff. Initially, the circuit/module for transferring 3534 receives an indication of a time of handoff (e.g., from the memory device 3508, the circuit/module for determining a time 3532, or some other component). Next, prior to the time of handoff, the circuit/module for transferring 3534 obtains queue information to be sent (e.g., from the memory device 3508, or some other component). In various implementations, this information may be sent to another SNP. The circuit/module for transferring 3534 may then format the queue information for sending (e.g., in a message, according to a protocol, etc.). The circuit/module for transferring 3534 then causes the queue information to be sent via an appropriate communication medium (e.g., via the infrastructure 106 of FIG. 1). To this end, the circuit/module for transferring 3534 may send the data to the communication interface 3502 or some other component for transmission. In some implementations, the communication interface 3502 includes the circuit/module for transferring 3534 and/or the code for transferring 3554.

The circuit/module for determining a measurement gap 3536 may include circuitry and/or programming (e.g., code for determining a measurement gap 3556 stored on the storage medium 3504) adapted to perform several functions relating to, for example, determining a measurement gap for measuring satellite signals. In some implementations, the circuit/module for determining a measurement gap 3536 determines that there may be a satellite pointing error that necessitates a change in a handoff time. As a result of this determination or some other trigger, the circuit/module for determining a measurement gap 3536 generates an indication of a measurement gap to be used by a UT (e.g., a measurement gap pattern indicative of times when the SNP is not transmitting to the UT). The circuit/module for determining a measurement gap 3536 then sends the indication to a component of the apparatus 3500 (e.g., the circuit/module for sending 3522, the memory device 3508, or some other component).

The circuit/module for determining that a measurement gap is not needed 3538 may include circuitry and/or programming (e.g., code for determining that a measurement gap is not needed 3558 stored on the storage medium 3504) adapted to perform several functions relating to, for example, determining that a measurement gap is not needed for measuring satellite signals. In some implementations, the circuit/module for determining that a measurement gap is not needed 3538 obtains information regarding the status of one or more satellites. Based on this information, the circuit/module for determining that a measurement gap is not needed 3538 determines that there is no satellite pointing error that would necessitate a change in a handoff time. As a result of this determination or some other trigger, the circuit/module for determining that a measurement gap is not needed 3538 generates an indication of this determination and sends the indication to a component of the apparatus 3500 (e.g., the circuit/module for generating 3520, the memory device 3508, or some other component).

As mentioned above, programming stored by the storage medium 3504, when executed by the processing circuit 3510, causes the processing circuit 3510 to perform one or more of the various functions and/or process operations described herein. For example, the programming, when executed by the processing circuit 3510, may cause the processing circuit 3510 to perform one or more of the various functions, steps, and/or processes described herein with respect to FIGS. 7, 8, 11-20, 23, 25, 27-29, 31, 33, 36, and 37 in various implementations. As shown in FIG. 35, the storage medium 3504 may include one or more of the code for generating 3540, the code for sending 3542, the code for performing handoffs 3544, the code for receiving 3546, the code for determining whether to modify 3548, the code for selecting 3550, the code for determining a time 3552, the code for transferring 3554, the code for determining a measurement gap 3556, or the code for determining that a measurement gap is not needed 3558.

Example Processes

Figure 36:
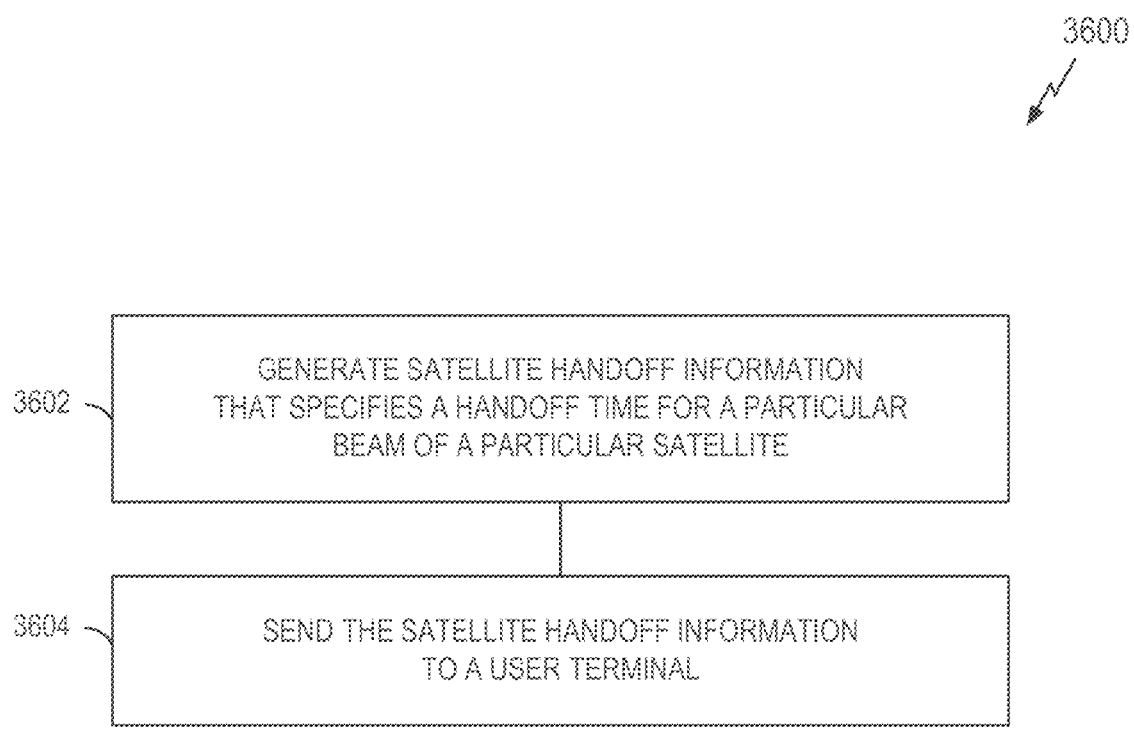
FIG. 36 is a flowchart illustrating an example of a process involving generation of satellite handoff information in accordance with some aspects of the disclosure.

FIG. 36 illustrates a process 3600 for communication in accordance with some aspects of the disclosure. The process 3600 may take place within a processing circuit (e.g., the processing circuit 3510 of FIG. 35), which may be located in an SNP or some other suitable apparatus. In some implementations, the process 3600 may be performed by an SNP for at least one non-geosynchronous satellite. In some implementations, the process 3600 represents operations performed by the SNP controller 250 of FIG. 2. Of course, in various aspects within the scope of the disclosure, the process 3600 may be implemented by any suitable apparatus capable of supporting communication operations.

At block 3602, an apparatus (e.g., an SNP) generates satellite handoff information that specifies a handoff time for a particular cell of a particular satellite. In some aspects, the operations of block 3602 may correspond to the operations of block 2006 of FIG. 20.

In some aspects, the generation of the satellite handoff information may be based on at least one of: capabilities information for a user terminal or location information for a user terminal. In some aspects, the capabilities information may indicate at least one of: whether the user terminal can sense multiple beams or whether the user terminal can sense multiple satellites. In some aspects, the capabilities information may indicate at least one of: an inter-beam tune time for the user terminal or an inter-satellite tune time for the user terminal. In some aspects, the location information may include at least one of: a current location for the user terminal or a motion vector for the user terminal.

In some aspects, the generation of the satellite handoff information may be based on at least one of: ephemeris information, a restriction due to an incumbent system, or a satellite pointing error. In some aspects, the generation of the satellite handoff information may be triggered based on at least one of: handoff of the user terminal to a different satellite or receipt of a measurement message from the user terminal.

In some implementations, the circuit/module for generating 3520 of FIG. 35 performs the operations of block 3602. In some implementations, the code for generating 3540 of FIG. 35 is executed to perform the operations of block 3602.

At block 3604, the apparatus sends the satellite handoff information to a user terminal. In some aspects, this information is sent via a satellite. In some aspects, the operations of block 3604 may correspond to the operations of block 2008 of FIG. 20.

The satellite handoff information may take various forms as taught herein. In some aspects, the satellite handoff information may include a table that includes a handover activation time. In some aspects, the satellite handoff information may include at least one tune-away time. In some aspects, the handoff information may be for at least one future handoff (e.g., the next handoff, a later handoff, or some other handoff that will occur in the future). In some aspects, the handoff information may be for the next beam handoff and for at least one future satellite handoff (e.g., for the next two handoffs that will occur, the next handoff and some other subsequent handoff, etc.).

In some implementations, the circuit/module for sending 3522 of FIG. 35 performs the operations of block 3604. In some implementations, the code for sending 3542 of FIG. 35 is executed to perform the operations of block 3604.

In some aspects, the process 3600 may further include performing handoffs for the user terminal to different beams and at least one satellite based on the satellite handoff information. The handoffs may involve a change of at least one of: a satellite access network (SAN) or a satellite network portal (SNP) antenna. The handoffs may involve a change of at least one of: a satellite beam or a forward service link (FSL) frequency. In some aspects, these operations may correspond to the operations of block 2010 of FIG. 20. In some implementations, the circuit/module for performing a handoff 3524 of FIG. 35 performs these operations. In some implementations, the code for performing a handoff 3544 of FIG. 35 is executed to perform these operations.

In some aspects, the process 3600 may further include receiving a measurement message from the user terminal, and determining, based on the measurement message, whether to modify the satellite handoff information. The modification of the satellite handoff information may include advancing handoff timing or delaying handoff timing. In some aspects, these operations may correspond to the operations of blocks 2702 and 2704 of FIG. 27. In some implementations, the circuit/module for receiving 3526 of FIG. 35 performs the receiving operations. In some implementations, the code for receiving 3546 of FIG. 35 is executed to perform the receiving operations. In some implementations, the circuit/module for determining whether to modify 3528 of FIG. 35 performs the determining operations. In some implementations, the code for determining whether to modify 3548 of FIG. 35 is executed to perform the determining operations.

In some aspects, the process 3600 may further include determining a measurement gap for measuring satellite signals, and sending information indicative of the measurement gap to the user terminal, wherein the measurement message includes an indication of a measurement of signals from at least one satellite conducted during the measurement gap. In some aspects, these operations may correspond to the operations of blocks 3106 and 3108 of FIG. 31. In some implementations, the circuit/module for determining a measurement gap 3536 of FIG. 35 performs the determining operations. In some implementations, the code for determining a measurement gap 3556 of FIG. 35 is executed to perform the determining operations. In some implementations, the circuit/module for sending 3522 of FIG. 35 performs the sending operations. In some implementations, the code for sending 3542 of FIG. 35 is executed to perform the sending operations.

In some aspects, the process 3600 may further include receiving capability information from the user terminal, and selecting a handoff procedure for the user terminal based on the received capability information. The capability information may indicate whether the user terminal is dual sense capable. The selection of the handoff procedure may include enabling or disabling monitoring for a measurement message from the user terminal based on whether the user terminal is dual sense capable. In some aspects, these operations may correspond to the operations of blocks 2302 and 2306 of FIG. 23. In some implementations, the circuit/module for receiving 3526 of FIG. 35 performs the receiving operations. In some implementations, the code for receiving 3546 of FIG. 35 is executed to perform the receiving operations. In some implementations, the circuit/module for selecting 3530 of FIG. 35 performs the selecting operations. In some implementations, the code for selecting 3550 of FIG. 35 is executed to perform the selecting operations.

In some aspects, the process 3600 may further include determining a time of a handoff of the user terminal, and transferring at least one user queue prior to the handoff. In some aspects, these operations may correspond to the operations of blocks 3302 and 3304 of FIG. 33. In some implementations, the circuit/module for determining a time 3532 of FIG. 35 performs the determining operations. In some implementations, the code for determining a time 3552 of FIG. 35 is executed to perform the determining operations. In some implementations, the circuit/module for transferring 3534 of FIG. 35 performs the transferring operations. In some implementations, the code for transferring 3554 of FIG. 35 is executed to perform the transferring operations.

In some aspects, the process 3600 may further include receiving, from the user terminal, a message comprising at least one of: user terminal paging area information or user terminal location information. In some aspects, these operations may correspond to the operations of block 2502 of FIG. 25. In some implementations, the circuit/module for receiving 3526 of FIG. 35 performs these operations. In some implementations, the code for receiving 3546 of FIG. 35 is executed to perform these operations.

In some aspects, the process 3600 may further include determining that a measurement gap is not needed for measuring satellite signals, wherein, as a result of the determination, the generation of the satellite handoff information involves not including a tune-away time in the satellite handoff information. In some aspects, these operations may correspond to the operations of blocks 3102 and 3104 of FIG. 31. In some implementations, the circuit/module for determining that a measurement gap is not needed 3538 of FIG. 35 performs these operations. In some implementations, the code for determining that a measurement gap is not needed 3558 of FIG. 35 is executed to perform these operations.

Figure 37:
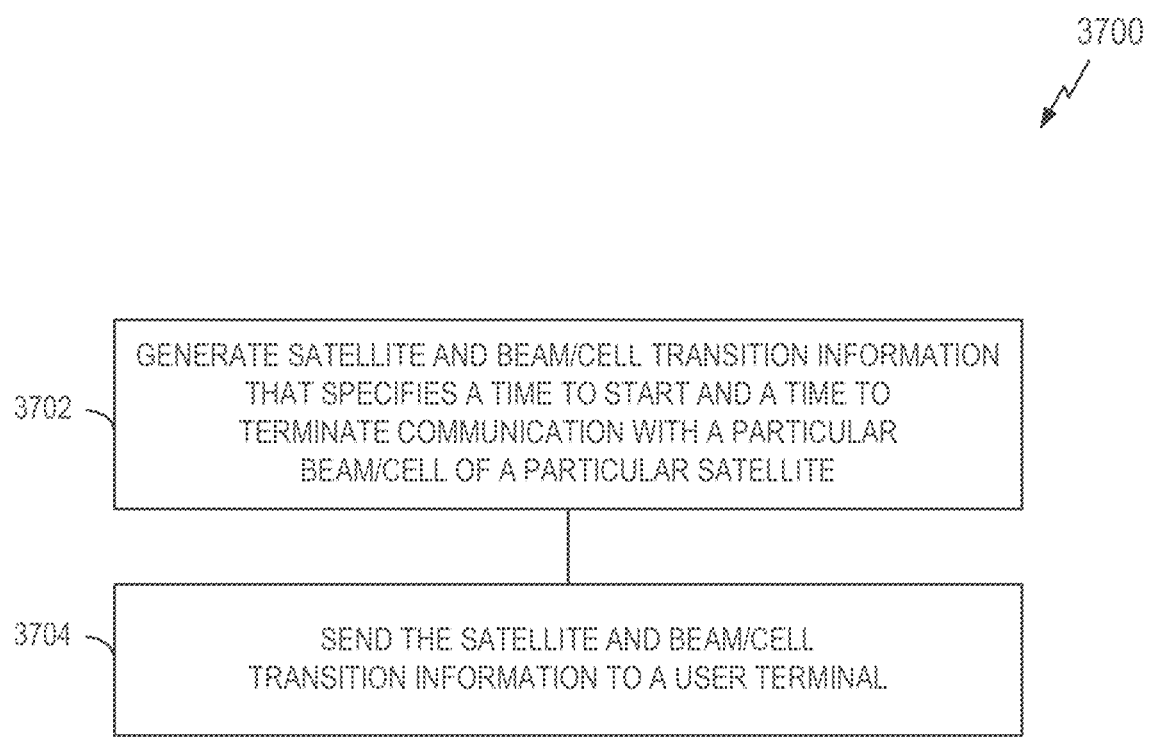
FIG. 37 is a flowchart illustrating an example of a process involving generation of satellite and cell transition information in accordance with some aspects of the disclosure.

FIG. 37 illustrates a process 3700 for communication in accordance with some aspects of the disclosure. The process 3700 may take place within a processing circuit (e.g., the processing circuit 3510 of FIG. 35), which may be located in an SNP or some other suitable apparatus. In some implementations, the process 3700 may be performed by an SNP for at least one non-geosynchronous satellite. In some implementations, the process 3700 represents operations performed by the SNP controller 250 of FIG. 2. Of course, in various aspects within the scope of the disclosure, the process 3700 may be implemented by any suitable apparatus capable of supporting communication operations.

At block 3702, an apparatus (e.g., an SNP) generates satellite and cell transition information that specifies a time to start and a time to terminate communication with a particular cell of a particular satellite. In some aspects, the operations of block 3702 may correspond to the operations of block 2006 of FIG. 20.

In some aspects, the satellite and cell transition information is generated based on at least one of: capabilities information for the user terminal, location information for the user terminal, ephemeris information, or a restriction due to an incumbent system. In some aspects, the capabilities information indicates at least one of: whether the user terminal can sense multiple cells, whether the user terminal can sense multiple satellites, an inter-cell tune time for the user terminal, or an inter-satellite tune time for the user terminal. In some aspects, the location information includes a current location for the user terminal or a motion vector for the user terminal.

In some aspects, the generation of the satellite and cell transition information is triggered based on at least one of: handoff of the user terminal to a different satellite, or receipt of a measurement message from the user terminal.

In some implementations, the circuit/module for generating 3520 of FIG. 35 performs the operations of block 3702. In some implementations, the code for generating 3540 of FIG. 35 is executed to perform the operations of block 3702.

At block 3704, the apparatus sends the satellite and cell transition information to a user terminal. In some aspects, this information is sent via a satellite. In some aspects, the operations of block 3704 may correspond to the operations of block 2008 of FIG. 20.

In some implementations, the circuit/module for sending 3522 of FIG. 35 performs the operations of block 3704. In some implementations, the code for sending 3542 of FIG. 35 is executed to perform the operations of block 3704.

In some aspects, the process 3700 further includes performing handoffs for the user terminal to different cells and at least one satellite based on the satellite and cell transition information. In some aspects, these operations may correspond to the operations of block 2010 of FIG. 20. In some implementations, the circuit/module for performing a handoff 3524 of FIG. 35 performs these operations. In some implementations, the code for performing a handoff 3544 of FIG. 35 is executed to perform these operations.

In some aspects, the process 3700 further includes receiving a measurement message from the user terminal; and determining, based on the measurement message, whether to modify the satellite and cell transition information. In some aspects, the modification of the satellite and cell transition information includes advancing a handoff or delaying a handoff. In some aspects, these operations may correspond to the operations of blocks 2702 and 2704 of FIG. 27. In some implementations, the circuit/module for receiving 3526 and/or the circuit/module for determining whether to modify 3528 of FIG. 35 performs these operations. In some implementations, the code for receiving 3546 and/or the code for determining whether to modify 3548 of FIG. 35 is executed to perform these operations.

In some aspects, the process 3700 further includes selecting a handoff procedure for the user terminal based on capability information received from the user terminal. In some aspects, the selection of the handoff procedure includes enabling or disabling monitoring for a measurement message from the user terminal based on whether the user terminal is dual sense capable. In some aspects, these operations may correspond to the operations of block 2306 of FIG. 23. In some implementations, the circuit/module for selecting 3530 of FIG. 35 performs these operations. In some implementations, the code for selecting 3550 of FIG. 35 is executed to perform these operations.

In some aspects, the process 3700 further includes determining a time of a handoff of the user terminal and transferring user queues prior to the handoff. In some implementations, the circuit/module for determining a time 3532 and/or the circuit/module for transferring 3534 of FIG. 35 performs these operations. In some implementations, the code for determining a time 3552 and/or the code for transferring 3554 of FIG. 35 is executed to perform these operations.

Example Apparatus

Figure 38:
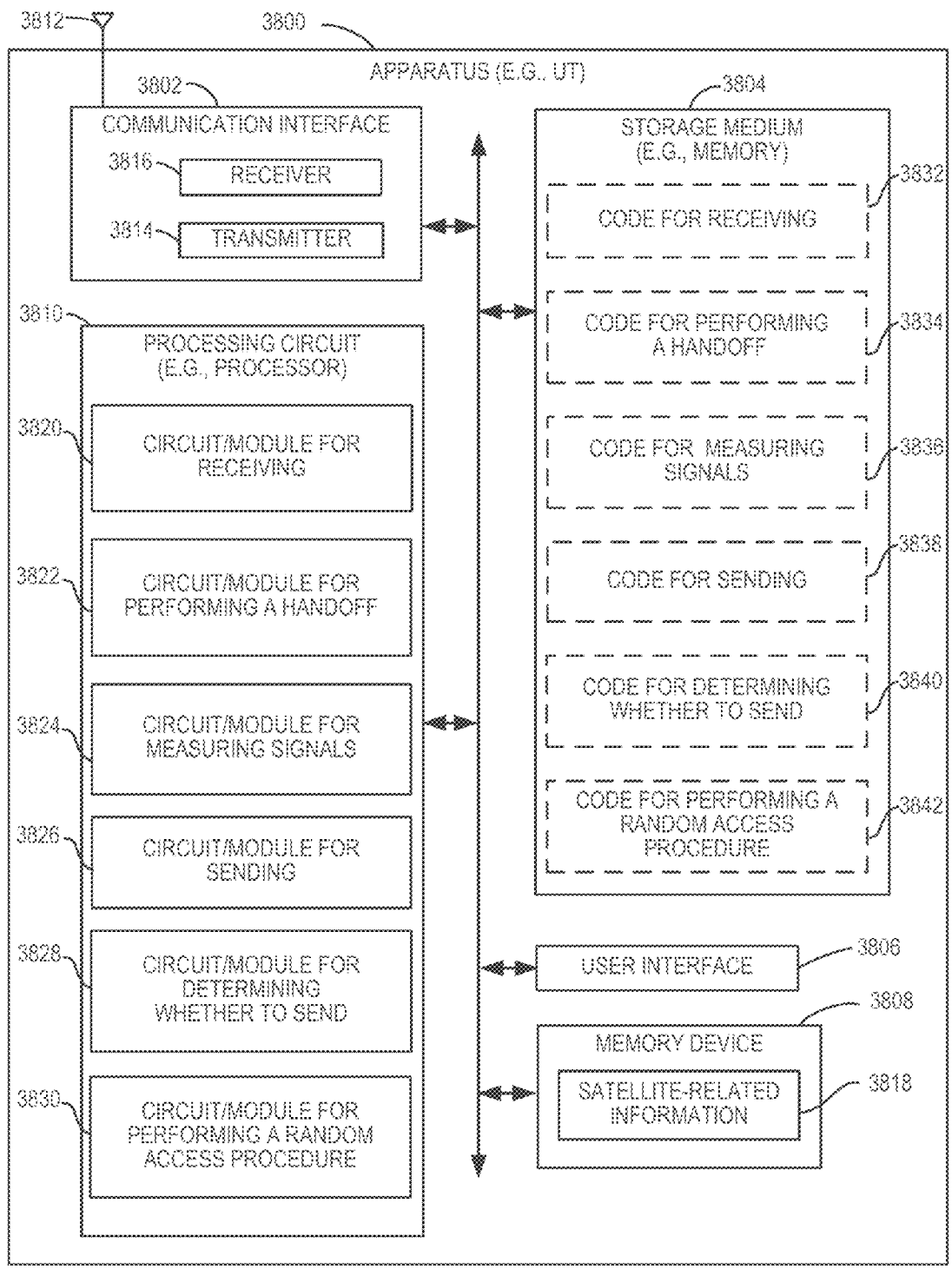
FIG. 38 is a block diagram illustrating an example hardware implementation for another apparatus (e.g., an electronic device) that can support satellite-related communication in accordance with some aspects of the disclosure.

FIG. 38 illustrates a block diagram of an example hardware implementation of another apparatus 3800 configured to communicate according to one or more aspects of the disclosure. For example, the apparatus 3800 could embody or be implemented within a UT or some other type of device that supports wireless communication. Thus, in some aspects, the apparatus 3800 could be an example of the UT 400 or the UT 401 of FIG. 1. In various implementations, the apparatus 3800 could embody or be implemented within a mobile phone, a smart phone, a tablet, a portable computer, a server, a personal computer, a sensor, an entertainment device, a vehicular component, medical devices, or any other electronic device having circuitry.

The apparatus 3800 includes a communication interface (e.g., at least one transceiver) 3802, a storage medium 3804, a user interface 3806, a memory device 3808 (e.g., storing satellite-related information 3818), and a processing circuit (e.g., at least one processor) 3810. In various implementations, the user interface 3806 may include one or more of: a keypad, a display, a speaker, a microphone, a touchscreen display, of some other circuitry for receiving an input from or sending an output to a user. The communication interface 3802 may be coupled to one or more antennas 3812, and may include a transmitter 3814 and a receiver 3816. In general, the components of FIG. 38 may be similar to corresponding components of the apparatus 3500 of FIG. 35.

According to one or more aspects of the disclosure, the processing circuit 3810 may be adapted to perform any or all of the features, processes, functions, operations and/or routines for any or all of the apparatuses described herein. For example, the processing circuit 3810 may be configured to perform one or more of the steps, functions, and/or processes described with respect to FIGS. 7, 8, 11-19, 21, 22, 24, 26, 28-30, 32, 34, 39, and 40. As used herein, the term "adapted" in relation to the processing circuit 3810 may refer to the processing circuit 3810 being one or more of configured, employed, implemented, and/or programmed to perform a particular process, function, operation and/or routine according to various features described herein.

The processing circuit 3810 may be a specialized processor, such as an application specific integrated circuit (ASIC) that serves as a means for (e.g., structure for) carrying out one or more of the operations described in conjunction with FIGS. 7, 8, 11-19, 21, 22, 24, 26, 28-30, 32, 34, 39, and 40. The processing circuit 3810 serves as one example of a means for transmitting and/or a means for receiving. In various implementations, the processing circuit 3810 may incorporate the functionality of the control processor 420 of FIG. 4.

According to at least one example of the apparatus 3800, the processing circuit 3810 may include one or more of a circuit/module for receiving 3820, a circuit/module for performing a handoff 3822, a circuit/module for measuring signals 3824, a circuit/module for sending 3826, a circuit/module for determining whether to send 3828, or a circuit/module for performing a random access procedure 3830. In various implementations, the circuit/module for receiving 3820, the circuit/module for performing a handoff 3822, the circuit/module for measuring signals 3824, the circuit/module for sending 3826, the circuit/module for determining whether to send 3828, and the circuit/module for performing a random access procedure 3830 may correspond, at least in part, to the control processor 420 of FIG. 4.

The circuit/module for receiving 3820 may include circuitry and/or programming (e.g., code for receiving 3832 stored on the storage medium 3804) adapted to perform several functions relating to, for example, receiving information (e.g., data) from another apparatus. In various implementations, the information to be received may include satellite and cell transition information that specifies a time to start and a time to terminate communication with a particular cell of a particular satellite. In various implementations, the information to be received may include information indicative of a measurement gap. In various implementations, the information to be received may include a dedicated preamble signature. Initially, the circuit/module for receiving 3820 obtains received information. For example, the circuit/module for receiving 3820 may obtain this information from a component of the apparatus 3800 or directly from a device (e.g., a satellite) that relayed the information from an SNP. In the former case, the circuit/module for receiving 3820 may obtain this information from the communication interface 3802 (e.g., a UT transceiver as described above for the UT 400 of FIG. 4), the memory device 3808, or some other component. In some implementations, the circuit/module for receiving 3820 identifies a memory location of a value in the memory device 3808 and invokes a read of that location. In some implementations, the circuit/module for receiving 3820 processes (e.g., decodes) the received information. The circuit/module for receiving 3820 outputs the received information (e.g., sends the received information to the memory device 3808, the circuit/module for performing a handoff 3822, or some other component of the apparatus 3800). In some implementations, the communication interface 3802 includes the circuit/module for receiving 3820 and/or the code for receiving 3832.

The circuit/module for performing a handoff 3822 may include circuitry and/or programming (e.g., code for performing a handoff 3834 stored on the storage medium 3804) adapted to perform several functions relating to, for example, performing handoff to a particular cell of a particular satellite. In some implementations, the circuit/module for performing a handoff 3822 identifies a particular cell of a particular satellite based on satellite and cell transition information (e.g., Table 1). To this end, the circuit/module for performing a handoff 3822 collects this information, processes the information to identify the satellite and cell, and reconfigures its communication parameters to cause communication with an SNP to be conducted via the identified satellite and cell. For example, at a particular point in time, the circuit/module for performing a handoff 3822 can use the information in Table 1 to determine whether the user terminal should switch to a different satellite cell. As another example, triggers may be set up at cell/satellite transitions times (e.g., frame numbers) indicated in Table 1.

The circuit/module for measuring signals 3824 may include circuitry and/or programming (e.g., code for measuring signals 3836 stored on the storage medium 3804) adapted to perform several functions relating to, for example, receiving and processing signals from at least one satellite. Initially, the circuit/module for measuring signals 3824 receives signals. For example, the circuit/module for measuring signals 3824 may obtain signal information from a component of the apparatus 3800 or directly from a satellite that transmitted the signals. As an example of the former case, the circuit/module for measuring signals 3824 may obtain signal information from the communication interface 3802 (e.g., a UT transceiver as described above for the UT 400 of FIG. 4), the memory device 3808 (e.g., if the received signals have been digitized), or some other component of the apparatus 3800. The circuit/module for measuring signals 3824 then processes the received signals (e.g., to determine at least one signal quality of the signals). Finally, the circuit/module for measuring signals 3824 generates an indication of this measurement and sends the indication to the memory device 3808, the circuit/module for sending 3824, or some other component of the apparatus 3800. In some implementations, the communication interface 3802 includes the circuit/module for measuring signals 3824 and/or the code for measuring signals 3836.

The circuit/module for sending 3826 may include circuitry and/or programming (e.g., code for sending 3838 stored on the storage medium 3804) adapted to perform several functions relating to, for example, sending information (e.g., messages) to another apparatus. Initially, the circuit/module for sending 3826 obtains the information to be sent (e.g., from the memory device 3808, the circuit/module for measuring signals 3824, or some other component). In various implementations, the information to be sent may include a measurement message based on measured signals, a message including user terminal capability information, or a message including user terminal location information. In various implementations, the information to be sent may include a message including user terminal capability information. In various implementations, the information to be sent may include a message including user terminal location information. In various implementations, the information to be sent may include a message including user terminal paging area information. The circuit/module for sending 3826 may format the information for sending (e.g., according to a message format, according to a protocol, etc.). The circuit/module for sending 3826 then causes the information to be sent via a wireless communication medium (e.g., via satellite signaling). To this end, the circuit/module for sending 3826 may send the data to the communication interface 3802 (e.g., a UT transceiver as described above for the UT 400 of FIG. 4) or some other component for transmission. In some implementations, the communication interface 3802 includes the circuit/module for sending 3826 and/or the code for sending 3838.

The circuit/module for determining whether to send 3828 may include circuitry and/or programming (e.g., code for determining whether to send 3840 stored on the storage medium 3804) adapted to perform several functions relating to, for example, determining whether to send a message. In some implementations, the information to be sent may include a measurement message that is based on measured signals. Initially, the circuit/module for determining whether to send 3828 obtains information that is used to make a send decision (e.g., from the memory device 3808, the circuit/module for measuring signals 3824, or some other component). For example, the circuit/module for determining whether to send 3828 may obtain signal quality information from the circuit/module for measuring signals 3824. In this case, the circuit/module for determining whether to send 3828 may determine whether the signals from a current serving satellite and/or from a target satellite are inadequate (e.g., by comparing the signal quality information with a signal quality threshold). For example, the sending of a measurement message may be triggered if the signals are inadequate. Finally, the circuit/module for determining whether to send 3828 generates an indication of the determination and sends the indication to the memory device 3808, the circuit/module for sending 3826, or some other component of the apparatus 3800.

The circuit/module for performing a random access procedure 3830 may include circuitry and/or programming (e.g., code for performing a random access procedure 3842 stored on the storage medium 3804) adapted to perform several functions relating to, for example, performing a non-contention-based random access procedure using a dedicated preamble signature. In some implementations, the circuit/module for performing a random access procedure 3830 performs the random access operations described above in conjunction with FIG. 13. In some implementations, the circuit/module for performing a random access procedure 3830 performs the random access operations described above in conjunction with FIG. 15. In some implementations, the circuit/module for performing a random access procedure 3830 performs the random access operations described above in conjunction with FIG. 17. In some implementations, the circuit/module for performing a random access procedure 3830 performs the random access operations described above in conjunction with FIG. 19. In some implementations, the circuit/module for performing a random access procedure 3830 performs the operations described above in conjunction with FIG. 34.

As mentioned above, programming stored by the storage medium 3804, when executed by the processing circuit 3810, causes the processing circuit 3810 to perform one or more of the various functions and/or process operations described herein. For example, the programming, when executed by the processing circuit 3810, may cause the processing circuit 3810 to perform one or more of the various functions, steps, and/or processes described herein with respect to FIGS. 7, 8, 11-19, 21, 22, 24, 26, 28-30, 32, 34, 39, and 40 in various implementations. As shown in FIG. 38, the storage medium 3804 may include one or more of the code for receiving 3832, the code for performing handoffs 3834, the code for measuring signals 3836, the code for sending 3838, the code for determining whether to send 3840, or the code for performing a random access procedure 3842.

Example Processes

Figure 39:
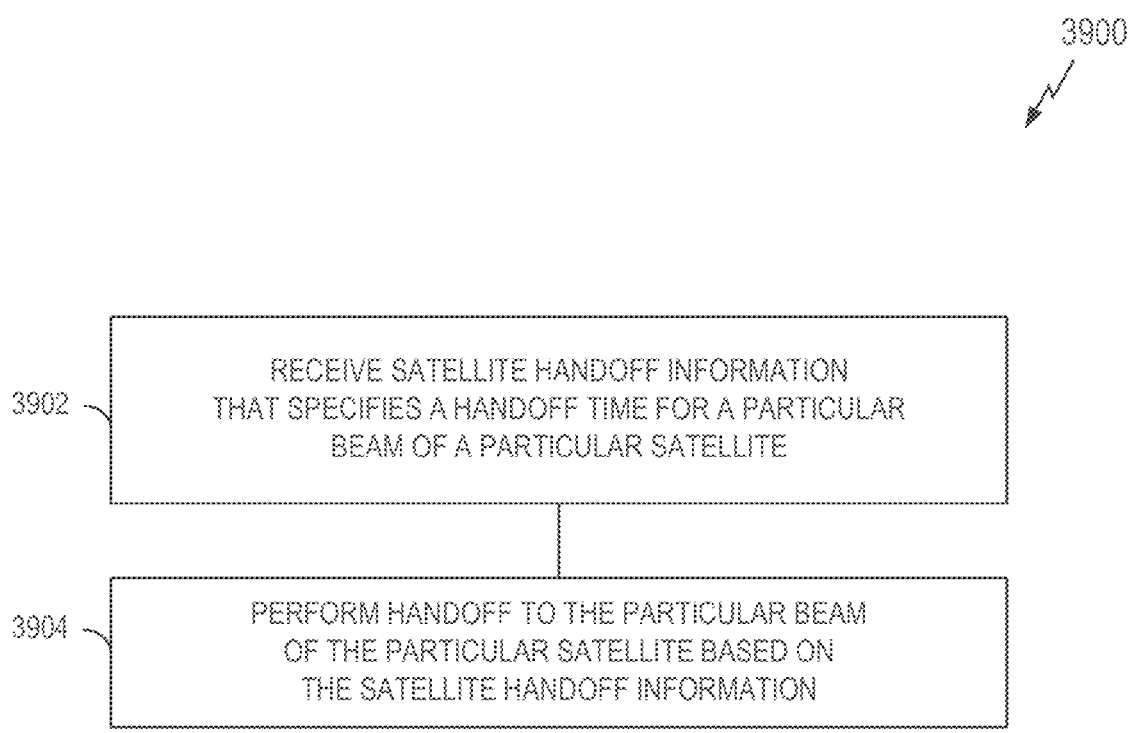
FIG. 39 is a flowchart illustrating an example of a process involving handoff in accordance with some aspects of the disclosure.

FIG. 39 illustrates a process 3900 for communication in accordance with some aspects of the disclosure. The process 3900 may take place within a processing circuit (e.g., the processing circuit 3810 of FIG. 38), which may be located in a UT or some other suitable apparatus. In some implementations, the process 3900 represents operations performed by the control processor 420 of FIG. 4. Of course, in various aspects within the scope of the disclosure, the process 3900 may be implemented by any suitable apparatus capable of supporting communication operations.

At block 3902, an apparatus (e.g., a UT) receives satellite handoff information that specifies a handoff time for a particular cell of a particular satellite. In some aspects, the operations of block 3902 may correspond to the operations of block 2104 of FIG. 21.

The satellite handoff information may take various forms as taught herein. In some aspects, the satellite handoff information may include a table that includes a handover activation time. In some aspects, the satellite handoff information may include at least one tune-away time. In some aspects, the handoff information may be defined based, in part, on a satellite pointing error. In some aspects, the handoff information may be for at least one future handoff (e.g., the next handoff, a later handoff, or some other handoff that will occur in the future). In some aspects, the handoff information may be for the next beam handoff and for at least one future satellite handoff (e.g., for the next two handoffs that will occur, the next handoff and some other subsequent handoff, etc.).

In some implementations, the circuit/module for receiving 3820 of FIG. 38 performs the operations of block 3902. In some implementations, the code for receiving 3832 of FIG. 38 is executed to perform the operations of block 3902.

At block 3904, the apparatus performs handoff to the particular cell of the particular satellite based on the satellite handoff information. In some aspects, the operations of block 3904 may correspond to the operations of block 2106 of FIG. 21.

In some aspects, the handoff may involve a change of at least one of: a satellite access network (SAN), a satellite network portal (SNP) antenna, a satellite beam, or a forward service link (FSL) frequency.

In some implementations, the circuit/module for performing a handoff 3822 of FIG. 38 performs the operations of block 3904. In some implementations, the code for performing a handoff 3834 of FIG. 38 is executed to perform the operations of block 3904.

In some aspects, the process 3900 may further include measuring signals from at least one satellite, and sending a measurement message based on the measured signals, wherein the satellite handoff information is received as a result of the measurement message being sent. The measurement message may include at least one of: measurement data based on the measured signals, a request to advance handoff timing, or a request to delay handoff timing. In some aspects, these operations may correspond to the operations of blocks 2604 and 2608 of FIG. 26.

In some aspects, the process 3900 may further include receiving information indicative of a measurement gap for measuring satellite signals, wherein the measurement of the signals from the at least one satellite is conducted during the measurement gap. In some aspects, these operations may correspond to the operations of blocks 3202 and 3204 of FIG. 32.

In some aspects, the process 3900 may further include determining whether to send the measurement message based on at least one of: whether signals from a current serving satellite are inadequate or whether signals from a target satellite are inadequate. In some aspects, these operations may correspond to the operations of block 2606 of FIG. 26.

In some aspects, the process 3900 may further include sending a message including user terminal capability information, wherein the received satellite handoff information is based on the user terminal capability information. The user terminal capability information may indicate at least one of: whether a user terminal can sense multiple beams, whether a user terminal can sense multiple satellites, a user terminal inter-beam tune time, or a user terminal inter-satellite tune time. The sending of the message including user terminal capability information may be triggered as a result of an initial connection to a satellite. In some aspects, these operations may correspond to the operations of block 2206 of FIG. 21.

In some aspects, the process 3900 may further include sending a message including user terminal location information, wherein the received satellite handoff information is based on the user terminal location information. The user terminal location information may include at least one of: a current user terminal location or a user terminal motion vector. The sending of the message including user terminal location information may be triggered as a result of at least one of: an initial connection to a satellite, whether a user terminal is beyond a geographical boundary, or whether an error bound has been exceeded. In some aspects, these operations may correspond to the operations of block 2406 of FIG. 24.

In some aspects, the process 3900 may further include receiving a dedicated preamble signature, and performing a non-contention-based random access procedure using the dedicated preamble signature. In some aspects, these operations may correspond to the operations of blocks 3402 and 3404 of FIG. 34.

In some aspects, the process 3900 may further include determining whether to send the measurement message based on at least one of: whether signals from a current serving satellite are inadequate or whether signals from a target satellite are inadequate. In some aspects, these operations may correspond to the operations of block 2406 of FIG. 24.

Figure 40:
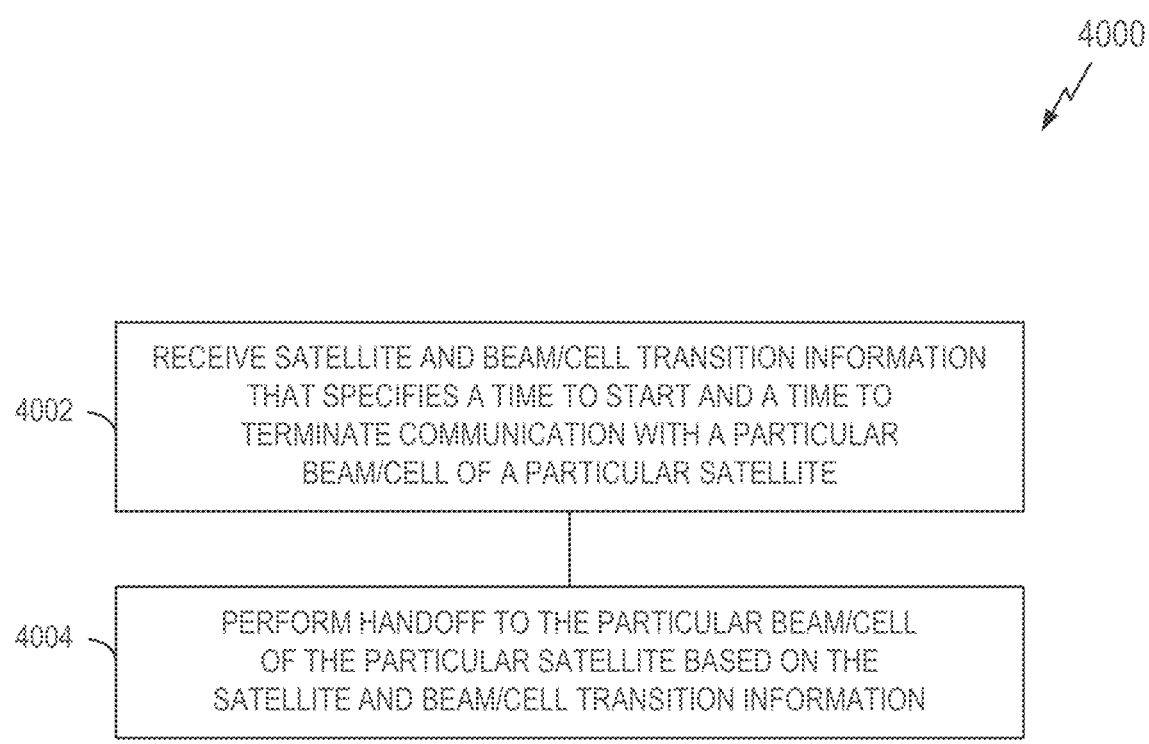
FIG. 40 is a flowchart illustrating an example of a process involving handoff in accordance with some aspects of the disclosure.

FIG. 40 illustrates a process 4000 for communication in accordance with some aspects of the disclosure. The process 4000 may take place within a processing circuit (e.g., the processing circuit 3810 of FIG. 38), which may be located in a UT or some other suitable apparatus. In some implementations, the process 4000 represents operations performed by the control processor 420 of FIG. 4. Of course, in various aspects within the scope of the disclosure, the process 4000 may be implemented by any suitable apparatus capable of supporting communication operations.

At block 4002, an apparatus (e.g., a UT) receives satellite and cell transition information that specifies a time to start and a time to terminate communication with a particular cell of a particular satellite. In some aspects, the operations of block 4002 may correspond to the operations of block 2104 of FIG. 21.

In some implementations, the circuit/module for receiving 3820 of FIG. 38 performs the operations of block 4002. In some implementations, the code for receiving 3832 of FIG. 38 is executed to perform the operations of block 4002.

At block 4004, the apparatus performs handoff to the particular cell of the particular satellite based on the satellite and cell transition information. In some aspects, the operations of block 4004 may correspond to the operations of block 2106 of FIG. 21.

In some implementations, the circuit/module for performing a handoff 3822 of FIG. 38 performs the operations of block 4004. In some implementations, the code for performing a handoff 3834 of FIG. 38 is executed to perform the operations of block 4004.

In some aspects, the process 4000 further includes: measuring signals from at least one satellite; and sending a measurement message based on the measured signals, wherein the satellite and cell transition information is received as a result of sending the measurement message. In some aspects, the measurement message includes at least one of: measurement data, a request to advance handoff timing, or a request to delay handoff timing. In some aspects, the process 4000 further includes determining whether to send the measurement message based on at least one of: whether signals from a current serving satellite are inadequate, or whether signals from a target satellite are inadequate. In some aspects, these operations may correspond to the operations of blocks 2604-2608 of FIG. 26. In some implementations, the circuit/module for measuring signals 3824 and/or the circuit/module for determining whether to send 3828 of FIG. 38 performs these operations. In some implementations, the code for measuring signals 3836 and/or the code for determining whether to send 3840 of FIG. 38 is executed to perform these operations.

In some aspects, the process 4000 further includes sending a message including user terminal capability information, wherein the satellite and cell transition information is based on the user terminal capability information. In some aspects, the user terminal capability information indicates at least one of: whether a user terminal can sense multiple cells, whether a user terminal can sense multiple satellites, a user terminal inter-cell tune time, or a user terminal inter-satellite tune time. In some aspects, the sending of the message including user terminal capability information is triggered as a result of an initial connection to a satellite. In some aspects, these operations may correspond to the operations of blocks 2202-2206 of FIG. 22. In some implementations, the circuit/module for sending 3826 of FIG. 38 performs these operations. In some implementations, the code for sending 3838 of FIG. 38 is executed to perform these operations.

In some aspects, the process 4000 further includes sending a message including user terminal location information, wherein the satellite and cell transition information is based on the user terminal location information. In some aspects, the user terminal location information includes a current user terminal location or a user terminal motion vector. In some aspects, the sending of the message including user terminal location information is triggered as a result of at least one of: an initial connection to a satellite, whether a user terminal is beyond a geographical boundary, or whether an error bound has been exceeded. In some aspects, these operations may correspond to the operations of blocks 2402-2406 of FIG. 24. In some implementations, the circuit/module for sending 3826 of FIG. 38 performs these operations. In some implementations, the code for sending 3838 of FIG. 38 is executed to perform these operations.

Additional Aspects

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

Accordingly, one aspect of the disclosure can include a computer readable media embodying a method for time or frequency synchronization in non-geosynchronous satellite communication systems. Accordingly, the disclosure is not limited to illustrated examples and any means for performing the functionality described herein are included in aspects of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication, comprising:
   generating satellite handoff information that specifies a handoff time for a particular cell of a particular satellite;
   receiving a measurement message from a user terminal;
   modifying the satellite handoff information based on the measurement message; and
   sending the modified satellite handoff information to the user terminal.

2. The method of claim 1, wherein the generation of the satellite handoff information is based on capability information for the user terminal.

3. The method of claim 2, wherein the capability information indicates at least one of: whether the user terminal can sense multiple cells or whether the user terminal can sense multiple satellites.

4. The method of claim 2, wherein the capability information indicates at least one of: an inter-cell tune time for the user terminal or an inter-satellite tune time for the user terminal.

5. The method of claim 2, wherein:
   the generation of the satellite handoff information is based on location information for the user terminal; and
   the location information comprises a motion vector for the user terminal.

6. The method of claim 1, wherein the generation of the satellite handoff information is based on at least one of: ephemeris information, a restriction due to an incumbent system, or a satellite pointing error.

7. The method of claim 1, wherein the generation of the satellite handoff information is triggered based on at least one of: handoff of the user terminal to a different satellite or receipt of a measurement message from the user terminal.

8. The method of claim 1, further comprising:
   performing handoffs for the user terminal to different cells and at least one satellite based on the satellite handoff information.

9. The method of claim 8, wherein the handoffs involve a change of at least one of: a satellite access network (SAN) or a satellite network portal (SNP) antenna.

10. The method of claim 8, wherein the handoffs involve a change of at least one of: a satellite cell or a forward service link (FSL) frequency.

11. The method of claim 1, wherein the modification of the satellite handoff information comprises advancing handoff timing or delaying handoff timing.

12. The method of claim 1, further comprising:
   determining a measurement gap for measuring satellite signals; and
   sending information indicative of the measurement gap to the user terminal,
   wherein the measurement message comprises an indication of a measurement of signals from at least one satellite conducted during the measurement gap.

13. The method of claim 1, further comprising:
   receiving capability information from the user terminal; and
   selecting a handoff procedure for the user terminal based on the received capability information.

14. The method of claim 13, wherein:
   the capability information indicates whether the user terminal is dual sense capable; and
   the selection of the handoff procedure comprises enabling or disabling monitoring for a measurement message from the user terminal based on whether the user terminal is dual sense capable.

15. The method of claim 1, further comprising:
   determining a time of a handoff of the user terminal; and
   transferring at least one user queue prior to the handoff.

16. The method of claim 1, wherein the satellite handoff information comprises a table that includes a handoff activation time.

17. The method of claim 1, wherein the satellite handoff information comprises at least one tune-away time.

18. The method of claim 1, further comprising:
   receiving, from the user terminal, a message comprising user terminal paging area information.

19. The method of claim 1, further comprising:
   determining that a measurement gap is not needed for measuring satellite signals,
   wherein, as a result of the determination, the generation of the satellite handoff information comprises not including a tune-away time in the satellite handoff information.

20. The method of claim 1, wherein the handoff information is for at least one future handoff.

21. The method of claim 1, wherein the handoff information is for the next beam handoff and for at least one future satellite handoff.

22. The method of claim 1, wherein the generation of the satellite handoff information is based on a satellite beam pattern.

23. An apparatus for communication comprising:
   a memory; and
   a processor coupled to the memory,
   the processor and the memory configured to:
      generate satellite handoff information that specifies a handoff time for a particular cell of a particular satellite;
      receive a measurement message from a user terminal;
      modify the satellite handoff information based on the measurement message; and
      send the modified satellite handoff information to the user terminal.

24. The apparatus of claim 23, wherein the processor and the memory are further configured to:
   generate the satellite handoff information based on at least one of: capability information for the user terminal, location information for the user terminal, ephemeris information, a restriction due to an incumbent system, or a satellite pointing error.

25. The apparatus of claim 24, wherein the capability information indicates at least one of: whether the user terminal can sense multiple cells, whether the user terminal can sense multiple satellites, an inter-cell tune time for the user terminal, or an inter-satellite tune time for the user terminal.

26. The apparatus of claim 23, wherein the processor and the memory are further configured to:
   perform handoffs for the user terminal to different cells and at least one satellite based on the satellite handoff information.

27. The apparatus of claim 23, wherein, to modify the satellite handoff information, the processor and the memory are further configured to advance handoff timing or delay handoff timing.

28. The apparatus of claim 23, wherein the processor and the memory are further configured to:
determine a measurement gap for measuring satellite signals; and
send information indicative of the measurement gap to the user terminal,
wherein the measurement message comprises an indication of a measurement of signals from at least one satellite conducted during the measurement gap.

29. The apparatus of claim 23, wherein the processor and the memory are further configured to:
receive capability information from the user terminal; and
select a handoff procedure for the user terminal based on the received capability information.

30. The apparatus of claim 29, wherein:
the capability information indicates whether the user terminal is dual sense capable; and
to select the handoff procedure, the processor and the memory are further configured to enable or disable whether the apparatus monitors for a measurement message from the user terminal based on whether the user terminal is dual sense capable.

31. The apparatus of claim 23, wherein the processor and the memory are further configured to:
determine a time of a handoff of the user terminal; and
transfer user queues prior to the handoff.

32. The apparatus of claim 23, wherein the processor and the memory are further configured to:
receive, from the user terminal, a message comprising user terminal paging area information.

33. The apparatus of claim 23, wherein:
the processor and the memory are further configured to determine that a measurement gap is not needed for measuring satellite signals; and
as a result of the determination, the generation of the satellite handoff information comprises not including a tune-away time in the satellite handoff information.

34. An apparatus for communication comprising:
means for generating satellite handoff information that specifies a handoff time for a particular cell of a particular satellite;
means for receiving a measurement message from a user terminal;
means for modifying the satellite handoff information based on the measurement message; and
means for sending the modified satellite handoff information to the user terminal.

35. The apparatus of claim 34, further comprising:
means for performing handoffs for the user terminal to different cells and at least one satellite based on the satellite handoff information.

36. The apparatus of claim 34, further comprising:
means for receiving capability information from the user terminal; and
means for selecting a handoff procedure for the user terminal based on the received capability information.

37. The apparatus of claim 34, further comprising:
means for determining a time of a handoff of the user terminal; and
means for transferring user queues prior to the handoff.

38. A non-transitory computer-readable medium storing computer-executable code, including code to:
generate satellite handoff information that specifies a handoff time for a particular cell of a particular satellite;
receive a measurement message from a user terminal;
modify the satellite handoff information based on the measurement message; and
send the modified satellite handoff information to the user terminal.

39. A method of communication, comprising:
measuring at least one signal from at least one satellite;
generating a measurement message based on the measurement of the at least one signal;
sending the measurement message;
receiving satellite handoff information that is based on the measurement message, wherein the satellite handoff information specifies a handoff time for a particular cell of a particular satellite; and
performing a handoff to the particular cell of the particular satellite based on the satellite handoff information.

40. The method of claim 39, wherein the measurement message comprises at least one of: measurement data based on the at least one signal, a request to advance handoff timing, or a request to delay handoff timing.

41. The method of claim 39, further comprising:
receiving information indicative of a measurement gap for measuring satellite signals,
wherein the measurement of the at least one signal is conducted during the measurement gap.

42. The method of claim 39, further comprising:
determining whether to send the measurement message based on at least one of: whether signals from a current serving satellite are inadequate or whether signals from a target satellite are inadequate.

43. The method of claim 39, further comprising:
sending a message comprising user terminal capability information, wherein the received satellite handoff information is based on the user terminal capability information.

44. The method of claim 43, wherein the user terminal capability information indicates at least one of: whether a user terminal can sense multiple cells, whether a user terminal can sense multiple satellites, a user terminal inter-cell tune time, or a user terminal inter-satellite tune time.

45. The method of claim 43, wherein the sending of the message comprising user terminal capability information is triggered as a result of an initial connection to a satellite.

46. The method of claim 39, further comprising:
sending a message comprising user terminal location information, wherein the received satellite handoff information is based on the user terminal location information.

47. The method of claim 46, wherein the user terminal location information comprises at least one of: a current user terminal location or a user terminal motion vector.

48. The method of claim 46, wherein the sending of the message comprising user terminal location information is triggered as a result of at least one of: an initial connection to a satellite, whether a user terminal is beyond a geographical boundary, or whether an error bound has been exceeded.

49. The method of claim 39, wherein the handoff involves a change of at least one of: a satellite access network (SAN), a satellite network portal (SNP) antenna, a satellite cell, or a forward service link (FSL) frequency.

50. The method of claim 39, further comprising:
receiving a dedicated preamble signature; and
performing a non-contention-based random access procedure using the dedicated preamble signature.

51. The method of claim 39, wherein the satellite handoff information comprises a table that includes a handoff activation time.

52. The method of claim 39, wherein the satellite handoff information comprises at least one tune-away time.

53. The method of claim 39, wherein the satellite handoff information is defined based, in part, on a satellite pointing error.

54. The method of claim 39, further comprising:
sending a message comprising user terminal paging area information.

55. The method of claim 39, wherein the handoff information is for at least one future handoff.

56. The method of claim 39, wherein the handoff information is for the next beam handoff and for at least one future satellite handoff.

57. An apparatus for communication comprising:
a memory; and
a processor coupled to the memory,
the processor and the memory configured to:
measure at least one signal from at least one satellite;
generate a measurement message based on the measurement of the at least one signal;
send the measurement message;
receive satellite handoff information that is based on the measurement message, wherein the satellite handoff information specifies a handoff time for a particular cell of a particular satellite; and
perform a handoff to the particular cell of the particular satellite based on the satellite handoff information.

58. The apparatus of claim 57, wherein:
the processor and the memory are further configured to receive information indicative of a measurement gap for measuring satellite signals; and
the measurement of the at least one signal is conducted during the measurement gap.

59. The apparatus of claim 58, wherein the processor and the memory are further configured to:
determine whether to send the measurement message based on at least one of: whether signals from a current serving satellite are inadequate, or whether signals from a target satellite are inadequate.

60. The apparatus of claim 57, wherein:
the processor and the memory are further configured to send a message comprising user terminal capability information; and
the received satellite handoff information is based on the user terminal capability information.

61. The apparatus of claim 60, wherein the user terminal capability information indicates at least one of: whether a user terminal can sense multiple cells, whether a user terminal can sense multiple satellites, a user terminal inter-cell tune time, or a user terminal inter-satellite tune time.

62. The apparatus of claim 57, wherein:
the processor and the memory are further configured to send a message comprising user terminal location information; and
the received satellite handoff information is based on the user terminal location information.

63. The apparatus of claim 62, wherein the sending of the message comprising user terminal location information is triggered as a result of at least one of: an initial connection to a satellite, whether a user terminal is beyond a geographical boundary, or whether an error bound has been exceeded.

64. The apparatus of claim 57, wherein the processor and the memory are further configured to:
receive a dedicated preamble signature; and
perform a non-contention-based random access procedure using the dedicated preamble signature.

65. The apparatus of claim 57, wherein the processor and the memory are further configured to:
send a message comprising user terminal paging area information.

66. An apparatus for communication comprising:
means for measuring at least one signal from at least one satellite;
means for generating a measurement message based on the measurement of the at least one signal;
means for sending the measurement message;
means for receiving satellite handoff information that is based on the measurement message, wherein the satellite handoff information specifies a handoff time for a particular cell of a particular satellite;
means for performing a handoff to the particular cell of the particular satellite based on the satellite handoff information.

67. A non-transitory computer-readable medium storing computer-executable code, including code to:
measure at least one signal from at least one satellite;
generate a measurement message based on the measurement of the at least one signal;
send the measurement message;
receive satellite handoff information that is based on the measurement message, wherein the satellite handoff information specifies a handoff time for a particular cell of a particular satellite; and
perform a handoff to the particular cell of the particular satellite based on the satellite handoff information.

* * * * *